(12) United States Patent
Kojima et al.

(10) Patent No.: US 8,213,791 B2
(45) Date of Patent: Jul. 3, 2012

(54) COMMUNICATION LIGHT DETECTING DEVICE

(75) Inventors: Seiji Kojima, Hitachi (JP); Kanako Suzuki, Hitachi (JP); Yoshihiro Nakatani, Hitachi (JP); Toshihiko Ishikawa, Hitachi (JP); Takao Nishikawa, Tokyo (JP); Kojiro Ito, Tokyo (JP); Tetsuya Sueoka, Yokohama (JP)

(73) Assignees: Hitachi Cable, Ltd., Tokyo (JP); Advanced Cable Systems Corp., Tokyo (JP); NTT Communications Corporation, Tokyo (JP)

( * ) Notice: Subject to any disclaimer, the term of this patent is extended or adjusted under 35 U.S.C. 154(b) by 412 days.

(21) Appl. No.: 12/465,735

(22) Filed: May 14, 2009

(65) Prior Publication Data

US 2010/0008676 A1    Jan. 14, 2010

(30) Foreign Application Priority Data

| May 15, 2008 | (JP) | 2008-128799 |
| May 15, 2008 | (JP) | 2008-128800 |
| Mar. 27, 2009 | (JP) | 2009-080104 |
| Mar. 27, 2009 | (JP) | 2009-080105 |

(51) Int. Cl.
    *H04B 10/08* (2006.01)
(52) U.S. Cl. ............... 398/20; 398/17; 398/141
(58) Field of Classification Search .......... 398/20, 398/17, 141
    See application file for complete search history.

(56) References Cited

U.S. PATENT DOCUMENTS 3,874,779 A * 4/1975 Thiel .................. 385/44
2004/0208458 A1   10/2004 Uno et al.

FOREIGN PATENT DOCUMENTS

| JP | 2002-214487 | 7/2002 |
| JP | 2003-218813 | 7/2003 |
| JP | 2004-133071 | 4/2004 |
| JP | 2004-170488 | 6/2004 |
| JP | 2004-177549 | 6/2004 |

\* cited by examiner

*Primary Examiner* — Kinam Park
(74) *Attorney, Agent, or Firm* — Antonelli, Terry, Stout & Kraus, LLP.

(57) ABSTRACT

A communication light detecting device interconnecting light transmission paths and collocated therebetween, comprises: an optical coupling body including a core portion for photo coupling with the light transmission paths, and a light extracting portion for extracting a part of the communication light as a leakage light; and a light detecting portion having a light receiving member for receiving the leakage light. The light extracting portion is preferable to possess a lower refractive index than that of the core portion. Besides, the light extracting portion is preferable to include a light detecting use groove with a groove width of 50 μm or more and 140 μm or less formed by cutting and separating the core portion. Besides, the light extracting portion is preferable to be the optical coupling body in which outer diameter of the core portion is different from the outer diameter of a core of the light transmission path.

22 Claims, 23 Drawing Sheets

INSTALLATION SIDE

USER SIDE

LEAKAGE LIGHT (LOSS) GENERATION
DUE TO DIFFERENCE OF CORE DIAMETER

COMMUNICATION LIGHT DETECTING DEVICE

CLAIM OF PRIORITY

The present application claims priority from Japanese patent applications: serial no. 2008-128799 filed on May 15, 2008; serial no. 2008-128800 filed on May 15, 2008; serial no. 2009-080104 filed on Mar. 27, 2009; and serial no. 2009-080105 filed on Mar. 27, 2009, the contents of which are hereby incorporated by reference into this application.

BACKGROUND OF THE INVENTION

1. Field of the Invention

The present invention relates to a communication light detecting device provided at a portion where light transmission paths are interconnected and, in particular, relates to a communication light detecting device which is able to confirm the communication state in the transmission paths. Further, the present invention relates to a communication light detecting device provided at a portion where light transmission paths are interconnected and, in particular, relates to a communication light detecting device which is able to detect a failure of the a communication light detecting device itself.

2. Description of Related Art

Recently, in a field of information (data) communication, optical fibers, which allow a high speed and large capacity transmission, for transmission lines are used as a main stream so as to cope with an increase of data amount to be communicated. In response thereto, in particular, in facilities relating to optical communication such as data center and communication station, works such as alternation and extension of light transmission paths are frequently performed.

Since communication light that communicates back and forth in a light transmission path is invisible light, existence and absence of communication cannot be confirmed visibly. For this reason, workers such as a person for maintenance or for operation of a light communication facility cannot easily grasp an operating condition whether a light transmission path in the installation is in use or not. As a result, such problems arose that work efficiency reduces due to requirement of an extra time for grasping the operating condition of the light transmission path (for example, discrimination of in use/not in use) and an erroneous manipulation of pulling out an optical connector occurs due to erroneous recognition of a condition of the light transmission path where communication light is being transmitted, as a condition of no communication light being transmitted.

In order to enhance maintenance performance and operation efficiency of a light communication facility while preventing the above referred to erroneous manipulation, a variety of measures have been investigated which are able to recognize visibly existence and absence of invisible communication light under a condition where such as optical fibers and optical connectors are interconnected. For example, JP-A-2004-170488 proposes an optical fiber connector in which ferrules building in an optical fiber are used, when butt contacting the ferrules in a divided sleeve. A gap between the end faces of the ferrules is formed, a wave guide substance consisting of light transmittable resin is provided in the gap, a part of communication light is guided via the wave guide substance to a fluorescent substance to cause the fluorescent substance to generate visible light, and thereby, existence and absence of communication light can be visibly confirmed.

JP-A-2004-133071 and JP-A-2003-218813 propose such as an light signal detecting part and a light signal monitoring device in which a light branching means such as an optical wave guide channel substrate is disposed between two ferrules building in an optical fiber are used, and the light branching means branches a part of communication light and guides the same to such as a communication light output portion and a visible light conversion element, and through converting a part of branched communication light into visible light, existence and absence of communication light in the optical fiber can be confirmed.

JP-A-2002-214487 proposes a light monitoring device in which branching faces are formed by polishing end faces of two optical fibers respectively at 45 degrees, a branching film (filter) is sandwiched between the branching faces and a part of communication light reflected by the branching film is detected by a PD (photo diode) to light on an LED (light emitting diode). Besides, JP-A-2004-177549 (US 2004/0208458 A1) proposes a bi-directional optical module in which a light receiving portion is constituted in such a manner that a core of an optical fiber is cut so as to cross diagonally and a light output portion is formed by inserting between the cut faces a filter or a half mirror for reflecting a part of communication light, then the light output portion is photo coupled with a light receiving element, and the optical fiber end portion of the thus constituted light receiving portion is configured so as to permit interconnection with an optical connector via a ferrule.

Prior arts referred to above respectively have the following drawbacks. For example, the optical fiber connector disclosed in JP-A-2004-170488 possesses a problem that because the wave guide substance is provided in a very narrow gap, a highly accurate positioning technique (for example, such as adjusting length of the gap while measuring a loss of the communication light by making use of a power monitor) for the assembly is required which likely increases the manufacturing cost. Furthermore, since the ferrule building in an optical fiber is secured by such as pressure bonding, because of stress variation due to insertion and disinsertion of the ferrule, the wave guide substance consisting of a resin and provided in the gap is possibly peeled off which arises a task with regard to reliability in long term. Moreover, since the light detecting substance is fluorescent substance, the light emitting time thereof is extremely short which makes the visual recognition difficult.

Also, the light signal detecting part disclosed in JP-A-2004-133071 possesses a problem that because the optical fiber in the ferrule, the optical wave guide channel substrate and the communication light output portion are required to be interconnected to match their optical axes, a highly accurate positioning technique for the assembly is required which likely increases the manufacturing cost. Furthermore, the members such as the optical wave guide channel substrate are expensive, which causes a problem of blocking cost reduction as a whole. The light signal monitoring device disclosed in JP-A-2003-218813 possesses a problem that since the light emitting is effected only when the light signal is reaching at the visual light converting element, the light emitting time thereof is thought extremely short which makes the visual recognition difficult.

Such as the light monitoring device and the bi-directional optical module disclosed in JP-A-2002-214487 and JP-A-2004-177549 (US 2004/0208458 A1) respectively possess a problem that since such as the filter and the half mirror are used for reflecting and branching the communication light, a highly accurate positioning technique for preventing reduction of the detection sensibility of the communication light caused in association with the increase of the number of parts is required, which likely increases the manufacturing cost.

In addition to the above, when the communication light detecting device itself fails, since the communication light detecting device cannot detect communication light transmitting through the light transmission path, a problem arises whether the communication light is transmitted or not, and that the information cannot be conveyed to a concerned worker. Namely, a problem arises that the worker cannot correctly recognize the existence and absence of the communication light. No countermeasures with regard to such failure of the communication light detecting device are disclosed in the above patent documents.

SUMMARY OF THE INVENTION

Under these circumstances, the present invention is originated to address these problems. It is an objective of the present invention to provide a communication light detecting device which is able to effectively extract a part of communication light with a simple structure that unnecessitates the highly accurate positioning technique and further permits to easily discriminate visually whether the light transmission path using invisible light is in use condition or not. Furthermore, it is another objective of the present invention to provide an inexpensive communication light detecting device with a high detection sensitivity of communication light and with a high reliability in long term. Moreover, it is another objective of the present invention to provide a communication light detecting device which is able to detect a failure of the communication light detecting device itself.

(1) According to one aspect of the present invention, there is provided a communication light detecting device interconnecting each of light transmission paths for communication light and provided between the light transmission paths, in which the communication light detecting device comprises:

an optical coupling body including a clad portion and a core portion optically coupling with the light transmission paths, and further including a light extracting portion for extracting a part of the communication light as a leakage light; and a light detecting portion having a light receiving member for receiving the leakage light, wherein:

the light extracting portion has a lower refractive index than that of the core portion.

In the above aspect (1) of the present invention, the following modifications and changes can be made.

(i) The light extracting portion includes a light detecting use groove formed by cutting and separating the core portion.

(ii) The light detecting use groove is formed in such a manner that the depth direction of the light detecting use groove facing a light receiving face of the light receiving member is to be perpendicular with respect to the light receiving face.

(iii) The light detecting use groove is formed in a slanting manner so as to cross diagonally with respect to the optical axis direction of the core portion.

(iv) In the optical coupling body, a container groove for taking in a part of the light receiving member is formed and the light detecting use groove is formed in the container groove.

(v) In the light detecting use groove, a resin having a lower refractive index than that of the core portion is filled.

(vi) The optical coupling body includes a ferrule building in an optical fiber and the ferrule is comprised of a member which transmits as well as to scatters the leakage light.

(vii) The optical coupling body includes two ferrules each building in an optical fiber and the light extracting portion is comprised of a light detecting use cut and separation portion formed by disposing the two ferrules with a predetermined gap and a resin having a lower refractive index than that of the core portion filled in the gap of the light detecting use cut and separation portion.

(viii) The core diameter of the optical fiber is equal to the core diameter of the light transmission path to be photo coupled with the optical coupling body and the clad diameter of the optical fiber is within a range from 40 to 125 μm.

(ix) The light detecting portion further includes a light output member which outputs a visible light when the leakage light is received by the light receiving member.

(2) According to another aspect of the present invention, there is provided a communication light detecting device collocated between each of light transmission paths for interconnecting each of end portions of the light transmission paths inside a sleeve, each of the light transmission paths being comprised of an optical fiber for communication light, and for detecting existence and absence of the communication light, in which the communication light detecting device comprises:

an optical coupling body including a clad portion and a core portion for photo coupling with the light transmission paths, and further including a light detecting use groove formed so as to cut and separate the core portion as well as a refractive index matching agent filled in the light detecting use groove; and a light detecting portion having a light receiving member for detecting a leakage light of the communication light leaking via the light detecting use groove and collocated adjacent the optical coupling body, wherein:

groove width of the light detecting use groove along the optical axis direction of the core portion is within a range from 50 to 150 μm.

In the above aspect (2) of the present invention, the following modifications and changes can be made.

(x) In the optical coupling body, a container groove for taking in a part of the light receiving member is formed and the light detecting use groove is formed in the container groove.

(xi) The light detecting use groove is formed in a slanting manner so as to cross diagonally with respect to the optical axis direction of the core portion.

(xii) The light detecting portion further includes a light output member which outputs a visible light when the leakage light is received by the light receiving member.

(xiii) The sleeve is made of a ceramics permitting transmission of the leakage light.

(xiv) The light detecting portion further includes a failure detecting member for informing existence and absence of a failure in the light detecting portion.

(3) According to still another aspect of the present invention, there is provided a communication light detecting device collocated between each of light transmission paths for interconnecting each of end portions of the light transmission paths inside a single sleeve, each of the light transmission paths being comprised of an optical fiber for communication light, and for detecting existence and absence of the communication light, in which the communication light detecting device comprises:

an optical coupling body including a clad portion and a core portion for photo coupling with the light transmission paths; and a light detecting portion having a light receiving member for detecting a leakage light of the communication light leaking via the optical coupling body and collocated adjacent the optical coupling body, wherein:

outer diameter of the core portion is different from the outer diameter of a core of the light transmission path.

In the above aspect (3) of the present invention, the following modifications and changes can be made.

(xv) Distance from the core portion of the optical coupling body to a light receiving face of the light receiving member is substantially the same as the length of the core portion in the optical axis direction.

(xvi) The outer diameter of the clad portion in the optical coupling body is the same as the outer diameter of a clad in the light transmission path.

(xvii) The optical coupling body further includes a ferrule.

(xviii) The light detecting portion further includes a light output member which outputs a visible light when the leakage light is received by the light receiving member.

(xix) The sleeve is made of a ceramics permitting transmission of the leakage light.

(xx) The light detecting portion further includes a failure detecting member for informing existence and absence of a failure in the light detecting portion.

(4) According to still another aspect of the present invention, there is provided a communication light detecting device interconnecting each of light transmission paths for communication light, detecting existence and absence of the communication light, and collocated between the light transmission paths, in which the communication light detecting device comprises:

an optical coupling body including a clad portion and a core portion photo coupling with the light transmission paths, and further including a light extraction portion for extracting a part of the communication light as a leakage light; and a light detecting portion including a light receiving member for receiving the leakage light and collocated adjacent the optical coupling body, and further including a failure detection light emitting member for emitting failure detection light toward the light extracting portion and a light receiving member for receiving the failure detection light reflected near the light extracting portion.

In the above aspect (4) of the present invention, the following modifications and changes can be made.

(xxi) The failure detection light emitting member includes a failure detecting use light emitting source for emitting the failure detection light and an operating member for operation the failure detecting use light emitting source.

(xxii) The light receiving member for receiving the leakage light and the light receiving member for receiving the failure detection light are a common light receiving member.

(xxiii) The core portion and the clad portion of the optical coupling body are comprised of an optical fiber, and the failure detecting use light emitting source is collocated so as to face the optical coupling body.

(xxiv) At a position of the optical coupling body facing the failure detecting use light emitting source, a cutout portion is formed.

(xxv) The optical coupling body further includes a reflection member for reflecting the failure detection light toward the light receiving member.

ADVANTAGES OF THE INVENTION

According to the present invention, there can be provided a communication light detecting device which permits to effectively extract a part of communication light with a simple structure that unnecessitates the highly accurate positioning technique and further permits to easily discriminate visually whether the light transmission path using invisible light is in use condition or not. Furthermore, according to the present invention, there can be provided an inexpensive communication light detecting device with a high detection sensitivity of communication light and with a high reliability in long term. Moreover, according to the present invention, there can be provided a communication light detecting device which permits to detect a failure of the communication light detecting device itself. These advantages lead to an enhancement of such as maintenance performance and operation efficiency for light transmission paths used in facilities relating to optical communication.

BRIEF DESCRIPTION OF THE DRAWINGS

FIG. 28 is schematic illustrations showing a failure diagnosis flow performed by the communication light detecting device shown in FIG. 26 by viewing a vertical cross section along the longitudinal direction of a principal portion of the communication light detecting device, wherein (a) shows a state when a switch of a failure diagnosis member in a light detecting portion is pressed, (b) shows a state when failure diagnosis light is emitted and the same is reflected near a light extracting portion and (c) shows a state when reflected failure diagnosis light is received at a light receiving member and a light output member is lighted on.

DETAILED DESCRIPTION OF THE PREFERRED EMBODIMENTS

Figure 1A:
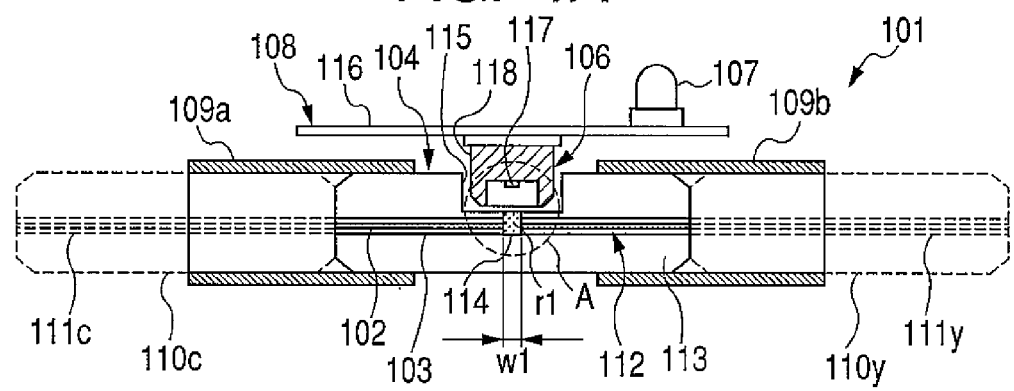
FIG. 1A is a schematic illustration showing a vertical cross sectional view along the longitudinal direction of an exemplary principal portion in a communication light detecting device according to a first embodiment.

Preferred embodiments of the present invention will be described below with reference to the accompanying drawings. However, the present invention is not limited to the embodiments described herein and the embodiments can be properly combined or improved within a range of not altering the gist of the present invention. Further, equivalent members are denoted by same reference numerals throughout the specification and an overlapping explanation thereof is omitted.

A communication light detecting device according to the present invention is, for example, installed and used in a facility relating to optical communication such as a data center and a communication station and is collocated between each of end portions of optical fibers for butt connecting each of the optical fibers serving as light transmission paths. Furthermore, the communication light detecting device is comprised in a manner to extract a part of communication light as a leakage light at a light extracting portion and to detect the use condition of light transmission paths (whether the optical communication is being performed or not) from existence and absence of the leakage light.

First Embodiment of the Present Invention

FIG. 1A is a schematic illustration showing a vertical cross sectional view along the longitudinal direction of an exemplary principal portion in a communication light detecting device according to a first embodiment. As shown in FIG. 1A, a communication light detecting device 101 is provided with: an optical coupling body 104 including a core portion 102 for photo coupling with light transmission paths and a clad portion 103; and a light detecting portion 108 collocated in parallel with and adjacent the optical coupling body 104. The light detection portion 108 includes a light receiving member 106 which receives a part of communication light propagating through the core portion 102 in the optical coupling body 104 as a leakage light and a light output member 107 that outputs a visible light when the leakage light is received by the light receiving member 106.

In more detail, the light detecting portion 108 comprises: the light receiving member 106 which receives a part of communication light (leakage light) leaking from the core portion 102 via a light extracting portion provided at the optical coupling body 104; the light output member 107 that outputs a visible light when the invisible leakage light is received by the light receiving member 106; and a circuit substrate 116 on which the light receiving member 106 and the light output member 107 are mounted to comprise a light detecting circuit. The light receiving member 106 is mounted on the circuit substrate 116 (on a bottom face of the circuit substrate 116 in FIG. 1A) so as to oppose a light detecting use groove 114 which will be explained later. The light output member 107 is mounted on the opposite side face of the circuit substrate 116 from the mounting face of the light receiving member 106 (on a top face of the circuit substrate 116 in FIG. 1A).

As an example of the light receiving member 106, a PD (photo diode) 118 provided with a PD element 117 serving as a light receiving element can be used. The PD 118 is partly taken in a container groove 115 so that the PD element 117 faces directly opposite to the light detecting use groove 114. From a viewpoint of cost, it is preferable to use an inexpensive Can package type as the PD 118. As the light output member 107, for example, an LED (light emitting diode) used for discriminating existence and absence of communication can be used which lights on when communication light is propagating through optical fibers 111c and 111y and lights off when not propagating.

Both end portions of the optical coupling body 104 are respectively inserted into sleeves 109a and 109b, and are secured therein. When the communication light detecting device 101 is in use, to the both end faces of the optical coupling body 104, a ferrule 110c provided for an optical connector on the installation side and a ferrule 110y provided for an optical connector on the user side are respectively inserted and butt connected. In the ferrule 110c, an optical fiber 111c serving as the light transmitting path on the installation side is built in, and in the ferrule 110y, an optical fiber 111y serving as the light transmitting path on the user side is built in. The sleeve 109a is for positioning of optical axes of the ferrule 110c and the optical coupling body 104, and the sleeve 109b is for positioning of optical axes of the ferrule 110y and the optical coupling body 104. Namely, the core portion 102 and the clad portion 103 of the optical coupling body 104 are arranged so as to align on a common straight line with those of optical fibers 111c and 111y serving as the light transmitting paths.

Since both end faces of the optical coupling body 104 to which the light transmitting paths are connected are connected through physical contact with the end faces (end faces of optical fibers on the connection side) of the respective ferrules 110c and 110y which are inserted into the communication light detecting device 101, the both end faces are polished so as to serve as physical contacting end faces. The outer diameter of the optical coupling body 104 is same as the outer diameters of the respective ferrules 110c and 110y. Besides, the ferrule 110c is built-in in an optical connector (not shown) on the installation side and the ferrule 110y is built-in in an optical connector (not shown) on the user side. These ferrules 110c and 110y are made of ceramics or metals and end faces thereof (end faces of optical fibers on the connection side) are polished so as to serve as physical contacting end faces.

Furthermore, the optical coupling body 104 includes: the core portion 102 photo coupled through physical contacting connection with the cores (end faces of optical fibers on the connection side) of the optical fibers 111c and 111y; the clad portion 103 surrounding the core portion 102 and made of a material having a lower refractive index than that of the core portion 102; and the ferrule 113 provided around the clad portion 103. The core portion 102 is produced with a same material as the cores of the respective optical fibers 111c and 111y, for example, with a material prepared by adding germanium to quartz glass. The clad portion 103 is also produced with a same material as the clad of the respective optical fibers 111c and 111y, for example, with a material made of pure quartz glass. For the core portion 102 and the clad portion 103 of the optical coupling body 104, either an optical wave guide channel or an optical fiber can be used. In the present embodiment, an example where the ferrule 113 building in the optical fiber 112 is used as the optical coupling body 104 will be explained.

For the optical fiber 112 and the optical fibers 111c and 111y, it is preferable to use such as a single mode optical fiber and GI (graded index) type multimode optical fiber made of quartz glass. The core diameter of the optical fiber 112 is set to be equal to the core diameter of the optical fibers 111c and 111y (e.g., 10 µm). The clad diameter of the optical fiber 112 is preferable to be 40 µm or more and 125 µm or less, and more preferably to be 40 µm or more and 80 µm or less. Furthermore, for the ferrule 113, it is preferable to use a material made of such as ceramics and glass which transmits the leakage light as well as scatters the leakage light when the same advances. In the present embodiment, an example where zirconia ceramics is used as the material for the ferrule 113 will be explained.

Figure 1B:
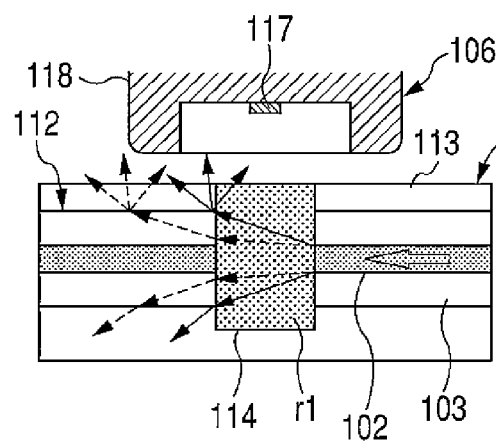
FIG. 1B is a schematic illustration showing a partially enlarged view of region A in FIG. 1A and shows an instance when communication light is advancing from a user side to an installation side.
Figure 1C:
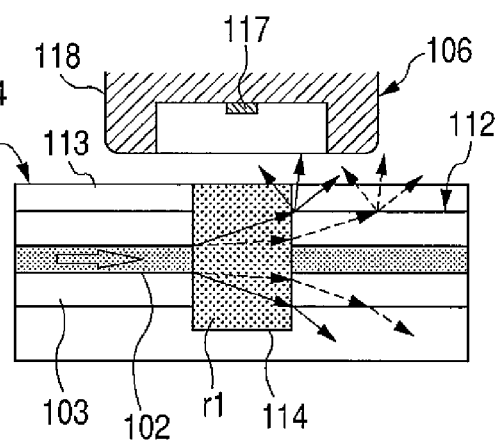
FIG. 1C is a schematic illustration showing a partially enlarged view of region A in FIG. 1A and shows an instance when communication light is advancing from an installation side to a user side.

The optical coupling body 104 is provided with a light extracting portion for extracting a part of communication light propagating through the core portion 102 as a leakage light. The light extracting portion has a lower refractive index than that of the core portion 102. FIG. 1B is a schematic illustration showing a partially enlarged view of region A in FIG. 1A and shows an instance when communication light is advancing from a user side to an installation side. FIG. 1C is a schematic illustration showing a partially enlarged of region A in FIG. 1A and shows an instance when communication light is advancing from an installation side to a user side. As shown in FIGS. 1B and 1C, the light extracting portion for extracting a part of communication light as a leakage light includes at least the light detecting use groove 114 formed so as to cut and separate the core portion 102 (the core of the optical fiber 112). The light detecting use groove 114 is formed in the optical coupling body 104 at a position facing the light receiving member 106 in such a manner that the depth direction of the light detecting use groove 114 is to be in perpendicular direction (direction crossing the optical coupling body 104) with respect to a light receiving face of the light receiving member 106, and has substantially rectangular shape (recessed shape) seen when the same is vertically cross sectioned. The light detecting use groove 114 can be formed, for example, such as through dicing processing with a blade or etching processing.

Furthermore, the light detecting use groove 114 possesses a lower refractive index than that of the core portion 102. Specifically, it is preferable that a resin r1 having a lower refractive index than that of the core portion 102 is filled inside the light detecting use groove 114. It is further preferable that the resin r1 filled in the light detecting use groove 114 possesses a refractive index which is lower than that of the core portion 102 as well as lower than that of the clad portion 103. The inside the light detecting use groove 114 can be in vacuum. For the resin r1 which is filled in the light detecting use groove 114, liquid materials can be used as well as such as thermosetting resin, ultraviolet (UV) setting resin and adhesive that possess a lower refractive index after hardening thereof than that of the core portion 102.

Besides, in the present embodiment, the container groove 115 is formed in the ferrule 113 of the optical coupling body 104 so as to take in a part of the light receiving member 106, and the light detecting use groove 114 is formed at the bottom face of the container groove 115. This is because for enhancing a light detecting sensitivity by locating the light receiving member 106 close to the optical fiber 112, in other words, by locating the light receiving member 106 close to a leakage light generating region (both side faces of the light detecting use groove 114, in that interfaces between the light detecting use groove 114 and the optical fiber 112).

Figure 2A:
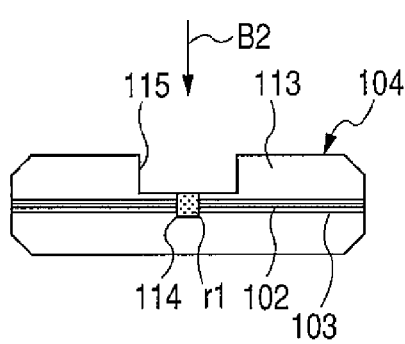
FIG. 2A is a schematic illustration showing a vertical cross sectional view along the longitudinal direction of only an optical coupling body in the communication light detecting device according to the first embodiment.
Figure 2B:
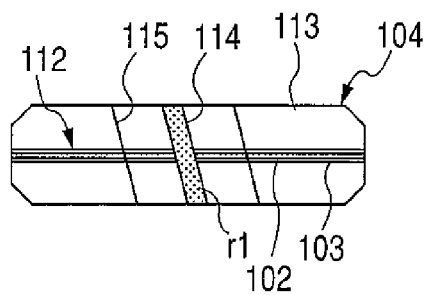
FIG. 2B is an example of a schematic illustration showing a plane view seen from B2 direction in FIG. 2A.
Figure 2C:
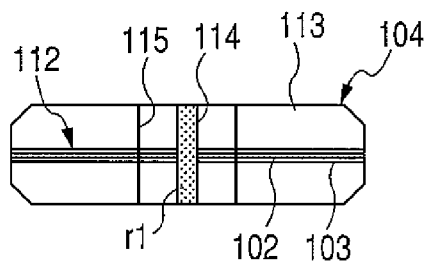
FIG. 2C is another example of a schematic illustration showing a plane view seen from B2 direction in FIG. 2A.

FIG. 2A is a schematic illustration showing a vertical cross sectional view along the longitudinal direction of only an optical coupling body in the communication light detecting device according to the first embodiment; FIG. 2B is an example of a schematic illustration showing a plane view seen from B2 direction in FIG. 2A; and FIG. 2C is another example of a schematic illustration showing a plane view seen from B2 direction in FIG. 2A. As shown in FIG. 2A, the container groove 115 is formed in the ferrule 113 of the optical coupling body 104 so as to take in a part of the light receiving member 106, and the light detecting use groove 114 of substantially a rectangular shape (recessed shape) is formed in the container groove 115. As shown in FIG. 2C, the light detecting use groove 114 can be formed in perpendicular with respect to the optical axis direction of the core portion 102 (the width direction of the light receiving use groove 114 is in parallel with the optical axis direction of the core portion 102). Alternatively, as shown in FIG. 2B, it is preferable to form the light detecting use groove 114 to be in diagonal (in slanting manner) with respect to the optical axis direction of the core portion 102. This is because for enhancing a light detecting sensitivity at the PD (photo diode) 118 by enhancing a directivity of the leakage light. Therefore, it is more preferable to form the light detecting use groove 114 to be in diagonal with respect to the optical axis direction of the core portion 102 in the optical coupling body 104, as shown in FIG. 2B.

The communication light detecting device 101 according to the first embodiment will be explained in more detail. FIG.

Figure 3:
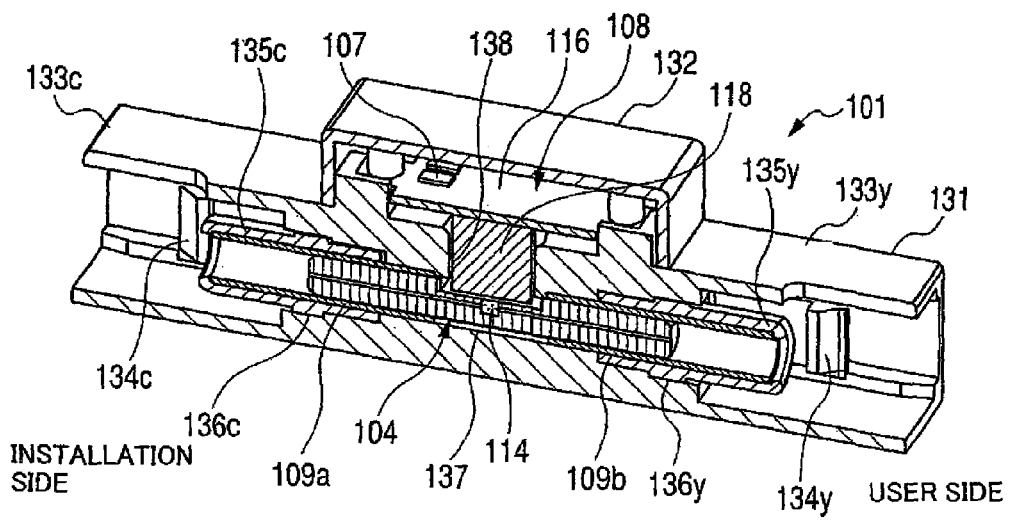
FIG. 3 is a schematic illustration showing a perspective view in vertical cross section along the longitudinal direction of the communication light detecting device shown in FIG. 1A.

3 is a schematic illustration showing a perspective view in vertical cross section along the longitudinal direction of the communication light detecting device shown in FIG. 1A. As shown in FIG. 3, the communication light detecting device 101 is provided with a rectangular cylindrical shaped housing 131 for taking in the principal portion as explained with reference to FIG. 1A and a box shaped cover 132 disposed on the housing 131 at the center thereof for covering the light detecting portion 108.

One end portion (left side in FIG. 3) of the housing 131 serves as an optical connector adaptor 133c on the installation side and the other side (right side in FIG. 3) thereof serves as an optical connector adaptor 133y on the user side. In the optical connector adaptor 133c on the installation side is provided a connector lock piece (SC attachment) 134c for securing an optical connector plug (not shown) on the installation side after inserting thereof. Likely, in the optical connector adaptor 133y on the user side, is provided a connector lock piece (SC attachment) 134y for securing an insertion and disinsertion free optical connector plug (not shown) on the user side.

On the depth side (on the side of the optical coupling body 104) from the connector lock piece 134c in the optical connector adaptor 133c on the installation side, a sleeve holder storage room 136c on the installation side is formed; and a sleeve holder 135c on the installation side is accommodated in the sleeve holder storage room 136c on the installation side. Likely, on the depth side (on the side of the optical coupling body 104) from the connector lock piece 134y in the optical connector adaptor 133y on the user side, a sleeve holder storage room 136y on the user side is formed; and a sleeve holder 135y on the user side is accommodated in the sleeve holder storage room 136y on the user side.

At the center portion in the housing 131, a main body storage room 137 is formed for taking in the sleeves 109a and 109b, and the optical coupling body 104 to be held inside between these sleeves 109a and 109b. And, in the main body storage room 137, the two sleeves 109a and 109b and the single optical coupling body 104 to be held inside between these sleeves 109a and 109b are accommodated. Adjacent the main body storage room 137 in the housing 131 (an upper portion in FIG. 3), a PD storage room 138 for taking in the PD 118 is formed. In the cover 132 the circuit substrate 116 is accommodated. Furthermore, the cover 132 is made of a substantially transparent material with respect to light (visible light) emitted from the light output member 107.

Next, a reason why the refractive index of inside the light detecting use groove 114 serving as the light extracting portion is set lower than that of the core portion 102 will be explained. As shown in FIGS. 1B and 1C, the communication light propagating through the core portion 102 in the optical coupling body 104 spreads at the boundary faces between the light detecting use groove 114 and the core portion 102, therefore a part of the communication light leaks to generate a leakage light. The leakage light generated at the side faces of the light detecting use groove 114 is transmitted to the clad portion 103, is scatted at the ferrule 113 containing zirconia of a scattering material, and the scattered leakage light is received by the PD 118. The leakage light is converted by the PD 118 into an electrical signal, and the converted electrical signal is output as a visible light from the light output member 107 in the light detecting portion 108 via the circuit substrate 116.

As the advancing direction of the communication light, since there are two directions one from the user side to the installation side (see FIG. 1B) and the other from the installation side to the user side (see FIG. 1C), it is desirable to dispose the PD 118 in such a manner that the PD element 117 faces directly opposite to the center position of the light detecting use groove 114 so as to receive and detect the leakage light generated from the communication light in either directions.

On the other hand, in a conventional communication light detecting device, a resin (e.g., a refractive index matching agent) having an equivalent refractive index as the core is filled in a gap between optical fibers to be photo coupled. Herein, if a resin having an equivalent refractive index as the core portion 102 is used for the light extracting portion in the communication light detecting device 101, the spreading of the leakage light at the light detecting use groove 114 is almost limited as shown by dotted arrows in FIGS. 1B and 1C. As a result, a position where the leakage light leaked from the light detecting use groove 114 reaches the boundary between the outer circumferential surface of the optical fiber 112 and the ferule 113 becomes remote from the center position of the light detecting use groove 114, therefore, the leakage light is to be scattered from the ferrule 113 at a position remote from the center position of the light detecting use groove 114. This implies that a peak position of the leakage light is greatly separated depending on the advancing direction of the communication light, which leads to a difficulty of efficiently receiving the leakage light in both directions with a single PD 118.

In order to efficiently receive the leakage light in both directions with a single PD 118, it is desirable to enlarge the spreading (to enlarge a spreading angle) of the leakage light at the light detecting use groove 114 and to cause the leakage light to reach the ferrule 113 at a position as close as possible to the center position of the light detecting use groove 114. For this reason, in the communication light detecting device 101 according to the first embodiment, the refractive index of inside the light detecting use groove 114 serving as the light extracting portion is set lower than that of the core portion 102. For example, the resin r1 having a lower refractive index than that of the core portion 102 is filled in the light detecting use groove 114. By this measure, as shown by the solid arrows in FIGS. 1B and 1C, the spreading of the leakage light at the light detecting use groove 114 is enlarged and the leakage light scatters at a position near the center position of the light detecting use groove 114, and then a sensitivity (light detecting sensitivity) of the leakage light in both directions with a single PD 118 can be enhanced.

Furthermore, as mentioned above, since the leakage light leaked from the light detecting use groove 114 is scattered at a position where the leakage light makes incident to the ferrule 113 from the clad portion 103 in the optical fiber 112, the leakage light is caused to be scattered at a position more close to the PD 118. Therefore, it is desirable to limit the outer diameter (clad diameter) of the clad portion 103 in the optical fiber 112 as small as possible. Although an optical fiber having clad diameter of 125 μm is most commonly marketed, other than this, for example, an optical fiber having clad diameter of 80 μm or 40 μm is also marketed. Therefore, as the optical fiber 112 to be built-in in the optical coupling body 104, one having a clad diameter from 40 to 125 μm is preferable, but one having a clad diameter from 40 to 80 μm is more preferable. Since the smaller the clad diameter is the earlier the leakage light reaches the light scattering medium (e.g., the ferrule 113 made of a zirconia), the PD 118 can detect (receive) the leakage light from a more close position.

Figure 4:
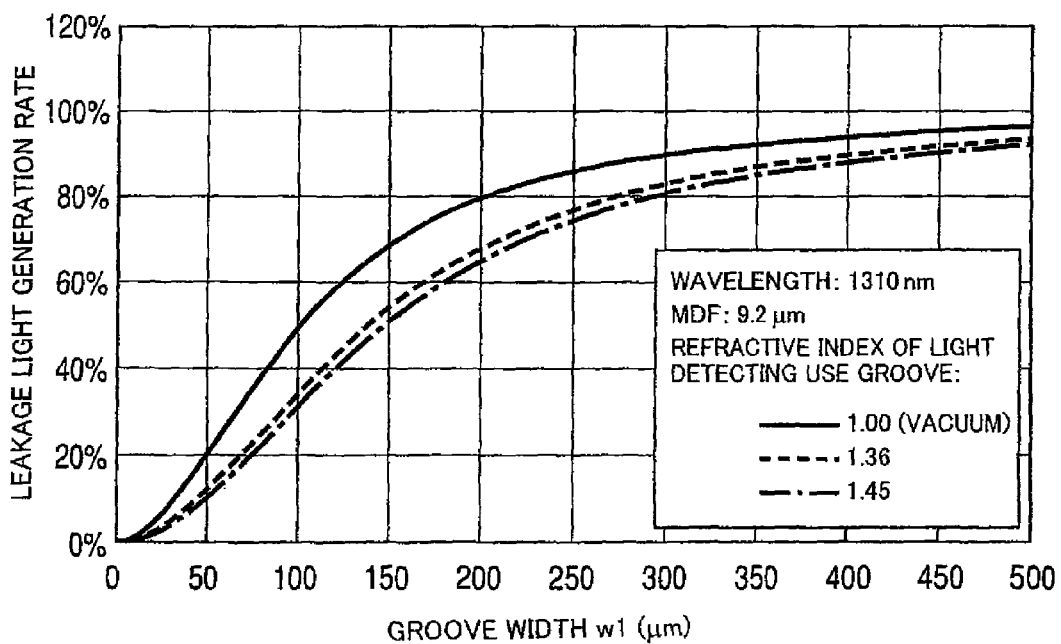
FIG. 4 is a graph showing a relationship between groove width w1 of a light detecting use groove and leakage light generation rate.

FIG. 4 is a graph showing a relationship between groove width w1 of a light detecting use groove and leakage light generation rate. In FIG. 4, "leakage light generation rate" in ordinate is an amount (rate) of leakage light generated at the light detecting use groove 114 when assumed that the communication light propagating through the optical fiber on the sending side as 100%. In FIG. 4, as the optical fiber 112 in the optical coupling body 104, around a core (core portion 102) having refractive index of 1.46, a clad (clad portion 103, refractive index of 1.458) made of a pure quartz glass is used. And, measurement results are shown: when the inside of the light detecting use groove 114 is kept in vacuum (refractive index is 1.00); when a resin r1 having refractive index of 1.36 is filled therein; and when a resin r1 having refractive index of 1.45 is filled therein.

As shown in FIG. 4, an amount of the leakage light generated at the light detecting use groove 114 increases with increasing the groove width w1 of the light detecting use groove 114. Furthermore, the generation rate of the leakage light increases with decreasing the refractive index inside the light detecting use groove 114. Namely, when the groove width w1 is kept constant, as the refractive index inside the light detecting use groove 114 decreases, the spreading of the leakage light at the light detecting use groove 114 enlarges and the detection sensitivity of light received at the PD 118 enhances. Besides, since the leakage light is generated at an end face where the communication light makes incident to the light detecting use groove 114 and is spread from the end face toward the PD 118, when the groove width w1 is 0 µm (when the light detecting use groove 114 is not provided), the light is transmitted with no leakage.

In other words, even though the groove width w1 is not enlarged, when the refractive index of the inside of the light detecting use groove 114 is set lower than that of the core portion 102 and is approximated to 1, the leakage light can be efficiently detected by the PD 118. Furthermore, by setting the refractive index of the inside lower than that of the core portion 102, since the leakage light largely spreads at the light detecting use groove 114, the groove width w1 can be limited small, thereby, for example, when the resin r1 is filled therein, the amount of the resin r1 can be decreased.

The groove width w1 of the light detecting use groove 114 can be properly set so as to obtain a desired leakage light generation rate. When the leakage light generation rate is excessively large, a loss of the communication light increases. Then, it is desirable in view of the loss of the communication light to set a specification as such as "the groove width w1 is set to be 100 µm or less" or "the leakage light generation rate is set to be 20% or less". For example, when setting the leakage light generation rate at 20% by using a resin r1 having refractive index of 1.36, a groove width w1 of 70 µm is acceptable.

Figure 5:
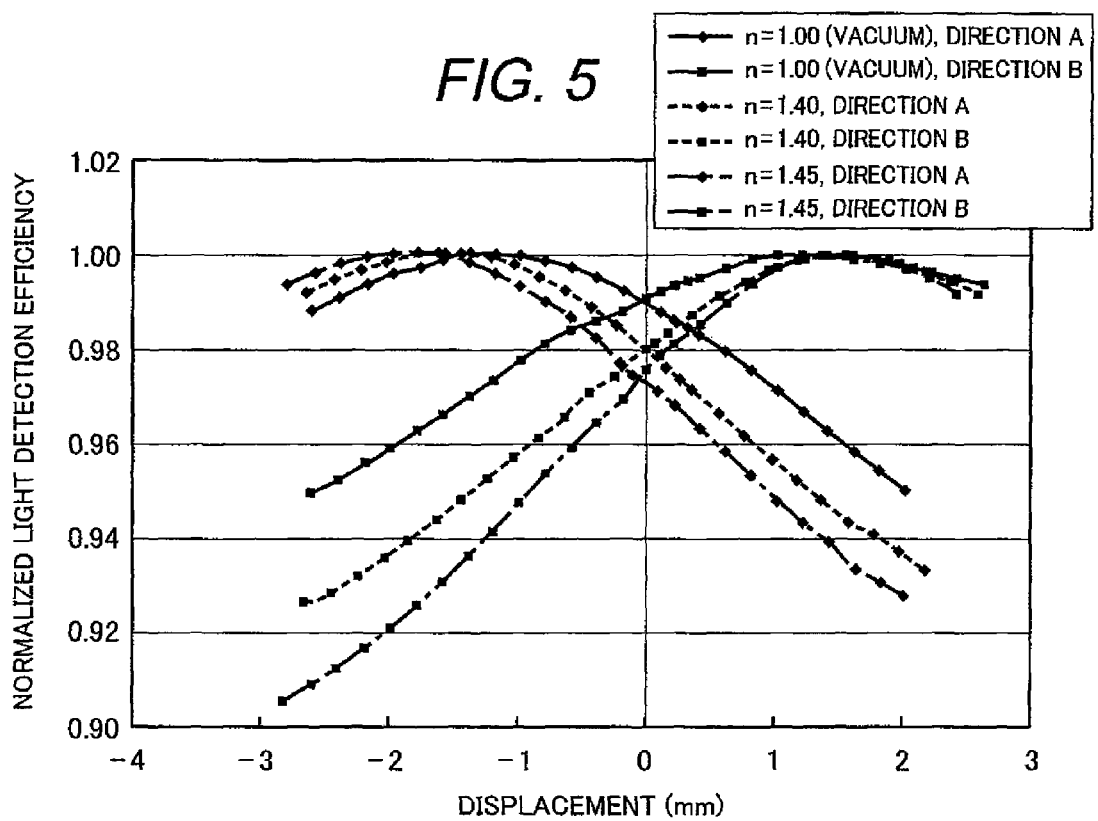
FIG. 5 is a graph showing a relationship between displacement of a PD element along the optical axis direction of a core portion in the optical coupling body from a center position of a light detecting use groove and normalized light detection efficiency.

FIG. 5 is a graph showing a relationship between displacement of a PD element along the optical axis direction of a core portion in the optical coupling body from a center position of a light detecting use groove and normalized light detection efficiency. In FIG. 5, "displacement" in abscissa is a distance from zero (0) defined by a position where the PD element 117 in the PD 118 is collocated to face directly opposite to the center position of the light detecting use groove 114, to a position where displacing the PD element 117 in the PD 118 is displaced along the optical axis direction of the core portion 102, and "normalized light detection efficiency" in ordinate is one that the detected amounts of the leakage light at the respective positions are normalized by the peak values. In FIG. 5, as the optical fiber 112 in the optical coupling body 104, around a core (core portion 102) having refractive index of 1.46, a clad (clad portion 103, refractive index of 1.458) made of a pure quartz glass is used. And, the measurement was performed for instances: when the inside of the light detecting use groove 114 is kept in vacuum (refractive index is 1.00); when a resin r1 having refractive index of 1.40 is filled therein; and when a resin r1 having refractive index of 1.45 is filled therein, while using communication light in both directions, in that communication light (A) from the installation side to the user side and communication light (B) from the user side to the communication side. Besides, the groove width w1 of the light detecting use groove 114 was set constant at 60 µm.

As shown in FIG. 5, the normalized light detection efficiency at "displacement=0" is not maximized in any instances and the normalized light detection efficiency is maximized at a position slightly away from "displacement=0". When the refractive index of inside of the light detecting use groove 114 is varied, the normalized light detection efficiency at "displacement=0" increases with decreasing the refractive index. This represents that the lower the refractive index is the more the leakage light generated at the end faces of the light detecting use groove 114 spreads toward the PD 118 and that the light detection amount at the PD element 117 increases.

In other words, as the refractive index of the inside of the light detecting use groove 114 sets lower than that of the core portion 102, the leakage light can be efficiently detected with the PD 118. Besides, although it is preferable to use vacuum (or air) inside of the light detecting use groove 114 instead of filling the resin r1 therein for enlarging the spreading of the communication light at the light detecting use groove 114, in such instance it is desirable to seal the light detecting use groove 114 so as to keep airtightness of the light detecting use groove 114. When considering the manufacturing cost thereof, it is desirable to fill a resin r1 having a low refractive index in the light detecting use groove 114.

As has been explained hitherto, in the communication light detecting device 101 according to the first embodiment, the light extracting portion having a lower refractive index than that of the core portion 102 in the optical coupling body 104 is formed, and a part of the communication light propagating through the core portion 102 is extracted as a leakage light. When the inside of the light detecting use groove 114 is, for example, filled with a resin r1 having a lower refractive index than that of the core portion 102 in the optical coupling body 104, the spreading of the leakage light enlarges and the scattering position of the leakage light comes further close to the center position of the light detecting use groove 114. As a result, the leakage light scattering toward the light receiving member 106 increases and the amount of light received by the light receiving member 106 can be increased. Comparing with a conventional communication light detecting device, the number of parts of the present structure can be decreased, and the light extracting portion (the light detecting use groove 114 and the resin r1) can be formed with a simple manufacturing method, which leads to a cost reduction.

Further, in the communication light detecting device 101 according to the first embodiment, because of the use of the resin r1 having a low refractive index since the leakage light spreads largely at the light detecting use groove 114, the groove width w1 of the light detecting use groove 114 can be reduced in comparison with a conventional communication light detecting device using a resin having an equivalent refractive index as that of the core portion 102. As a result, the amount of the resin r1 to be used can be reduced, which also leads to further cost reduction.

Furthermore, in the communication light detecting device 101 according to the first embodiment, the optical coupling body 104 having the light detecting use groove 114 serving as the light extracting portion is used, and the end faces of the optical fiber 111c on the installation side and the optical fiber 111y on the user side which are inserted when the communication light detecting device 101 is in use are physical contact connected with the end faces of the optical coupling body 104. For this reason, since the stress applied to the light detecting use groove 114 (the resin r1 inside the light detecting use groove 114) hardly varies even when an optical connector is inserted or disinserted, such as variation of the groove width w1 of the light detecting use groove 114 and peeling off of the resin r1 are eliminated, which result in an enhancement of a device reproducibility and a long term reliability of the communication light detecting device 101.

Moreover, in the communication light detecting device 101 according to the first embodiment, since as the ferrule 113 for the optical coupling body 104 a member which transmits and scatters the leakage light is used, the leakage light can be scattered at a position where the leakage light reaches from the optical fiber 112 in the optical coupling body 104 to the ferrule 113, a light detection sensitivity of leakage light can surely be obtained without necessitating a highly accurate positioning technique for the light receiving member 106. Additionally, by limiting the clad diameter of the optical fiber 112 within the range from 40 to 125 μm (desirably, from 40 to 80 μm), the position from where the leakage light reaches the ferrule 113 comes further close to the light receiving member 106, thereby, the light detection sensitivity can be enhanced further.

From the above explanation, it can be said that the communication light detecting device 101 according to the first embodiment has attractive advantages in which the leakage light is efficiently extracted with a simple structure that unnecessitates a highly accurate positioning technique (namely, with a low cost) and the light detection sensitivity of the leakage light at the light receiving member 106 is enhanced.

Second Embodiment of the Present Invention

Figure 6:
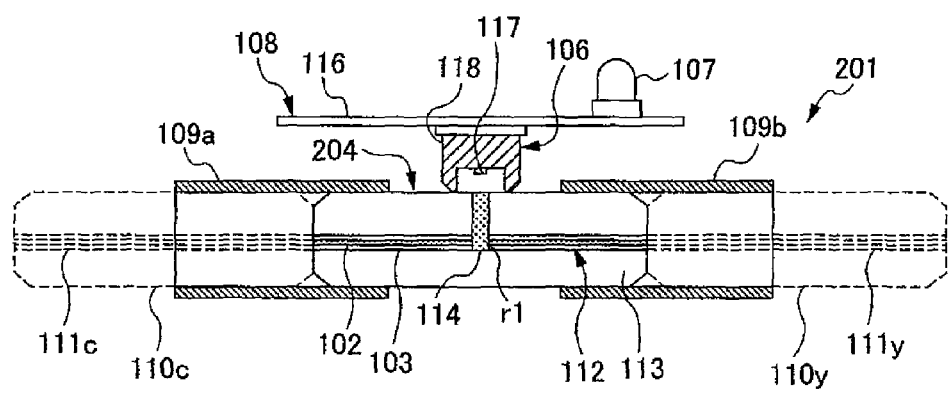
FIG. 6 is a schematic illustration showing a vertical cross sectional view along the longitudinal direction of an exemplary principal portion in a communication light detecting device according to a second embodiment.

FIG. 6 is a schematic illustration showing a vertical cross sectional view along the longitudinal direction of an exemplary principal portion in a communication light detecting device according to a second embodiment. Although in the communication light detecting device 101 according to the first embodiment, the optical coupling body 104 in which the container groove 115 is formed in the ferrule 113 is used and a part of the light receiving member 106 is accommodated in the container groove 115, as in the communication light detecting device 201 according to the second embodiment, as shown in FIG. 6, by using an optical coupling body 204 in which no container groove for taking in a part of the light receiving member 106 is formed, the light receiving member 106 can be collocated so as to be adjacent the ferrule 113 of the optical coupling body 204. The communication light detecting device 201 according to the second embodiment achieves the like functions and advantages as those of the communication light detecting device 101 according to the first embodiment.

Third Embodiment of the Present Invention

Figure 7:
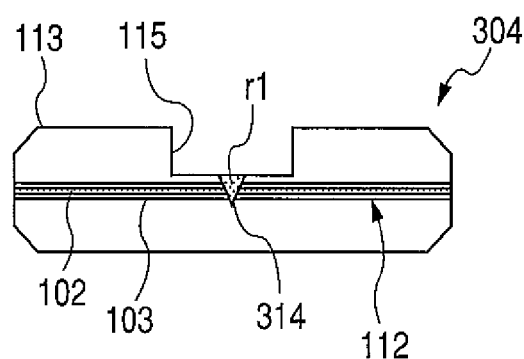
FIG. 7 is a schematic illustration showing a vertical cross sectional view along the longitudinal direction of an example of only an optical coupling body in a communication light detecting device according to a third embodiment.

FIG. 7 is a schematic illustration showing a vertical cross sectional view along the longitudinal direction of an example of only an optical coupling body in a communication light detecting device according to a third embodiment. Although in the communication light detecting device 101 according to the first embodiment, the optical coupling body 104 in which the light detecting use groove 114 having a substantially rectangular shape seen when the optical coupling body is vertically cross sectioned along the longitudinal direction is used, as an optical coupling body 304 in the communication light detecting device according to the third embodiment, as shown in FIG. 7, the optical coupling body 304 in which the light detecting use groove 314 having a substantially V shape seen when the optical coupling body 304 is vertically cross sectioned along the longitudinal direction can be used. The communication light detecting device according to the third embodiment achieves the like functions and advantages as those of the communication light detecting device 101 according to the first embodiment.

Fourth Embodiment of the Present Invention

Figure 8A:
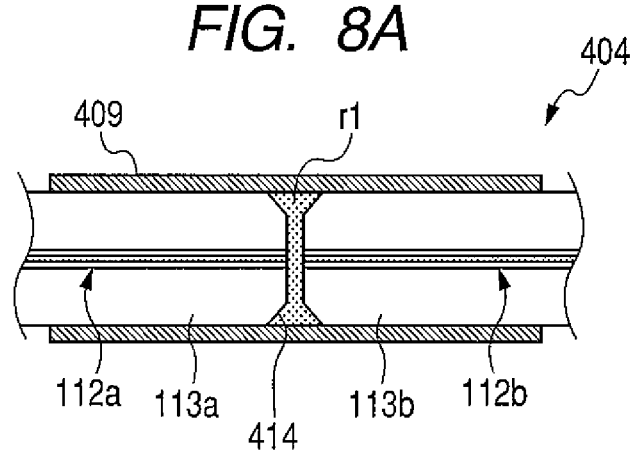
FIG. 8A is a schematic illustration showing a vertical cross sectional view along the longitudinal direction of an example of only an optical coupling body in a communication light detecting device according to a fourth embodiment.
Figure 8B:
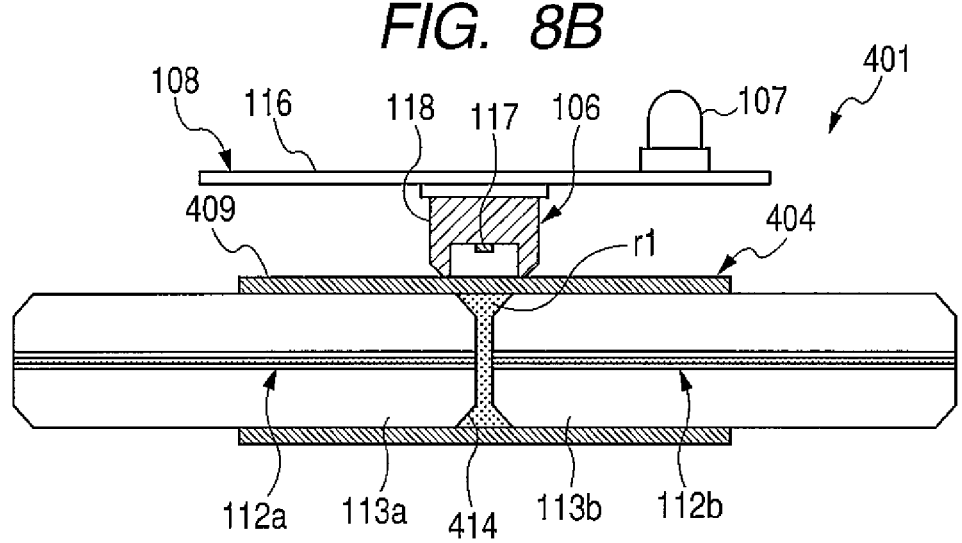
FIG. 8B is a schematic illustration showing a vertical cross sectional view along the longitudinal direction of an exemplary principal portion in the communication light detecting device according to the fourth embodiment.

FIG. 8A is a schematic illustration showing a vertical cross sectional view along the longitudinal direction of an example of only an optical coupling body in a communication light detecting device according to a fourth embodiment; and FIG. 5B is a schematic illustration showing a vertical cross sectional view along the longitudinal direction of an exemplary principal portion in the communication light detecting device according to the fourth embodiment. Although in the communication light detecting device 101 according to the first embodiment, the single ferrule 113 is used for the optical coupling body 104 and the optical coupling body 104 is used in which the light detecting use groove 114 is formed in the ferrule 113 and inside the light detecting use groove 114 the resin r1 is filled, as shown in FIG. 8A, an optical coupling body 404 can be used, which is comprised by using two ferules 113a and 113b in which optical fibers 112a and 112b are respectively built in, by forming a light detecting use cut and separation portion 414 while collocating the two ferrules 113a and 113b with a predetermined gap by making use of a sleeve 409, and by filling the gap of the light detecting use cut and separation portion 414 with a resin r1. In the communication light detecting device 401 according to the fourth embodiment, with the optical coupling body 404 shown in FIG. 8B, the light receiving member 106 is collocated to be adjacent the sleeve 409 so as to face directly opposite to the light detecting use cut and separation portion 414. The communication light detecting device 401 achieves the like functions and advantages as those of the communication light detecting device 101 according to the first embodiment.

Fifth Embodiment of the Present Invention

Figure 9:
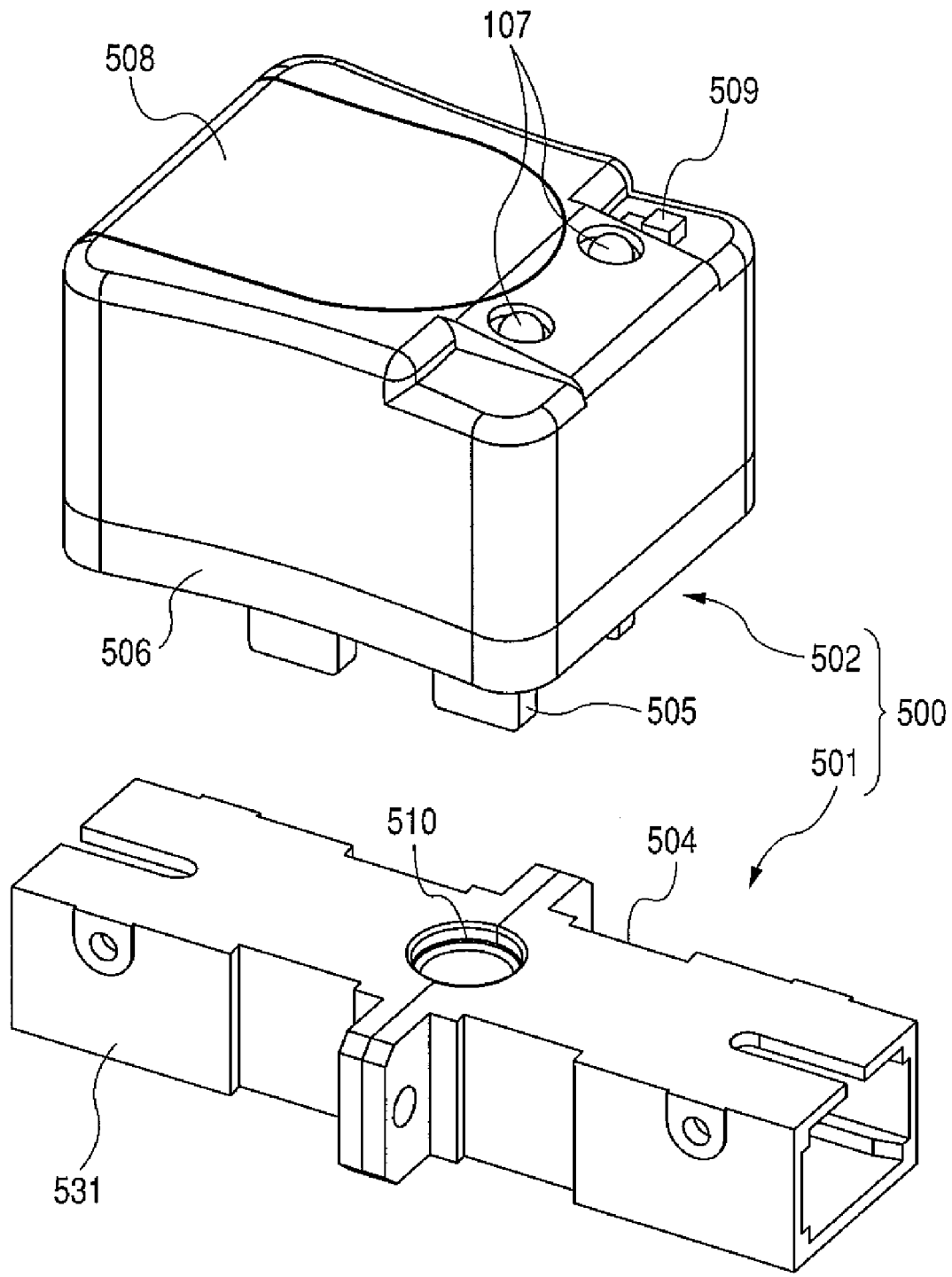
FIG. 9 is a schematic illustration showing a perspective view of an example of a communication light detecting device according to a fifth embodiment.
Figure 10:
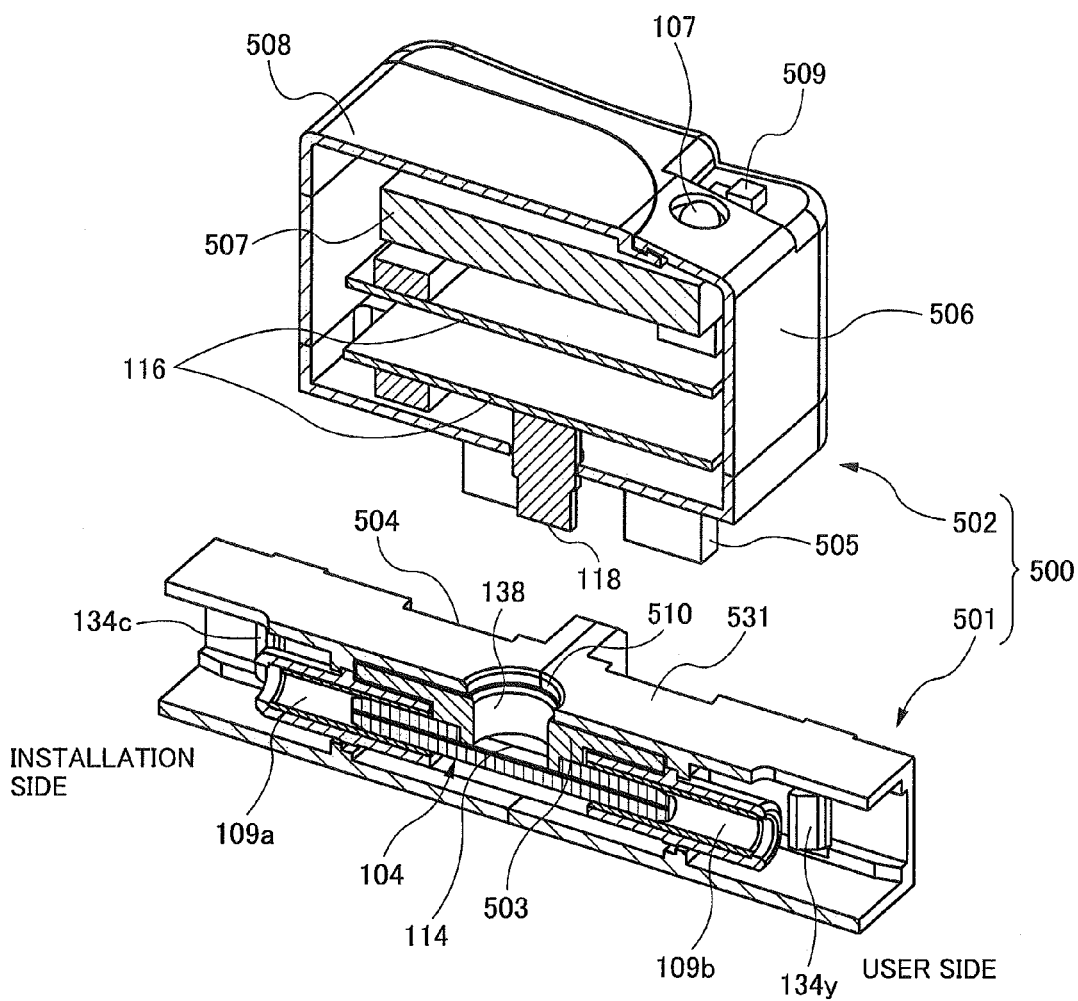
FIG. 10 is a schematic illustration showing a perspective view in vertical cross section along the longitudinal direction of the communication light detecting device shown in FIG. 9.

FIG. 9 is a schematic illustration showing a perspective view of an example of a communication light detecting device according to a fifth embodiment. FIG. 10 is a schematic illustration showing a perspective view in vertical cross section along the longitudinal direction of the communication light detecting device shown in FIG. 9. As shown in FIGS. 9 and 10, in the communication light detecting device 500 according to the fifth embodiment, the portion corresponding to the light detecting portion 108 in the communication light detecting device 101 according to the first embodiment is formed in a separate body. Namely, in the communication light detecting device 500, a light detecting device 502 provided with the light detecting portion and a light connecting device 501 (a portion corresponding to a portion excluding the light detecting portion 108 from the communication light detecting device 101) are formed in separate bodies, and when discriminating existence and absence of communication light (use and nonuse condition of the light transmission path), the light detecting device 502 is attached to the light connecting device 501.

The light connecting device 501 is provided with a ferrule holder 503, and by supporting a side wall of the container groove 115 with the ferrule holder 503 positioning of the optical coupling body 104 is performed. In the ferrule holder 503, a PD storage room 138 for taking in the PD 118 is formed. On the side faces of the housing 531 (front and back faces in FIGS. 9 and 10) of the light connecting device 501, detecting device positioning guide grooves 504 for positioning the light detecting device 502 when attaching the light detecting device 502 to the light connecting device 501. Furthermore, in the housing 531, a PD insertion hole 510 for inserting the PD 118 is formed so as to communicate with the PD storage room 138.

The light detecting device 502 is provided with a casing 506 for taking in a circuit substrate 116, and the PD 118 is provided in a manner to project from the bottom (downward face in FIGS. 9 and 10) of the casing 506. In addition, on the bottom of the casing 506, a plurality of legs 505 (in FIGS. 9 and 10, four) are formed which are inserted and guided through the detecting device positioning guide grooves 504. On the upper face of the casing 506 (upward face in FIGS. 9 and 10), the light output member 107 serving as a communication condition confirmation use lamp is provided.

In the casing 506 of the light detecting device 502, a battery 507 for supplying an electric power to such as the PD 118 and the light output member 107 is accommodated. On the upper face of the casing 506, a cover portion 508 which allows detaching a part of the upper face of the casing 506 is formed so as to permit exchange of the battery 507. Furthermore, on the upper face of the casing 506, a power switch 509 for switching supply and non-supply of the electric power from the battery 507 is provided. Besides, in FIG. 9, an example is shown wherein two light output members 107 are provided, however, other than two is acceptable. Moreover, one of the two light output members 107 can be used as a power source lamp indicating ON/OFF of the power source.

When discriminating existence and absence (use and nonuse condition of the light transmission path) of communication light with the communication light detecting device 500, the legs 505 of the light detecting device 502 are inserted along the detecting device positioning guide grooves 504 of the light connecting device 501. Thereby, the PD 118 projecting from the bottom face of the casing 506 in the light detecting device 502 passes through the PD insertion hole 510 and is accommodated in the PD storage room 138 under a positioned condition. Under this condition, when the power switch 509 is turned ON, discrimination (detection of leakage light) of existence and absence of communication light can be performed.

In the communication light detecting device 500, since the light detecting portion is separated as the light detecting device 502 and which is attached only when required, under a normal condition (a condition where the light detecting device 502 is not attached) the size of the light connecting device 501 can be reduced. In addition, the light detecting device 502 can be used in common for a plurality of light connecting devices 501, number of parts as a whole can be further reduced, thereby, a communication light detecting device with low cost can be realized. Besides, in the communication light detecting device 500, under a condition when the light detecting device 502 is not attached, it is preferable to provide a cover member (not shown) for covering the PD insertion hole 510 so as to prevent such as dust from accumulating in the PD storage room 138.

Sixth Embodiment of the Present Invention

Figure 11A:
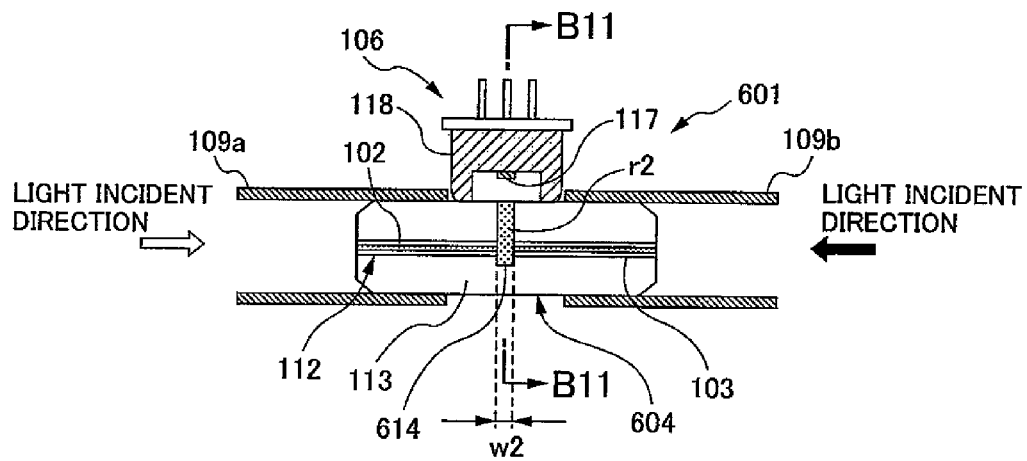
FIG. 11A is a schematic illustration showing a vertical cross sectional view along the longitudinal direction of an exemplary principal portion in a communication light detecting device according to a sixth embodiment.
Figure 11B:
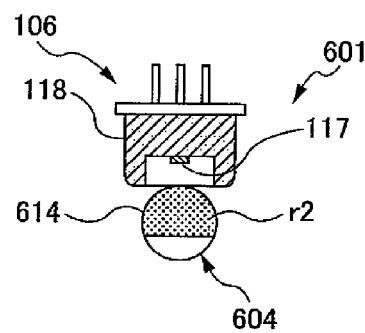
FIG. 11B is a schematic illustration showing a vertical cross sectional view along the lateral direction of line B11-B11 in FIG. 11A.
Figure 11C:
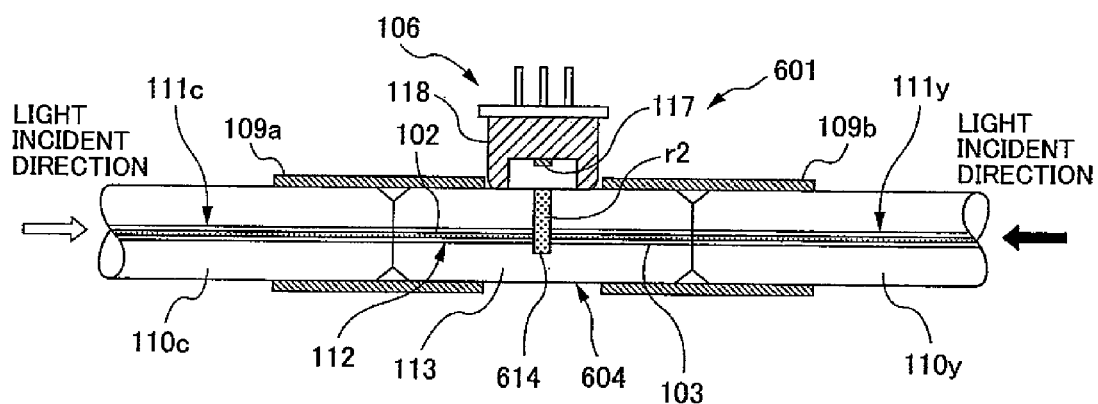
FIG. 11C is a schematic illustration showing a vertical cross sectional view along the longitudinal direction in a state when light transmission paths are connected to the communication light detecting device shown in FIG. 11A.

FIG. 11A is a schematic illustration showing a vertical cross sectional view along the longitudinal direction of an exemplary principal portion in a communication light detecting device according to a sixth embodiment. FIG. 11B is a schematic illustration showing a vertical cross section along the lateral direction of line B11-B11 in FIG. 11A. FIG. 11C is a schematic illustration showing a vertical cross sectional view along the longitudinal direction in a state when light transmission paths are connected to the communication light detecting device shown in FIG. 11A. As shown in FIG. 11A through FIG. 11C, the communication light detecting device 601 according to the sixth embodiment is provided with an optical coupling body 604 and sleeves 109a and 109b, and the both end portions of the optical coupling body 604 are respectively inserted into the sleeves 109a and 109b and secured thereto. In the following explanation, an instance where two sleeves 109a and 109b are used will be explained, however, the number of the sleeves is not limited thereto, for example, a single long sleeve can be used.

To both end faces of the optical coupling body 604, when the communication light detecting device 601 is in use, the ferrule 110c provided for an optical connector on the installation side and the ferrule 110y provided for an optical connector on the user side are respectively inserted and butt connected. In the ferrule 110c the optical fiber 111c on the installation side serving as the light transmission path is built in; and in the ferrule 110y the optical fiber 111y on the user side serving as the light transmission path is built in.

The sleeve 109a is for positioning the optical axes of the ferrule 110c and the optical coupling body 604; and the sleeve 109b is for positioning the optical axes of the ferrule 110y and the optical coupling body 604. Namely, the core portion 102 and the clad portion 103 in the optical coupling body 604 are disposed so as to align on a same straight line as the optical fibers 111c and 111y serving as the light transmission paths. Furthermore, as the sleeves 109a and 109b, it is preferable to use a material such as ceramics made and glass made which transmits the leakage light and scatters the leakage light when the same advances. Alternatively, a split sleeve of such as ceramics made, glass made and metal made having a split extending along the longitudinal direction (optical axis direction of the core portion 102 in the optical coupling body 604) of the sleeve can be used. As a ceramics that transmits the leakage light and scatters the leakage light when the same advances, for example, zirconia ceramics is enumerated.

The optical coupling body 604 includes: the core portion 102 for photo coupled through physical contacting connection with the core (the ends on the connection side of the optical fibers) of the optical fiber 111c and 111y serving as the light transmitting paths; the clad portion 103 made of a material having a lower refractive index than that of the core portion 102 and surrounding the core portion 102; and the ferrule 113 provided around the clad portion 103. Additionally, the optical coupling body 604 further includes the light extracting portion for extracting a part of communication light propagating through the core portion 102 as a leakage light. The light extracting portion for extracting the leakage light includes a light detecting use groove 614 formed so as to cut and separate at least the core portion 102, and a refractive index matching agent r2 is filled inside the light detecting use groove 614.

The communication light detecting device 601 is provided with a light detecting portion for detecting the leakage light extracted from the light extracting portion (the light detecting use groove 614 and the refractive index matching agent r2). In FIGS. 11A through 11C, as the light receiving member 106 constituting a part of the light detecting portion and receiving the leakage light, only the PD 118 provided with the PD element 117 is illustrated. The light receiving member 106 is collocated adjacent the optical coupling body 604 between the sleeves 109a and 109b, and arranged so that the PD element 117 for receiving the leakage light faces directly opposite to the light detecting use groove 614. From a viewpoint of cost, it is preferable to use an inexpensive Can package type as the PD 118.

The core portion 102 of the optical coupling body 604 is produced with a same material as the cores of the respective optical fibers 111c and 111y, for example, with a material prepared by adding germanium to quartz glass. The clad portion 103 is also produced with a same material as the clad of the respective optical fibers 111c and 111y, for example, with a material prepared from pure quartz glass. For the core portion 102 and the clad portion 103 of the optical coupling body 604, either an optical waveguide channel or an optical fiber can be used. In the present embodiment, an example where the ferrule 113 building in the optical fiber 112 is used as the optical coupling body 604 will be explained.

For the optical fiber 112 and the optical fibers 111c and 111y, it is preferable to use such as a single mode optical fiber and GI (graded index) type multimode optical fiber made of quartz glass. When the single mode optical fiber is used for the respective optical fibers 112, 111c and 111y, communication light having wavelength band of 1310 nm or 1550 nm is used. When the multimode optical fiber is used for the respective optical fibers 112, 111c and 111y, communication light having wavelength band of 850 nm or 1310 nm is used.

As the refractive index matching agent r2 to be filled inside the light detecting use groove 614, a refractive index matching agent having a refractive index substantially the same as that of the core in the respective optical fibers 111c and 111y is used. As the refractive index matching agent r2 to be filled in the light detecting use groove 614, liquid materials can be used as well as such as thermosetting resin, ultraviolet (UV) setting resin and adhesive which possess a substantially the same refractive index after hardening thereof as that of the core in the respective optical fibers 111c and 111y can be used.

Since both end faces of the optical coupling body 604 to which the light transmitting paths are connected are connected through physical contact with the end faces (end faces of optical fibers on the connection side) of the respective ferrules 110c and 110y that are inserted into the communication light detecting device 601, the both end faces are polished so as to serve as physical contacting end faces. The outer diameter of the optical coupling body 604 is same as the outer diameters of the respective ferrules 110c and 110y. Besides, the ferrule 110c is built-in in an optical connector (633c, see FIG. 13A which will be explained later) on the installation side and the ferrule 110y is built-in in an optical connector (633y, see FIG. 13A which will be explained later) on the user side. These ferrules 110c and 110y are made of ceramics or metals and end faces thereof (end faces of optical fibers on the connection side) are polished so as to serve as physical contacting end faces.

In connection with the light detecting use groove 614, the groove width w2 along the optical axis direction of the core portion 102 of the optical coupling body 604 is preferable to be 50 μm or more and 150 μm or less. When the groove width w2 is less than 50 μm, a leakage light generation rate becomes too small which makes difficult to detect the leakage light or which requires a separate amplifier when converting the received leakage light into an electrical signal (which increases number of parts) and causes an inconvenience. On the other hand, when the groove width w2 exceeds 150 μm, the leakage light generation rate becomes too large (which increase transmission loss) to keep a stable communication.

Figure 14:
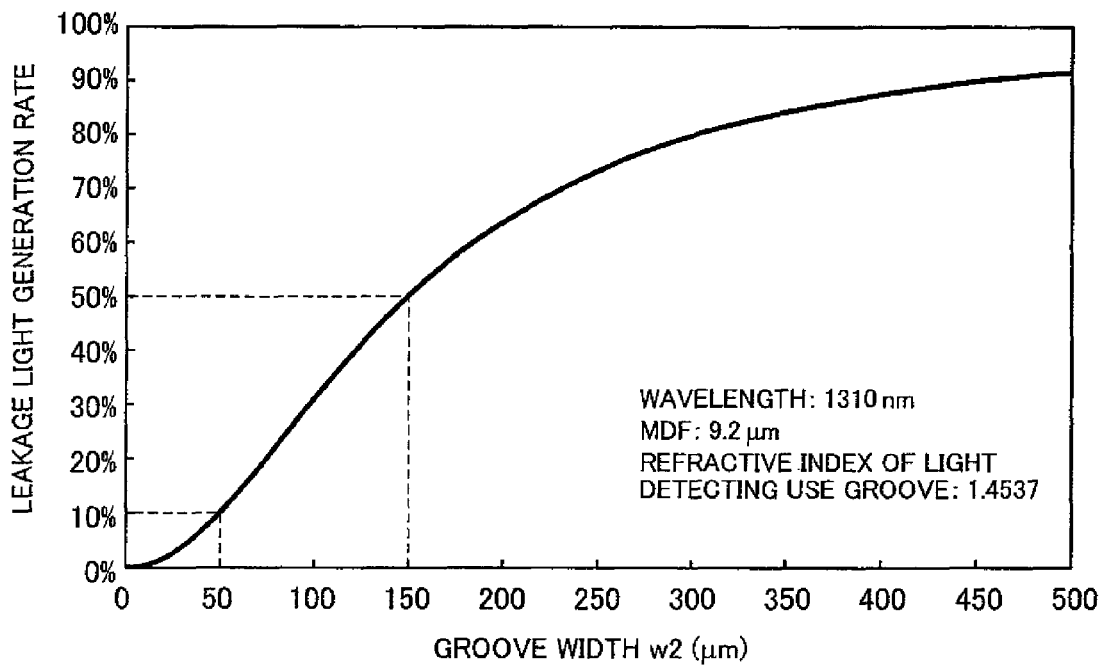
FIG. 14 is a graph showing a relationship between groove width w2 of a light detecting use groove and leakage light generation rate.

Leakage light generation rate with respect to the groove width of the light detecting use groove was measured in an instance when the wave length of the communication light is set at 1310 nm, MFD (mode field diameter) of the optical fiber 112 in the optical coupling body 604 at 9.2 μm and the refractive index (refractive index of the refractive index matching agent r2) of inside the light detecting use groove 614 at 1.4537. FIG. 14 is a graph showing a relationship between groove width w2 of a light detecting use groove and leakage light generating rate. As shown in FIG. 14, when the groove width w2 is within the range from 50 to 150 μm, it was revealed that the generation rate of the leakage light generated from the light detecting use groove 614 was within the range from 10% to 50%. Considering both a transmission loss of the communication light and a leakage light detecting sensitivity, it is preferable to regulate the groove width w2 so that the leakage light generation rate assumes to be within the range from 10% to 40%, and further, it is more preferable to regulate the groove width w2 so that the leakage light generation rate assumes to be within the range from 20% to 30%. Besides, it was confirmed separately that a like relationship between a groove width w2 of a light detecting use groove and leakage light generation rate as shown in FIG. 14 was obtained even in instances other than when the wavelength of the communication light was set at 1310 nm.

Figure 12A:
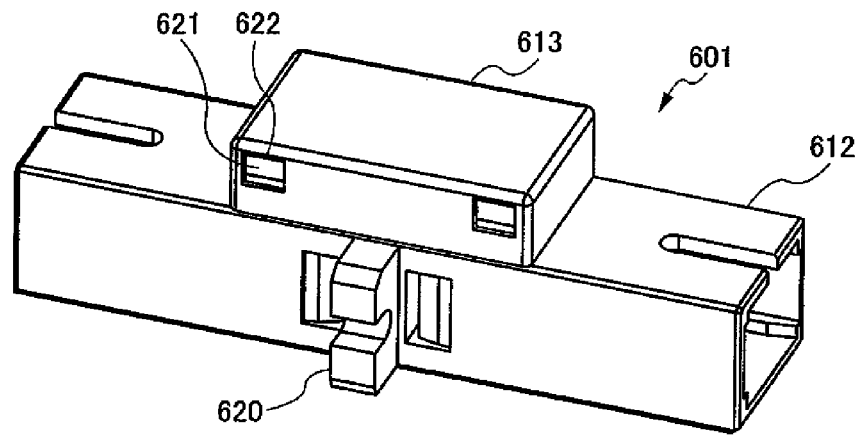
FIG. 12A is a schematic illustration showing an outlook perspective view of an example of a communication light detecting device according to the sixth embodiment.
Figure 12B:
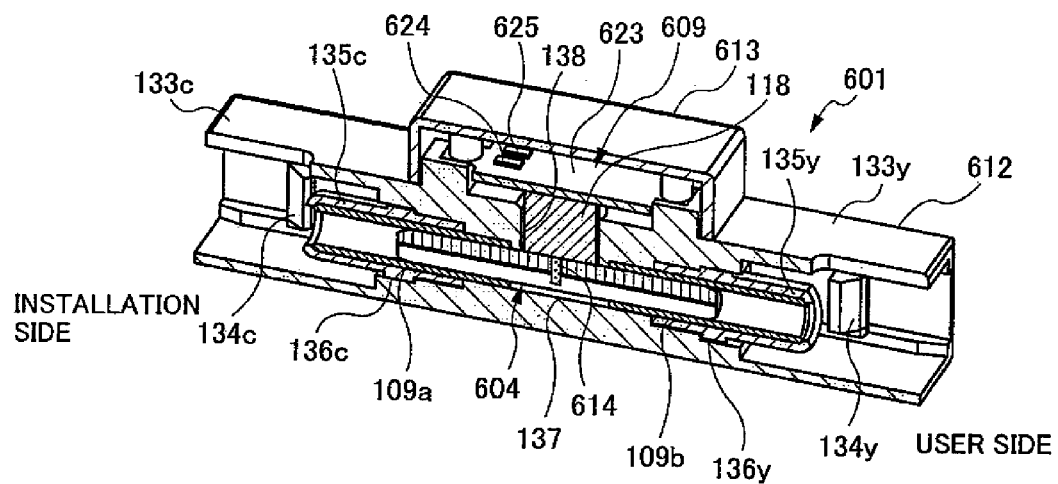
FIG. 12B is a schematic illustration showing a perspective view in vertical cross section along the longitudinal direction of the communication light detecting device shown in FIG. 12A.
Figure 12C:
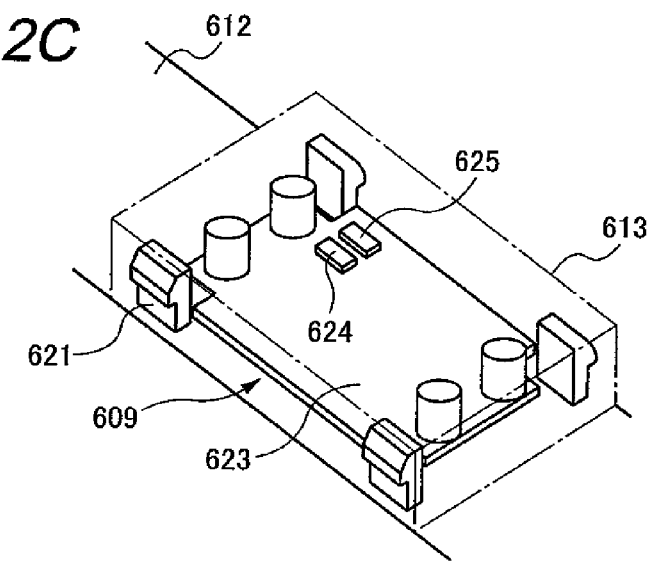
FIG. 12C is a schematic illustration showing a perspective view of an internal configuration of a light detecting portion in the communication light detecting device shown in FIG. 12A.

The communication light detecting device 601 according to the sixth embodiment will be explained in more detail. FIG. 12A is a schematic illustration showing an outlook perspective view of an example of a communication light detecting device according to the sixth embodiment. FIG. 12B is a schematic illustration showing a perspective view in vertical cross section along the longitudinal direction of the communication light detecting device shown in FIG. 12A. FIG. 12C is a schematic illustration showing a perspective view of an internal configuration of a light detecting portion in the communication light detecting device shown in FIG. 12A.

As shown in FIGS. 12A through 12C, the communication light detecting device 601 is an optical adaptor type communication light detecting device provided with a rectangular cylindrical shaped housing 612 for taking in the principal portion as explained with reference to FIGS. 11A through 11C and a box shaped cover 613 disposed on the housing 612 at the center thereof for covering the light detecting portion 609. Furthermore, the light detecting portion 609 is comprised of the light receiving member including: the PD 118; the light output member 624 which outputs a visible light when the invisible leakage light is received by the light receiving member; a failure detecting member 625 for informing existence and absence of a failure; and a circuit substrate 623 on which the light receiving member, the light output member 624 and the failure detecting member 625 are mounted to comprise a light detecting circuit.

One end portion (left side in FIGS. 12A and 12B) of the housing 612 serves as an optical connector adaptor 133c on the installation side and the other side (right side in FIGS. 12A and 12B) thereof serves as an optical connector adaptor 133y on the user side. In the optical connector adaptor 133c on the installation side, is provided a connector lock piece (SC attachment) 134c for securing an optical connector plug (633c, see FIG. 13 which will be explained later) on the installation side after inserting thereof. Likely, in the optical connector adaptor 133y on the user side, is provided a connector lock piece (SC attachment) 134y for securing an insertion and disinsertion free optical connector plug (633y, see FIG. 13 which will be explained later) on the user side.

On the depth side (on the side of the optical coupling body 604) from the connector lock piece 134c in the optical connector adaptor 133*c* on the installation side, a sleeve holder storage room 136*c* on the installation side is formed; and a sleeve holder 135*c* on the installation side is accommodated in the sleeve holder storage room 136*c* on the installation side. Likely, on the depth side (on the side of the optical coupling body 604) from the connector lock piece 134*y* in the optical connector adaptor 133*y* on the user side, a sleeve holder storage room 136*y* on the user side is formed; and a sleeve holder 135*y* on the user side is accommodated in the sleeve holder storage room 136*y* on the user side.

At the center portion in the housing 612, a main body storage room 137 is formed for taking in the sleeves 109*a* and 109*b*, and the optical coupling body 604 to be held inside between these sleeves 109*a* and 109*b*. And, in the main body storage room 137, a detecting device main body comprising the two sleeves 109*a* and 109*b* and the single optical coupling body 604 is accommodated. Adjacent the main body storage room 137 in the housing 612 (an upper portion in FIGS. 12A and 12B), a PD storage room 138 for taking in the PD 118 is formed. In the cover 613 the circuit substrate 623 is accommodated. Furthermore, the cover 613 is made of a substantially transparent material with respect to light (visible light) emitted from the light output member 624 and the failure detecting member 625.

On both side faces (two side ward faces in FIG. 12A) of the housing 612, attachment members 620 are formed for accommodating and securing the communication light detecting device 601 in an optical module disposed in the light communication related facility. On the upper face (the upward face in FIGS. 12A and 12B) of the housing 612, cover lock pieces 621 standing up from the upper face of the housing 612 and for securing the cover 613 on the housing 612 are provided. Moreover, on the both side faces of the cover 613, cover lock holes 622 are formed for fitting with the respective cover lock pieces 621.

It is preferable to use as the light output member 624 for discriminating existence and absence of communication light, e.g., a red color LED (light emitting diode) and to use as the failure detecting member 625 for detecting a circuit failure, e.g., a blue color LED. Thereby, the existence and absence discrimination of the communication light and the circuit failure detection are simply distinguished by viewing the color of the emitted light, which enhances the user friendliness of the communication light detecting device 601.

As a specific example, it is convenient to use an LED as the light output member 624 for discriminating existence and absence of communication light which lights on when communication light is propagating between the optical fibers 111*c* and 111*y* and lights off when not propagating. Furthermore, it is convenient to use an LED as the failure detecting member 625 for detecting circuit failure which lights on when the circuit substrate 623 fails or is not operating (e.g., because of no power supply) and lights off when the circuit is normal. In this instance, when only the LED for detecting circuit failure (the failure detecting member 625) lights on in blue (only blue light emitting LED is active), it is implied that the communication light detecting device 601 is not operating as well as communication light is in absence. On the other hand, when only the LED for discriminating existence and absence of communication light (the light output member 624) lights on in red (only red light emitting LED is active), it is implied that the communication light detecting device 601 is operating in normal as well as communication light is in existence. In this way, by making use of different color emitting LEDs, an advantage is obtained that such as failure of the communication light detecting device 601 and the existence and absence of communication light are simply and easily distinguished.

Figure 13:
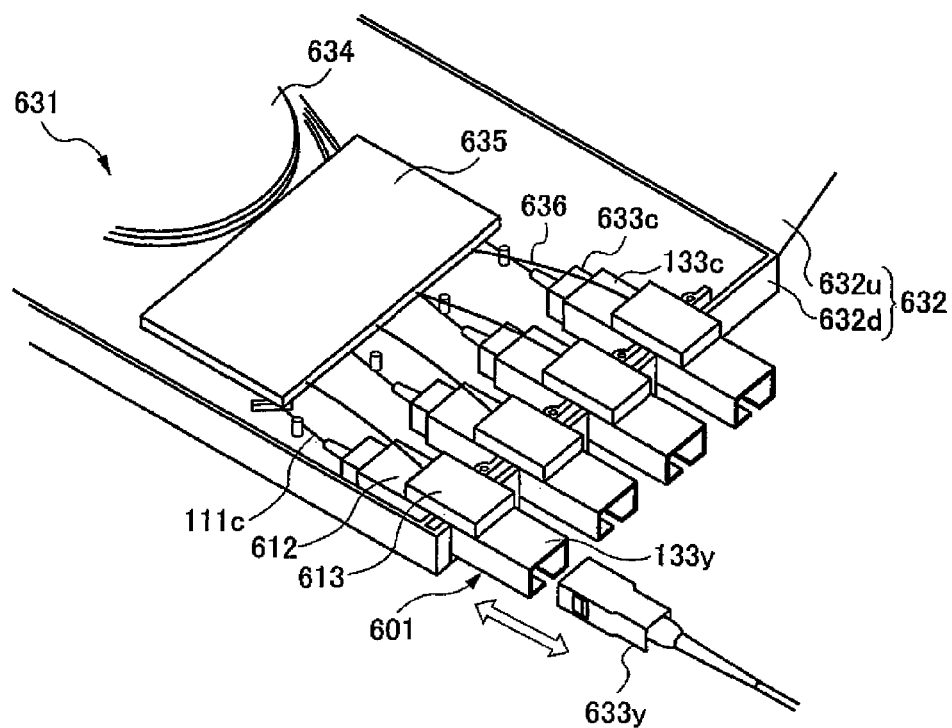
FIG. 13 is a schematic illustration showing a perspective view of an internal configuration of an exemplary optical module using the communication light detecting device shown in FIG. 12A.

Now, an example of an optical module which makes use of the communication light detecting device 601 will be explained. FIG. 13 is a schematic illustration showing a perspective view of an internal configuration of an exemplary optical module using the communication light detecting device shown in FIG. 12A.

As shown in FIG. 13, an optical module (optical pre-wiring module) 631 accommodates in its casing 632 a plurality of communication light detecting devices 601 (in FIG. 13, four devices). As examples of the optical module 631, such as a light collecting device, a light termination box and an overhead light closure are enumerated which are disposed inside an optical communication related facility. The casing 632 is comprised of, for example, a box shaped bottom casing (optical fiber storage tray) 632*d* and a lid 632*u* provided in open and close free with respect to the bottom casing 632*d*. In the present embodiment, it is preferable that the lid 632*u* is made of a substantially transparent material with respect to light emitted from the LED for discriminating existence and absence of communication light (the light output member 624) and the LED for detecting circuit failure (the failure detecting member 625) referred to above.

At a side portion of the bottom casing 632*d*, the communication light detecting devices 601 are accommodated and secured in a manner to project the respective optical connector adaptors 133*y* on the user side from the side face of the bottom casing 632*d*. For the respective optical connector adaptors 133*y* on the user side, optical connector plugs 633*y* on the user side in which the optical fiber 111*y* and the ferrule 110*y* are built in (see FIG. 11C) are respectively provided in insertion and disinsertion free manner. For the optical connector comprised of the optical connector adaptor 133*y* on the user side and the optical connector plug 633*y* on the user side, an SC optical connector is preferably used. On the other hand, to the optical connector adaptors 133*c* on the installation side of the respective communication light detecting devices 601, optical connector plugs 633*c* on the installation side in which the optical fiber 111*c* and the ferrule 110*c* are built in (see FIG. 11C) are respectively inserted and secured.

In the bottom casing 632*d*, a fiber extra length storage portion 634 is provided for taking in an extra length of the optical fiber 111*c* extending from the optical connector 133*c* on the installation side. A plurality of the respective optical fibers 111*c* are bundled via the fiber extra length storage portion 634 as an optical fiber cable and are connected to an external of the optical module 631. Furthermore, between the respective communication light detecting devices 601 and the fiber extra length storage portion 634 in the bottom casing 632*d* a power supply portion 635 for supplying electric power to the light detecting portion 609 is provided. The power supply portion 635 and the respective circuit substrates 623 of the communication light detecting devices 601 are connected via respective power supply cables 636. For the power supply portion 635, it is preferable to use such as a battery and a solar panel.

When using the optical module 631, to an optical connector adaptor 133*y* on the user side corresponding to a light transmission path desired to use, an optical connector plug 633*y* on the user side is inserted and secured. Thereby, the optical fiber 111*y* on the user side and the optical fiber 111*c* on the installation side serving as the light transmission path are photo coupled (see FIG. 1C).

Figure 15:
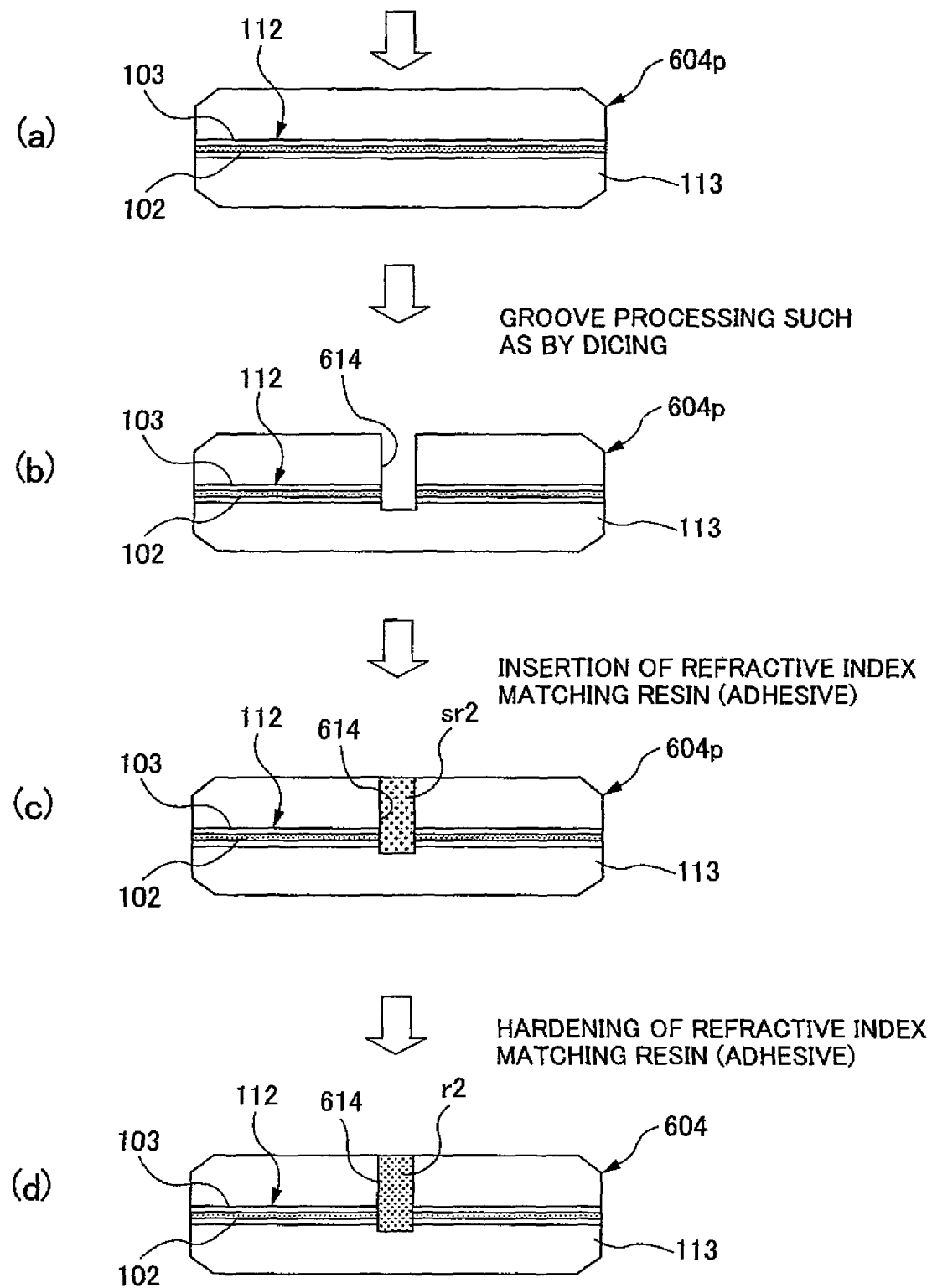
FIG. 15 is a schematic illustrations showing vertical cross sectional views along the longitudinal direction of an exemplary manufacturing process of an optical coupling body provided in the communication light detecting device according to the sixth embodiment.

Next, an example of manufacturing methods for the optical coupling body 604 will be explained. FIG. 15 is schematic illustrations showing vertical cross sectional views along the longitudinal direction of an exemplary manufacturing process of an optical coupling body provided in the communication light detecting device according to the sixth embodiment.

At first, as shown in FIG. 15(a), a pre optical coupling body 604p consisting of the core portion 102, the clad portion 103 and the ferrule 113 is prepared. At this instance, as mentioned previously, a ferrule 112 building in an optical fiber 112 can be used. Subsequently, as shown in FIG. 15(b), by applying such as a dicing processing and etching processing to the pre optical coupling body 604p, a light detecting use groove 614 is formed. And then, as shown in FIG. 15(c), an unhardened refractive index matching agent sr2 is filled inside the light detecting use groove 614. Thereafter, the filled unhardened refractive index matching agent sr2 is subjected to such as heat treatment and drying treatment or by irradiating UV to harden the same, thereby, the optical coupling body 604 is obtained, as shown in FIG. 15(d).

Now, the functions and advantages of the present embodiment will be explained while putting in mind the optical module 631 using the communication light detecting device according to the sixth embodiment. In the optical module 631, it is assumed that the optical connector plug 633y on the user side is inserted and secured to the optical connector adaptor 133y on the user side desired to use, and communication is directed from the installation side to the user side.

As shown in FIG. 11C, the communication light passes through the optical fiber 111c in the ferrule 110c built-in in the optical connector on the installation side, and reaches the light detecting use groove 614 in the optical coupling body 604. When the communication light makes incident in the light detecting use groove 614, a part of the communication light spreads from an end face of the core portion 102 to form a leakage light. This spread leakage light is received via the refractive index matching agent r2 filled in the light detecting use groove 614 by the PD element 117 of the PD 118 in the light receiving member 106 and is converted into an electrical signal. The electrical signal is transmitted through the circuit substrate 623 and is output from the light output member 624 in the light detecting portion 609 in a visible light.

Since the worker can confirm existence and absence of the visible light by viewing the same, the worker can easily recognize which light transmission paths in the optical module 631 is in use or not. Needless to say, the same is true when the communication is directed from the user side to the installation side.

As has been explained hitherto, in the communication light detecting device 601 according to the sixth embodiment, the optical coupling body 604 having the light detecting use groove 614 serving as the light extracting portion is collocated inside the sleeves 109a and 109b, and the end faces of the optical fiber 111c on the installation side and the optical fiber 111y on the user side which are inserted when the communication light detecting device 601 is in use are physical contact connected with the end faces of the optical coupling body 604. For this reason, since the stress applied to the light detecting use groove 614 (the resin r2 inside the light detecting use groove 614) hardly varies even when an optical connector is inserted or disinserted, such as variation of the groove width w2 of the light detecting use groove 614 and peeling off of the resin r2 are eliminated, which result in an enhancement of a device reproducibility and long term reliability of the communication light detecting device 601.

Furthermore, since a commonly available optical fiber can be used as the core portion 102 and the clad portion 103, the optical coupling body 604 in the communication light detecting device 601 has attractive advantages in which the material cost can be reduced and the photo coupling with the optical fibers 111c and 111y serving as the light transmission paths can be performed simply and conveniently. In addition, as explained with reference to FIG. 15, the light extracting portion in the optical coupling body 604 can be manufactured with a simple manufacturing method such as by dicing processing, and its leakage light generation rate can be regulated with good reproducibility to a desired value by properly setting the groove width w2 of the light detecting use groove 614. The number of parts of such structure of the optical coupling body 604 can be limited in comparison with a conventional communication light detecting device, which leads to an advantage of cost reduction.

Moreover, in the communication light detecting device 601, the light receiving member 106 is collocated adjacent the optical coupling body 604 between the sleeves 109a and 109b, and the PD element 117 for receiving the leakage light is disposed to face directly opposite to the light detecting use groove 614. Therefore, a highly accurate positioning technique is not required in comparison with a conventional communication light detecting device which builds in the light receiving element in a light transmission path. This also leads to a reduction of assembling cost and to stable light detection sensitivity.

From the above explanation, the communication light detecting device 601 according to the sixth embodiment has delightful advantages in which the leakage light can be efficiently extracted with a simple structure that unnecessitates a highly accurate positioning technique (namely, with a low cost) and the light detection sensitivity of the leakage light at the light receiving member 106 can be enhanced. Furthermore, in the communication light detecting device 601, since the light detecting portion 609 includes such as the light output member 624 and the failure detecting member 625 which emit a visible light, an advantage is obtained that even when the communication light is invisible, a worker can easily and visually discriminate use or nonuse condition of the light transmission path and existence and absence of a failure in the communication light detecting device 601.

Seventh Embodiment of the Present Invention

Figure 16A:
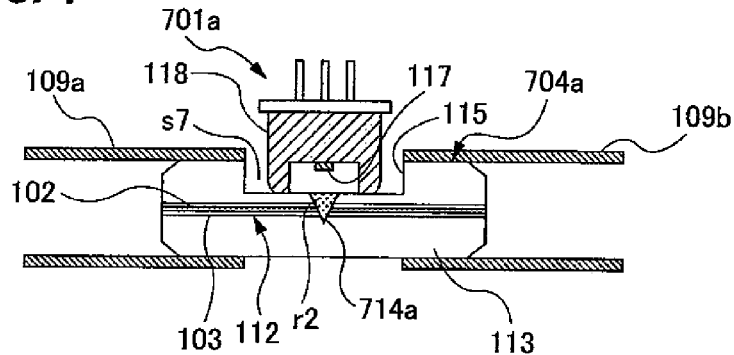
FIG. 16A is a schematic illustrations showing a vertical cross sectional view along the longitudinal direction of an exemplary principal portion in a communication light detecting device according to a seventh embodiment.
Figure 16B:
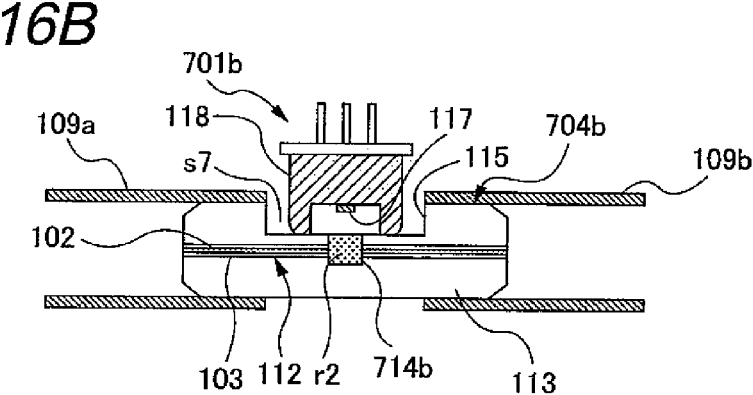
FIG. 16B is a schematic illustrations showing a vertical cross sectional view along the longitudinal direction of another exemplary principal portion in a communication light detecting device according to the seventh embodiment.
Figure 17:
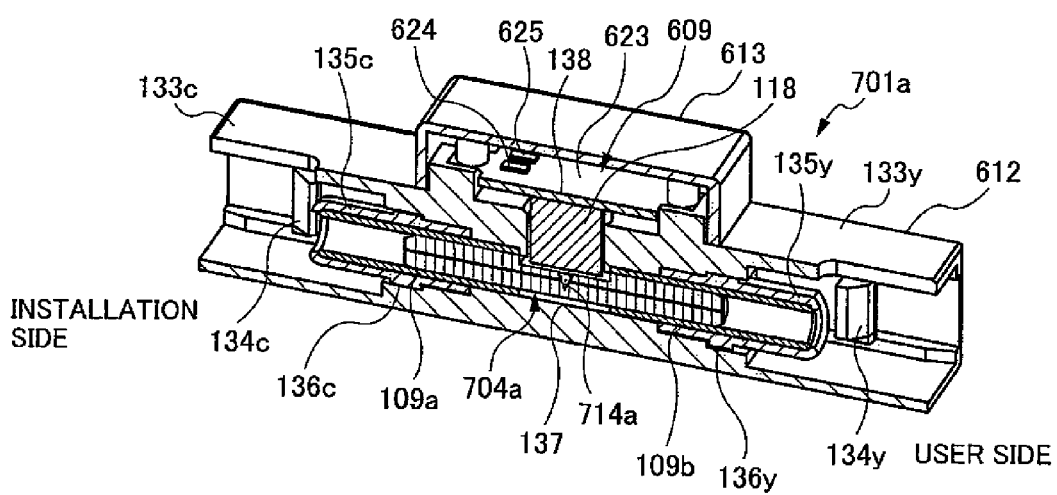
FIG. 17 is a schematic illustrations showing a perspective view in vertical cross section along the longitudinal direction of the communication light detecting device shown in FIG. 16A.

FIG. 16A is a schematic illustrations showing a vertical cross sectional view along the longitudinal direction of an exemplary principal portion in a communication light detecting device according to a seventh embodiment. FIG. 16B is a schematic illustrations showing a vertical cross sectional view along the longitudinal direction of another exemplary principal portion in a communication light detecting device according to the seventh embodiment. FIG. 17 is a schematic illustrations showing a perspective view in vertical cross section along the longitudinal direction of the communication light detecting device shown in FIG. 16A.

As shown in FIGS. 16A, 16B and 17, in the communication light detecting devices 701a and 701b, the container groove 115 for taking in a part of the PD 118 is formed in the ferules 113 of the respective photo coupling bodies 704a and 704b, and at the bottom of the container groove 115 the respective light detecting use grooves 714a and 714b are formed. This is because for enhancing a light detecting sensitivity by locating the PD 118 close to the optical fiber 112, in other words, by locating the PD element 117 close to a leakage light generating region (both side faces of the light detecting use grooves 714a and 714b, in that interfaces between the light detecting use grooves 714a and 714b and the optical fiber 112).

As the light detecting use grooves to be formed, as shown in FIGS. 16A and 17, the light detecting use groove 714a having a substantially V shape seen when the optical coupling body 704a is vertically cross sectioned along the longitudinal direction can be used, as well as, as shown in FIG. 16B, the light detecting use groove 714b having a substantially rectangular shape seen when the optical coupling body 704b is vertically cross sectioned along the longitudinal direction can be used. When the light detecting use groove 714a having a substantially V shape is used, since both side faces of the light detecting use groove 714a (the interfaces between the light detecting use groove 714a and the optical fiber 112) are directed toward the PD element 117, an advantage is obtained that the leakage light easily makes incident to the PD element 117. Moreover, by setting the groove configuration of substantially V shape as substantially the same as the blade shape for the dicing, an advantage is obtained that the formation of the light detecting use groove is further simplified.

In addition to the above advantages, in the communication light detecting devices 701a and 701b, the container groove 115 also performs a role of positioning when mounting the PD 118. In addition further, by filling a refractive index matching agent r2 in a gap s7 between the container groove 115 and the PD 118 and by hardening the same, the PD 118 can be secured further reliably in the container groove 115. The other functions and advantages achieved by the present embodiment are the like as those of the communication light detecting device 601 according to the sixth embodiment.

Eighth Embodiment of the Present Invention

Figure 18A:
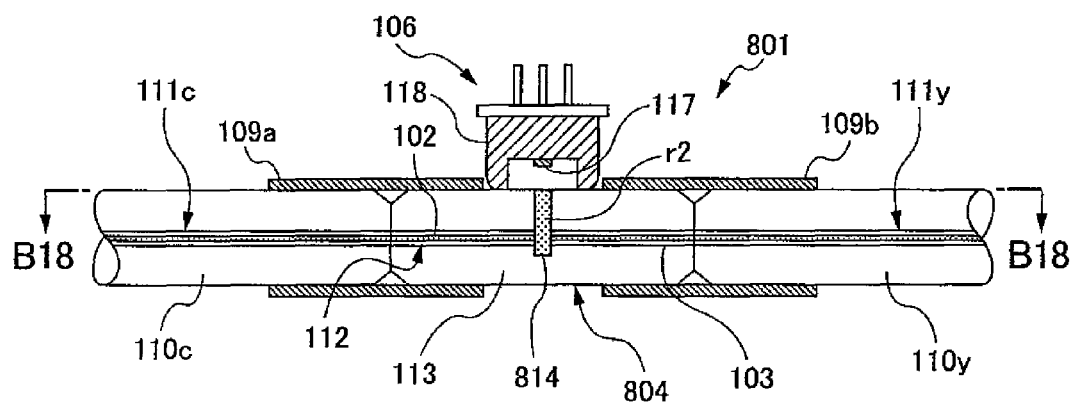
FIG. 18A is a schematic illustration showing a vertical cross sectional view along the longitudinal direction of an exemplary principal portion in a communication light detecting device according to an eighth embodiment and shows a state when light transmission paths are connected to the communication light detecting device.
Figure 18B:
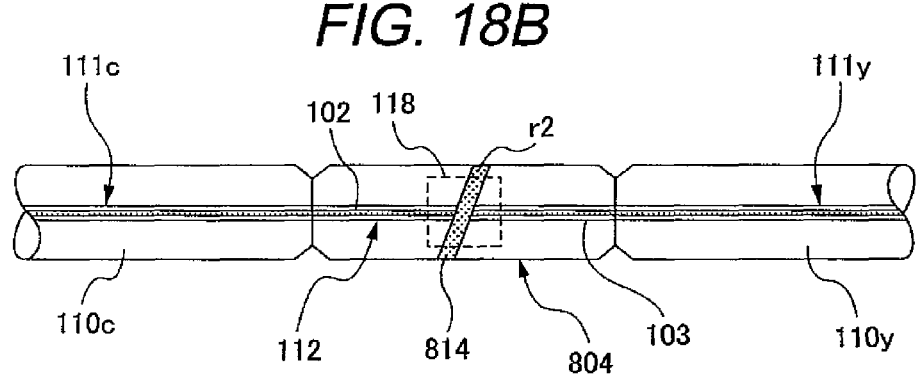
FIG. 18B is a schematic illustration showing a plane view seen from line B18-B18 in FIG. 18A.

FIG. 18A is a schematic illustration showing a vertical cross sectional view along the longitudinal direction of an exemplary principal portion in a communication light detecting device according to an eighth embodiment and shows a state when light transmission paths are connected to the communication light detecting device. FIG. 18B is a schematic illustration showing a plane view seen from line B18-B18 in FIG. 18A.

As shown in FIGS. 18A and 18B, in the communication light detecting device 801 according to the eighth embodiment, an optical coupling body 801 is provided in which a light detecting use groove 814 is formed to be in diagonal (in slanting manner) with respect to the optical axis direction of the core portion 102. This is because for enhancing a light detecting sensitivity at the PD 118 by enhancing a directivity of the leakage light. Furthermore, when communication light makes incident to a side face of the light detecting use groove 814 (an interface between the light detecting use groove 814 and the optical fiber 112), reflection of the communication light toward the light incident direction can be prevented. The other functions and advantages achieved by the present embodiment are the like as those of the communication light detecting device 601 according to the sixth embodiment.

Ninth Embodiment of the Present Invention

Figure 19:
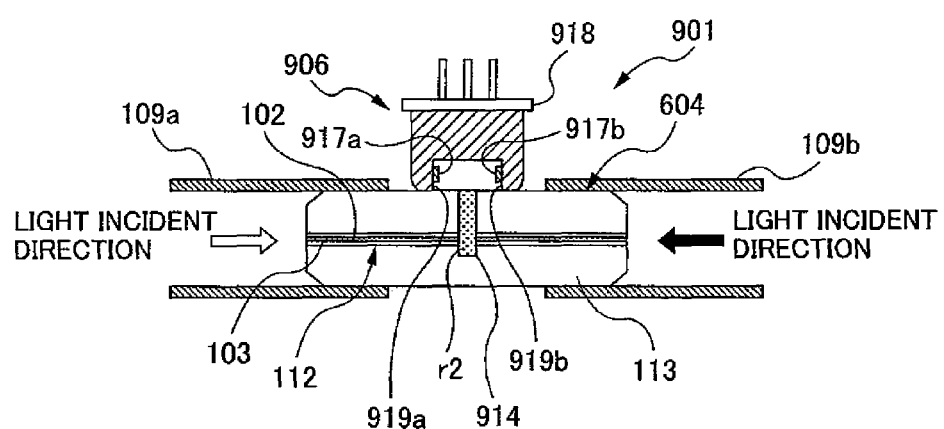
FIG. 19 is a schematic illustration showing a vertical cross sectional view along the longitudinal direction of an exemplary principal portion in a communication light detecting device according to a ninth embodiment.

FIG. 19 is a schematic illustration showing a vertical cross sectional view along the longitudinal direction of an exemplary principal portion in a communication light detecting device according to a ninth embodiment. As shown in FIG. 19, in place of the PD 118 having single PD element 117 in the communication light detecting device 601 according to the sixth embodiment, a light receiving member 906 in the communication light detecting device 901 according to the ninth embodiment is comprised by making use of a PD 918 having two PD elements 917a and 917b. The PD element 917a in the PD 918 is collocated on an inside wall 919a on the installation side of the PD 918 and receives primarily the leakage light of the communication light (solid black arrow in FIG. 19) making incident from the user side. On the other hand, the PD element 917b in the PD 918 is disposed on an inside wall 919b on the user side of the PD 918 and receives primarily the leakage light of the communication light (solid white arrow in FIG. 19) making incident from the installation side.

By making use of such PD 918 for the light receiving member 906 in the communication light detecting device 901, the leakage light having a vector component along the optical axis direction of the core portion 102 in the optical coupling body 604 is likely to be received. Thereby, the position of the PD showing the maximum detection sensitivity is almost independent from the light incident direction, and an advantage is obtained that the light detecting sensitivity can be enhanced. Furthermore, an advantage is obtained that the communicating direction of the communication light can be discriminated. Besides, although the PD elements 917a and 917b are disposed on the inside walls 919a and 919b of the PD 918 in FIG. 19, the disposition is not limited thereto. The PD elements can be properly disposed at any positions where the detection sensitivity of the leakage light from the light detecting use groove 614 is maximized.

Tenth Embodiment of the Present Invention

Figure 20:
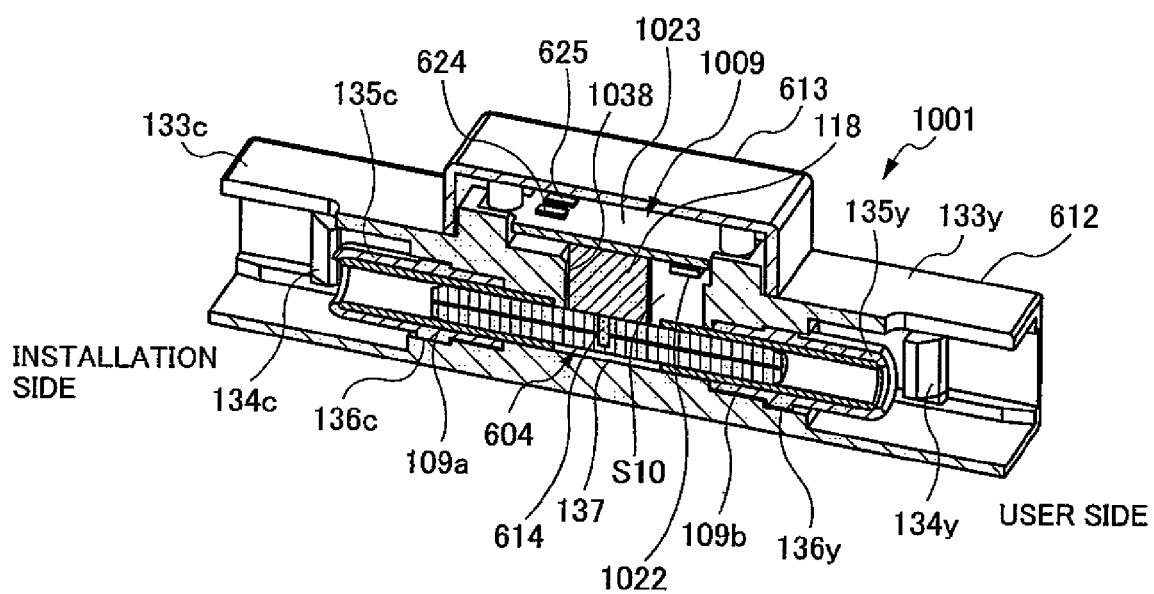
FIG. 20 is a schematic illustrations showing a perspective view in vertical cross section along the longitudinal direction of a communication light detecting device according to a tenth embodiment.

FIG. 20 is a schematic illustrations showing a perspective view in vertical cross section along the longitudinal direction of a communication light detecting device according to a tenth embodiment. As shown in FIG. 20, in place of the light detecting portion 609 in the communication light detecting device 601 according to the sixth embodiment, the communication light detecting device 1001 according to the tenth embodiment is provided with a light detecting portion 1009 having a light detecting portion failure diagnosis member 1022 for diagnosing existence and absence of a failure of the light detecting portion such as the PD 118 and having the light output member 624. As the light detecting portion failure diagnosis member 1022, for example, a light detecting portion failure diagnosis use LED which turns ON/OFF by a switch can be used.

In the communication light detecting device 1001, as shown in FIG. 20, adjacent a PD storage room 1038 in the housing 612, a space S10 is defined by one side face of the PD 118, by the circuit substrate 623 and by the sleeve 109b, and in the space S10, the light detecting portion failure diagnosis member 1022 is mounted on the circuit substrate 623 so as to face the sleeve 109b. When a worker turns ON a switch (not shown) for the light detecting portion failure diagnosis member 1022, light used for failure diagnosis is emitted from the light detecting portion failure diagnosis member 1022 to the sleeve 109b, and the light used for failure diagnosis is reflected (or scattered) by the sleeve 109b and makes incident to the PD element 117 of the PD 118.

In a condition when the light detecting portion 1009 such as the PD 118 and the light output member 624 is normal (not in failure), when the PD element 117 receives the light used for failure diagnosis, a visible light is emitted from the light output member 624. By visually recognizing the emitted light from the light output member 624 the worker can judge that such as the PD 118 and the light output member 624 are not in failure. On the other hands when the light detecting portion 1009 such as the PD 118 and the light output member 624 are in failure, even when the worker turns ON the switch for the light detecting portion failure diagnosis member 1022, no visible light is emitted from the light output member 624, thereby, the worker can judge that such as the PD 118 and the light output member 624 are in failure.

Eleventh Embodiment of the Present Invention

Figure 21A:
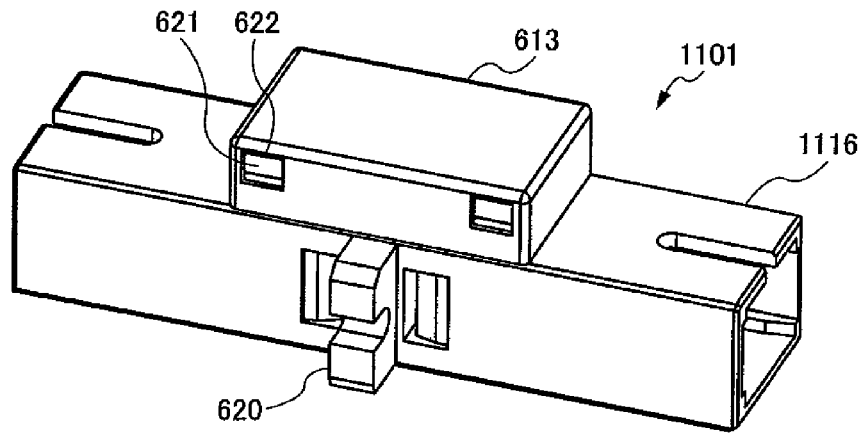
FIG. 21A is a schematic illustrations showing an outlook perspective view of an example of a communication light detecting device according to an eleventh embodiment.
Figure 21B:
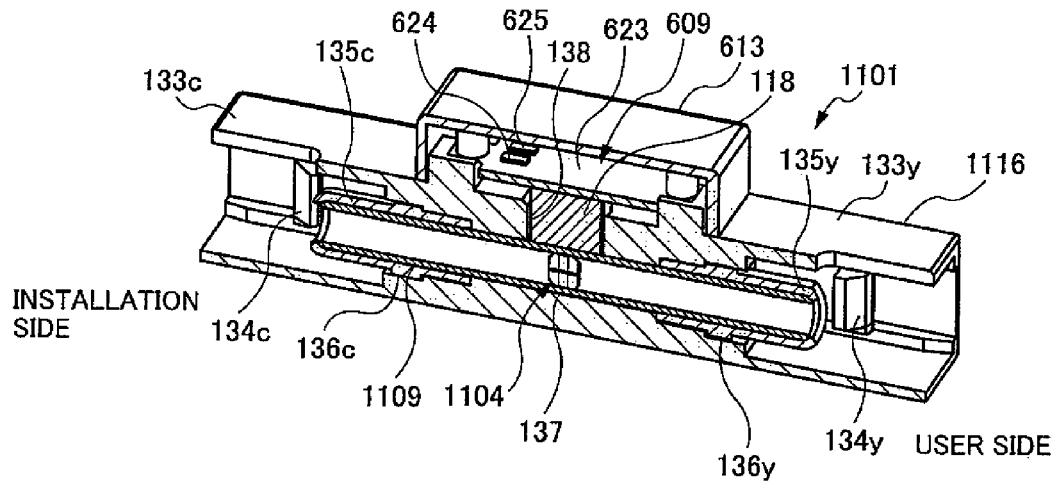
FIG. 21B is a schematic illustrations showing a perspective view in vertical cross section along the longitudinal direction of the communication light detecting device shown in FIG. 21A.
Figure 21C:
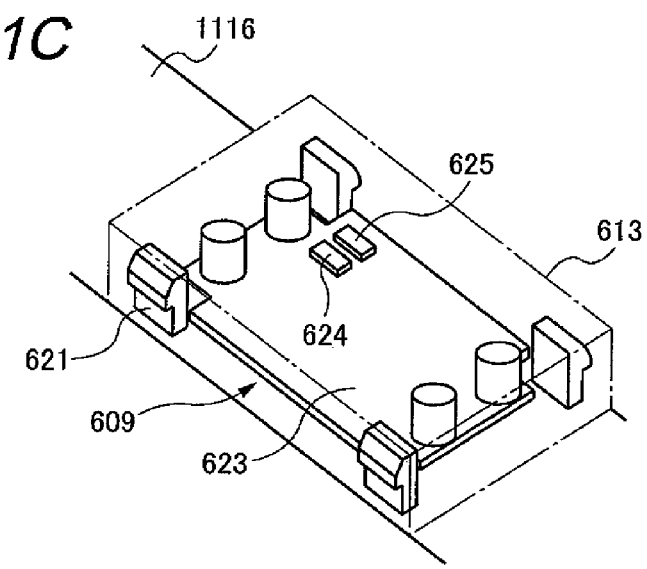
FIG. 21C is a schematic illustrations showing a perspective view of an internal configuration of a light detecting portion in the communication light detecting device shown in FIG. 21A.

FIG. 21A is a schematic illustrations showing an outlook perspective view of an example of a communication light detecting device according to an eleventh embodiment; FIG. 21B is a schematic illustrations showing a perspective view in vertical cross section along the longitudinal direction of the communication light detecting device shown in FIG. 21A; and FIG. 21C is a schematic illustrations showing a perspective view of an internal configuration of a light detecting portion in the communication light detecting device shown in FIG. 21A. As shown in FIGS. 21A through 21C, the communication light detecting device 1101 according to the eleventh embodiment is an optical adaptor type communication light detecting device provided with a rectangular cylindrical shaped housing 1116 for taking in the principal portion and the box shaped cover 613 disposed on the housing 1116 at the center thereof for covering the light detecting portion 609. Furthermore, the light detecting portion 609 is comprised of the light receiving member including: the PD 118; the light output member 624 which outputs a visible light when the invisible leakage light is received by the light receiving member; the failure detecting member 625 for informing existence and absence of failure; and the circuit substrate 623 on which are mounted the light receiving member, the light output member 624 and the failure detecting member 625 to comprise a light detecting circuit.

One end portion (left side in FIGS. 21A and 21B) of the housing 1116 serves as the optical connector adaptor 133c on the installation side and the other side (right side in FIGS. 21A and 21B) thereof serves as the optical connector adaptor 133y on the user side. In the optical connector adaptor 133c on the installation side, is provided the connector lock piece (SC attachment) 134c for securing an optical connector plug (633c, see FIG. 23 which will be explained later) on the installation side after inserting thereof. Likely, in the optical connector adaptor 133y on the user side, is provided the connector lock piece (SC attachment) 134y for securing an insertion and disinsertion free optical connector plug (633y, see FIG. 23 which will be explained later) on the user side.

On the depth side (on the side of the optical coupling body 1104) from the connector lock piece 134c in the optical connector adaptor 133c on the installation side, the sleeve holder storage room 136c on the installation side is formed; and the sleeve holder 135c on the installation side is accommodated in the sleeve holder storage room 136c on the installation side. Likely, on the depth side (on the side of the optical coupling body 1104) from the connector lock piece 134y in the optical connector adaptor 133y on the user side, the sleeve holder storage room 136y on the user side is formed; and the sleeve holder 135y on the user side is accommodated in the sleeve holder storage room 136y on the user side.

At the center portion in the housing 1116, a main body storage room 137 is formed for taking in single sleeve 1109 and an optical coupling body 1104 to be held inside the sleeve 1109. And, in the main body storage room 137, a detecting device main body comprising the single sleeve 1109 and the optical coupling body 1104 is accommodated. Adjacent the main body storage room 137 in the housing 1116 (an upper portion in FIGS. 21A and 21B), a PD storage room 138 for taking in the PD 118 is formed. In the cover 613 the circuit substrate 623 is accommodated. Furthermore, the cover 613 is made of a substantially transparent material with respect to light (visible light) emitted from the light output member 624 and the failure detecting member 625.

On both side faces (two side ward faces in FIG. 21A) of the housing 1116, attachment members 620 are formed for accommodating and securing the communication light detecting device 1101 in an optical module disposed in the light communication related facility. On the upper face (the upward face in FIGS. 21A and 21B) of the housing 1116, cover lock pieces 621 standing up from the upper face of the housing 1116 and for securing the cover 613 on the housing 1116 are provided. Moreover, on the both side faces of the cover 613, cover lock holes 622 are formed for fitting with the respective cover lock pieces 621.

It is preferable to use as the light output member 624 for discriminating existence and absence of communication light, e.g., a red color LED (light emitting diode) and to use as the failure detecting member 625 for detecting a circuit failure, e.g., a blue color LED. Thereby, the existence and absence discrimination of the communication light and the circuit failure detection are simply distinguished by viewing the color of the emitted light, which enhances the user friendliness of the communication light detecting device 1101.

As a specific example, it is convenient to use an LED as the light output member 624 for discriminating existence and absence of communication light which lights on when communication light is propagating between the optical fibers 111c and 111y (see FIG. 22A which will be explained later) and lights off when not propagating. Furthermore, it is convenient to use an LED as the failure detecting member 625 for detecting circuit failure which lights on when the circuit substrate 623 fails or is not operating (e.g., because of no power supply) and lights off when the circuit is normal. In this instance, when only the LED for detecting circuit failure (the failure detecting member 625) lights on in blue (only blue light emitting LED is active), it is implied that the communication light detecting device 1101 is not operating as well as communication light is in absence. On the other hand, when only the LED for discriminating existence and absence of communication light (the light output member 624) lights on in red (only red light emitting LED is active), it is implied that the communication light detecting device 1101 is operating in normal as well as communication light is in existence. In this way, by making use of different color emitting LEDs, an advantage is obtained that such as failure of the communication light detecting device 1101 and the existence and absence of communication light are simply and easily distinguished.

Figure 22A:
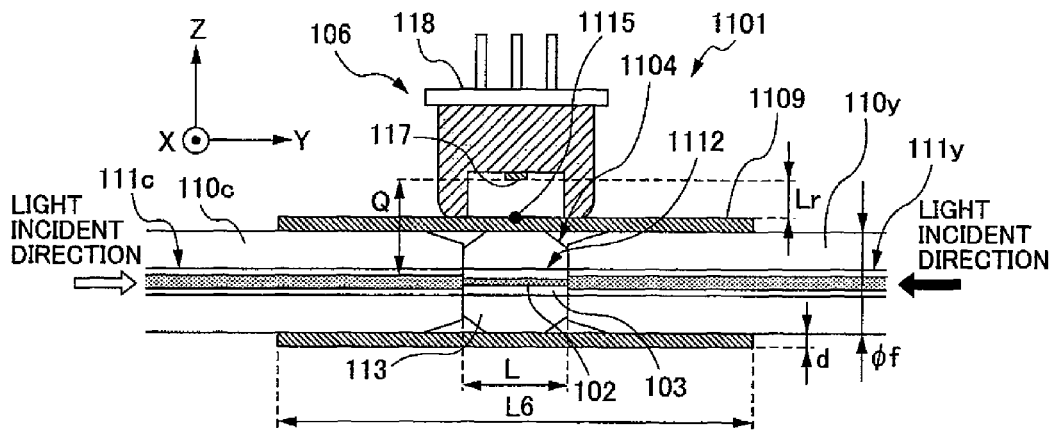
FIG. 22A is a schematic illustration showing a vertical cross sectional view along the longitudinal direction of an exemplary principal portion in a communication light detecting device according to the eleventh embodiment and shows a state when light transmission paths are connected to the communication light detecting device.
Figure 22B:
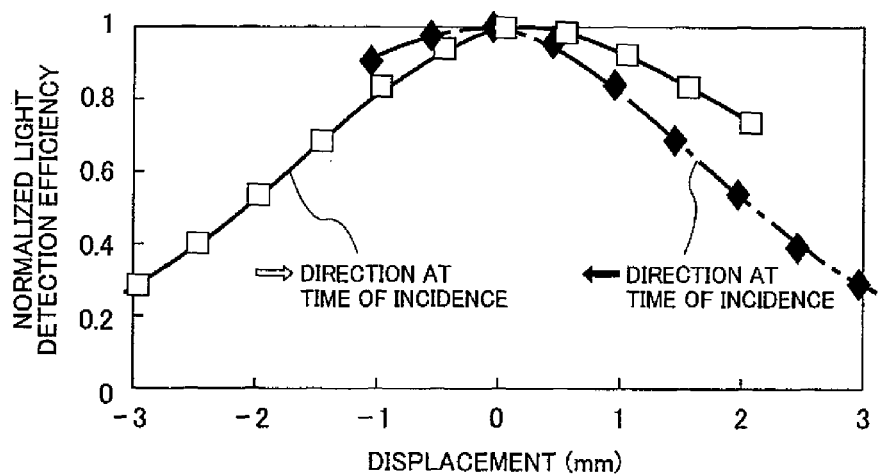
FIG. 22B is a graph showing a relationship between displacement of a PD element along the optical axis direction (Y axis direction) from a center position of an optical coupling body and normalized light detection efficiency.
Figure 22C:
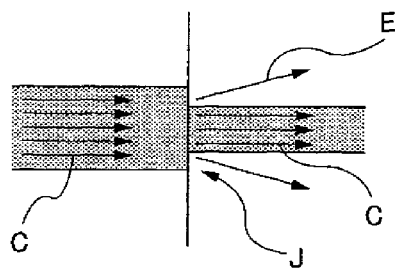
FIG. 22C is a schematic illustration showing a partially enlarged view in vertical cross section along the optical axis direction at a junction interface between the light transmission path and the optical coupling body shown in FIG. 22A.

FIG. 22A is a schematic illustration showing a vertical cross sectional view along the longitudinal direction of an exemplary principal portion in a communication light detecting device according to the eleventh embodiment and shows a state when light transmission paths are connected to the communication light detecting device. FIG. 22B is a graph showing a relationship between displacement of a PD element along the optical axis direction (Y axis direction) from a center position of an optical coupling body and normalized light detection efficiency. FIG. 22C is a schematic illustration showing a partially enlarged view in vertical cross section along the optical axis direction at a junction interface between the light transmission path and the optical coupling body shown in FIG. 22A.

As shown in FIG. 22A, the communication light detecting device 1101 according to the eleventh embodiment is provided with: a detecting device main body comprised of the single sleeve 1109 and the optical coupling body 1104; and the light receiving member 106 for detecting a leakage light leaking from the light extracting portion. The optical coupling body 1104 serves as the light extracting portion for extracting a part of communication light propagating through the light transmission path as a leakage light. At the time of use of the communication light detecting device 1101, to the both end faces of the optical coupling body 1104, the ferrule 110c provided for the optical connector on the installation side and the ferrule 110y provided for the optical connector on the user side are respectively inserted and butt connected. The optical fiber 111c on the installation side serving as the light transmission path is built-in in the ferrule 110c and the optical fiber 111y on the user side serving as the light transmission path is built-in in the ferrule 110y.

The optical coupling body 1104 includes: the core portion 102 photo coupled through physical contacting connection with the cores (end faces of optical fibers on the connection side) of the optical fibers 111c and 111y serving as the light transmission path; the clad portion 103 surrounding the core portion 102 and made of a material having a lower refractive index than that of the core portion 102; and the ferrule 113 provided around the clad portion 103. Herein, the present optical coupling body 1104 is characterized, in that although the outer diameter of the clad portion 103 (clad diameter) is same as the outer diameter of clad (clad diameter) of the optical fibers 111c and 111y, but the outer diameter of the core portion 102 (core diameter) is not same as the outer diameter of core (core diameter) of the optical fibers 111c and 111y.

The core portion 102 in the optical coupling body 1104 is produced with a same material as the cores of the respective optical fibers 111c and 111y, for example, with a material prepared by adding germanium to quartz glass. The clad portion 103 is also produced with a same material as the clad of the respective optical fibers 111c and 111y, for example, with a material prepared from pure quartz glass. In the present embodiment, an example where the ferrule 113 building in the optical fiber 112 is used as the optical coupling body 1104 will be explained.

For the optical fiber 112 and the optical fibers 111c and 111y, it is preferable to use such as a single mode optical fiber and GI (graded index) type multimode optical fiber made of quartz glass. When the single mode optical fiber is used for the respective optical fibers 112, 111c and 111y, communication light having wavelength band of 1310 nm or 1550 nm is used. When the multimode optical fiber is used for the respective optical fibers 112, 111c and 111y, communication light having wavelength band of 850 nm or 1310 nm is used.

The sleeve 1109 is for positioning the optical axes of the ferrule 110c, the optical coupling body 1104 and the ferrule 110y. Namely, the core portion 102 and the clad portion 103 in the optical coupling body 1104 are collocated so as to align on a same straight line as the optical fibers 111c and 111y serving as the light transmission paths. Furthermore, as the sleeve 1109, it is preferable to use a material such as ceramics made and glass made which transmits the leakage light and scatters the leakage light when the same advances. Alternatively, a split sleeve of such as ceramics made, glass made and metal made having a slit extending along the longitudinal direction (optical axis direction of the core portion 102 in the optical coupling body 1104) of the sleeve can be used. As a ceramics that transmits the leakage light and scatters the leakage light when the same advances, for example, zirconia ceramics is enumerated.

In FIG. 22A, as the light receiving member 106, only the PD 118 having the PD element 117 serving as a light receiving element is illustrated. The light receiving member 106 is collocated adjacent the sleeve 1109, a light receiving face of the PD element 117 for receiving the leakage light is disposed in parallel with the optical axis direction of the core portion 102 and the PD element 117 is collocated at the center position of the length L along the optical axis of the core portion 102 so as to face directly opposite thereto. From a viewpoint of cost, it is preferable to use an inexpensive Can package type as the PD 118.

Since both end faces of the optical coupling body 1104 to which the light transmitting paths are connected are connected through physical contact with the end faces (end faces of optical fibers on the connection side) of the respective ferrules 110c and 110y that are inserted into the communication light detecting device 1101, the both end faces are polished so as to serve as physical contacting end faces. The outer diameter of the optical coupling body 1104 is preferable to be same as the outer diameters $\phi f$ of the respective ferrules 110c and 110y or alternatively to be slightly smaller than that. Besides, the ferrule 110c is built-in in an optical connector (633c, see FIG. 23 which will be explained later) on the installation side and the ferrule 110y is built-in in an optical connector (633y, see FIG. 23 which will be explained later) on the user side. These ferrules 110c and 110y are made of ceramics or metals and end faces thereof (end faces of optical fibers on the connection side) are polished so as to serve as physical contacting end faces.

Since the core diameter of the optical fiber 111c and the core diameter of the core portion 102 are different each other, as shown in FIG. 22C, when the light incident direction is in the solid white arrow in FIG. 22A, and communication light C passes through a junction interface J, a part of the communication light C leaks leakage light E at the junction interface J between the optical coupling body 1104 and the optical fiber 111c. Herein, the generation of the leakage light E implies generation of transmission loss in optical communication, therefore it is desirable to set the core diameter of the core portion 102 in the optical coupling body 1104 properly (e.g., the transmission loss is in an order of about 1 to 2 dB) so that the transmission loss does not affect adversely to the optical communication. As the core portion 102 of the optical coupling body 1104, a core diameter of about 2 to 3 μm can be produced. Needless to say, the same is true in the instance when the light incident direction is in solid black direction in FIG. 22A.

FIG. 22B will be explained later.

In the communication light detecting device 1101 according to the eleventh embodiment, it is preferable that the length L of the core portion 102 along the optical axis direction is to be set substantially the same as distance Q between the core surface of the respective optical fibers 111c and 111y and the light receiving face of the PD element 117 (L is nearly equal to Q). In this instance, about 50% of the leakage light E makes incident to the PD 118, the detection sensitivity of the leakage light is optimized.

More specifically, when assuming that the diameters of the respective ferrules 110c and 110y are "$\phi f$", the core diameters of the respective optical fibers 111c and 111y are "$\phi c$", distance from light incident port 1115 of the PD 118 to the light receiving face of the PD element 117 is "Lr" and the thickness of the sleeve 1109 is "d", the distance "Q" between the core surface of the respective optical fibers 111c and 111y and the light receiving face of the PD element 117 is expressed as "$Q = Lr + d + (\phi f/2) - (\phi c/2)$". Besides, since the core diameter $\phi c$ of the optical fibers is sufficiently small, the same can be neglected. Generally, since the diameter of the ferrule is "$\phi f = 2.5$ mm", when assuming, e.g., the length Lr and the distance Q are respectively to be "about 2.35 mm+d", the detection sensitivity of the leakage light is optimized.

Figure 23:
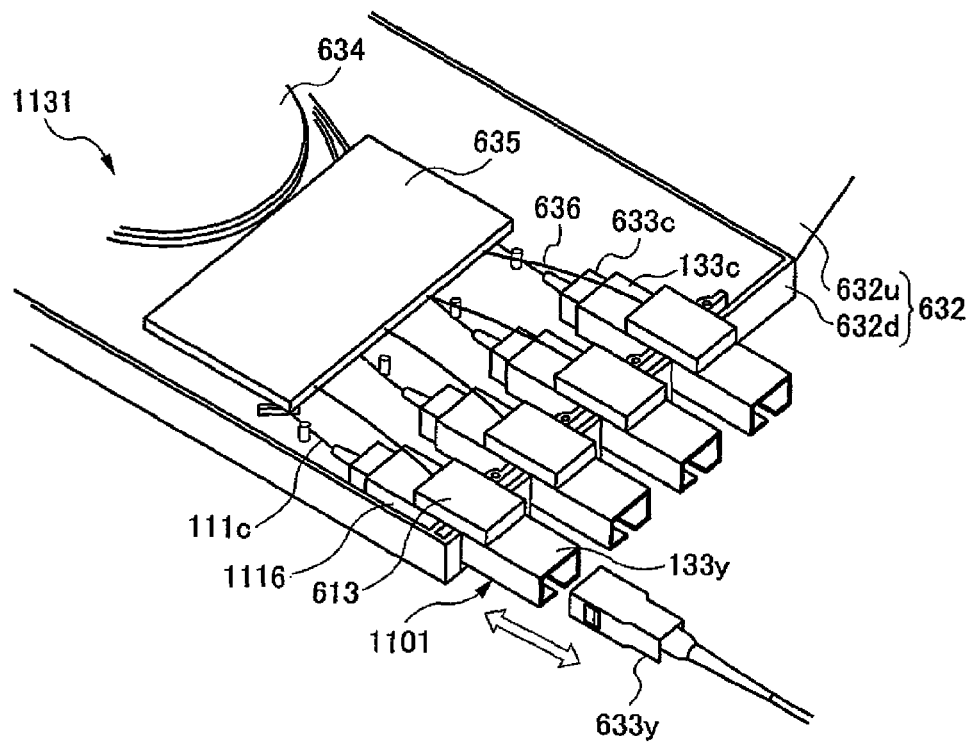
FIG. 23 is a schematic illustration showing a perspective view of an internal configuration of an exemplary optical module using the communication light detecting device shown in FIG. 21A.

Next, an example of an optical module which makes use of the communication light detecting device 1101 will be explained. FIG. 23 is a schematic illustration showing a perspective view of an internal configuration of an exemplary optical module using the communication light detecting device shown in FIG. 21A.

As shown in FIG. 23, an optical module (optical pre-wiring module) 1131 accommodates in its casing 632 a plurality of communication light detecting devices 1101 (in FIG. 23, four devices). As examples of the optical nodule 1131, such as a light collecting device, a light termination box and an overhead light closure are enumerated which are disposed inside an optical communication related facility. The casing 632 is comprised of, for example, a box shaped bottom casing (optical fiber storage tray) 632d and a lid 632u provided in open and close free with respect to the bottom casing 632d. In the present embodiment, it is preferable that the lid 632u is made of a substantially transparent material with respect to light emitted from the LED for discriminating existence and absence of communication light (the light output member 624) and the LED for detecting circuit failure (the failure detecting member 625) referred to above.

At a side portion of the bottom casing 632d, the communication light detecting devices 1101 are accommodated and secured in a manner to project the respective optical connector adaptors 133y on the user side from the side face of the bottom casing 632d. For the respective optical connector adaptors 133y on the user side, optical connector plugs 633y on the user side in which the optical fiber 111y and the ferrule 110y are built in (see FIG. 22A) are respectively provided in insertion and disinsertion free manner. For the optical connector comprising the optical connector adaptor 133y on the user side and the optical connector plug 633y on the user side, an SC optical connector is preferably used. On the other hand, to the optical connector adaptors 133c on the installation side of the respective communication light detecting devices 1101, optical connector plugs 633c on the installation side in which the optical fiber 111c and the ferrule 110c are built in (see FIG. 22A) are respectively inserted and fixed.

In the bottom casing 632d, a fiber extra length storage portion 634 is provided for taking in an extra length of the optical fiber 111c extending from the optical connector 133c on the installation side. A plurality of the respective optical fibers 111c are bundled via the fiber extra length storage portion 634 as an optical fiber cable and are connected to an external of the optical module 1131. Furthermore, between the respective communication light detecting devices 1101 and the fiber extra length storage portion 634 in the bottom casing 632d a power supply portion 653 for supplying electric power to the light detecting portion 609 is provided. The power supply portion 635 and the respective circuit substrates 623 of the communication light detecting devices 1101 are connected via respective power supply cables 636. For the power supply portion 635, it is preferable to use such as a battery and a solar panel.

When using the optical module 1131, an optical connector adaptor 133y on the user side corresponding to a light transmission path desired to use, an optical connector plug 633y on the user side is inserted and secured. Thereby, the optical fiber 111y on the user side and the optical fiber 111c on the installation side serving as the light transmission path are photo coupled (see FIG. 22A).

Now, the functions and advantages of the present embodiment will be explained while putting in mind the optical module 1131 using the communication light detecting device according to the eleventh embodiment. In the optical module 1131, it is assumed that the optical connector plug 633y on the user side is inserted and secured to the optical connector adaptor 133y on the user side desired to use, and communication is directed from the installation side to the user side.

As shown in FIGS. 22A and 22C, communication light C passes through the optical fiber 111c in the ferrule 110c built-in in the optical connector on the installation side, and reaches the junction interface J between the optical fiber 111c and the optical coupling body 1104. When the communication light C passes the junction interface J, since the outer diameter of the core portion 102 (core diameter) in the optical coupling body 1104 is different (smaller or larger) from the core diameter of the optical fiber 111c, a part of the communication light C spreads from the end face of the core of the optical fiber 111c as the leakage light E. A part of this spread leakage light: transmits through the sleeve 1109 or passes a slit provided at the sleeve 1109; is received by the PD element 117 of the PD 118 in the light receiving portion 609; and is converted into an electrical signal. The electrical signal is transmitted through the circuit substrate 623 and is output from the light output member 624 in the light detecting portion 609 in a visible light.

Since the worker can confirm existence and absence of the visible light by viewing the same, the worker can easily recognize which light transmission paths in the optical module 1131 is in use or not. Needless to say, the same is true when the communication is directed from the user side to the installation side.

Figure 24A:
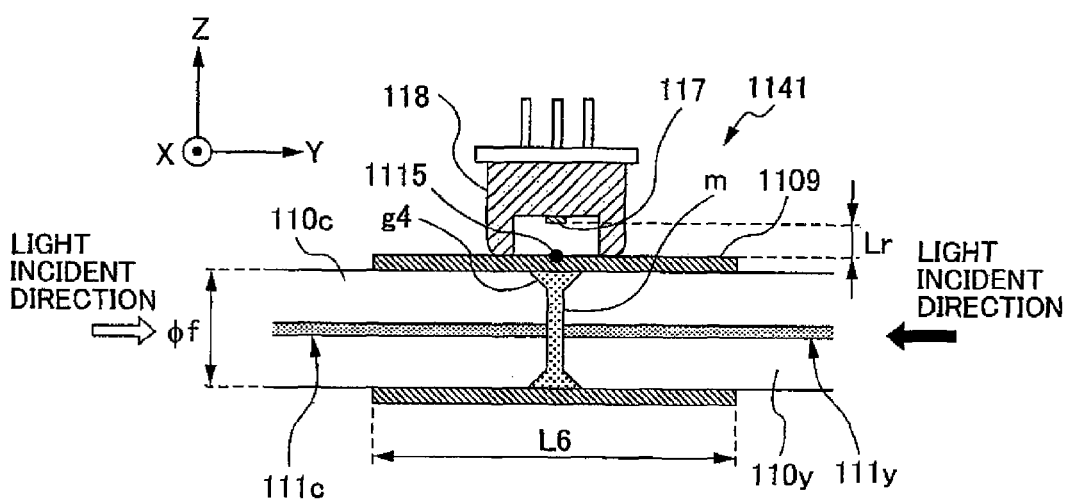
FIG. 24A is a schematic illustration showing a vertical cross sectional view along the longitudinal direction of a principal portion in a communication light detecting device to be used for a comparative example and shows a state when light transmission paths are interconnected each other.
Figure 24B:
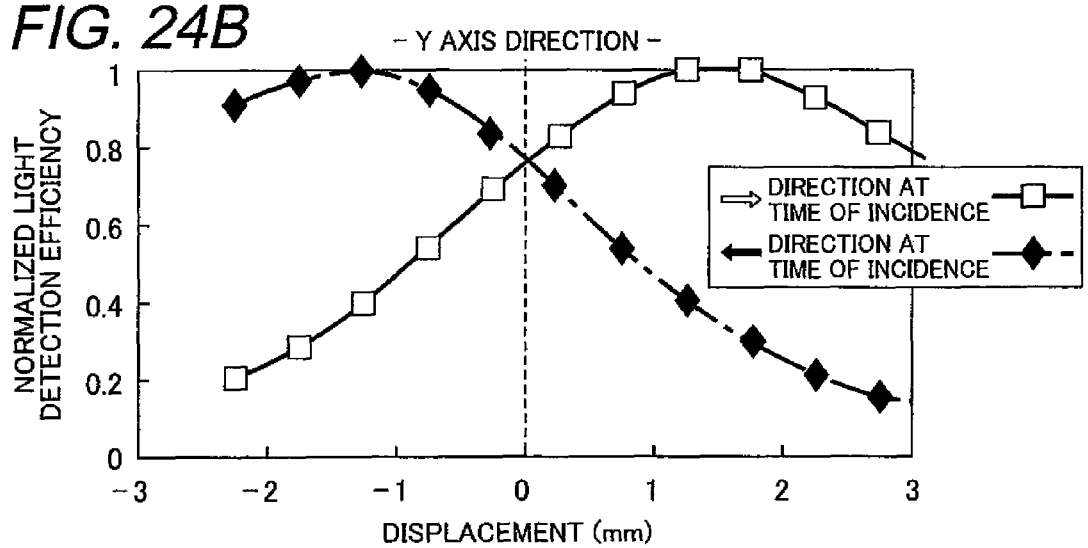
FIG. 24B is a graph showing a relationship between displacement of a PD element along Y axis direction from a center position of a light extracting portion and normalized light detection efficiency in the communication light detecting device of FIG. 24A.
Figure 24C:
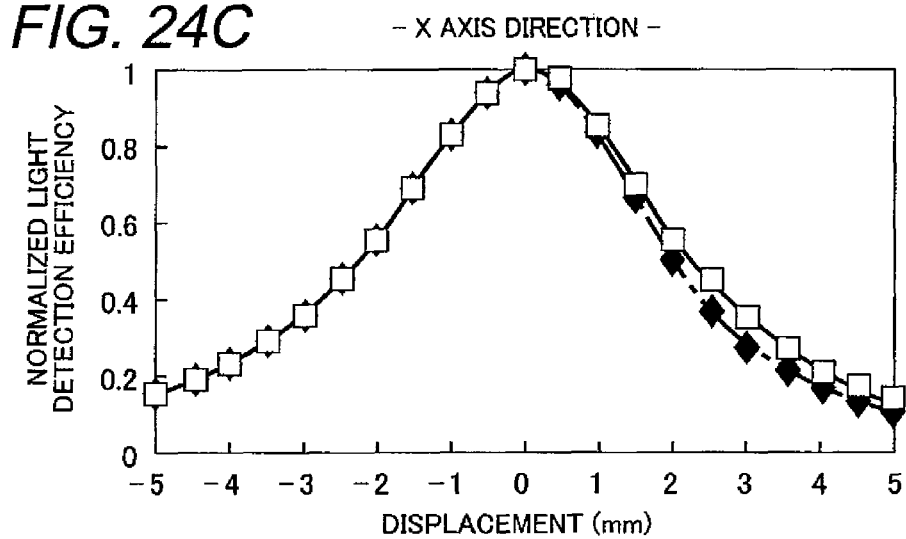
FIG. 24C is a graph showing a relationship between displacement of the PD element along X axis direction from a center position of the light extracting portion and normalized light detection efficiency in the communication light detecting device of FIG. 24A.
Figure 24D:
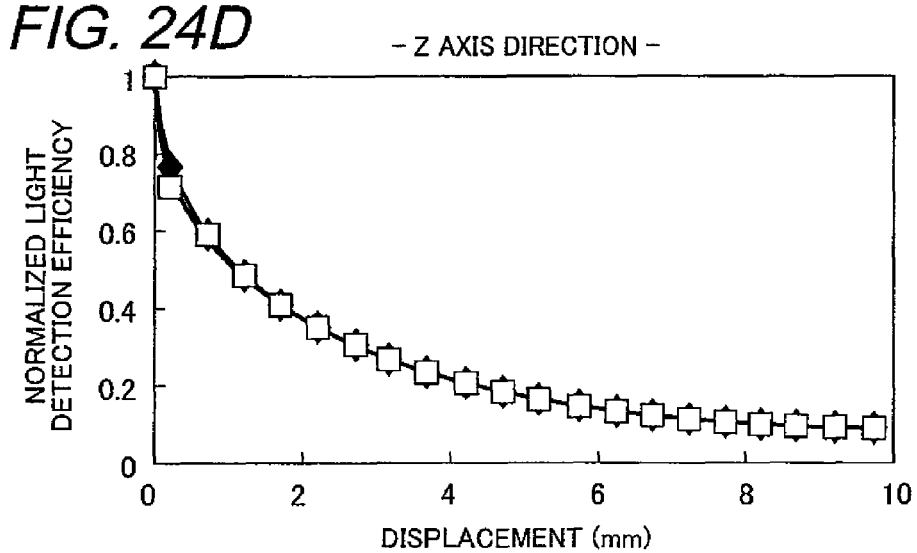
FIG. 24D is a graph showing a relationship between displacement of the PD element along Z axis direction from a center position of the light extracting portion and normalized light detection efficiency in the communication light detecting device of FIG. 24A.

Subsequently, in order to confirm the advantage of enhancement in light detection efficiency by means of the communication light detecting device according to the eleventh embodiment, a relationship between position of the light receiving member (e.g., PD) with respect to the light extracting portion and light detection efficiency was investigated. As a communication light detecting device for comparison, a communication light detecting device 1141 as shown in FIG. 24A was prepared. FIG. 24A is a schematic illustration showing a vertical cross sectional view along the longitudinal direction of a principal portion in a communication light detecting device to be used for a comparative example and shows a state when light transmission paths are connected each other. FIG. 24B is a graph showing a relationship between displacement of a PD element along Y axis direction from a center position of a light extraction portion and normalized light detection efficiency in the communication light detecting device of FIG. 24A. FIG. 24C is a graph showing a relationship between displacement of the PD element along X axis direction from a center position of the light extraction portion and normalized light detection efficiency in the communication light detecting device of FIG. 24A. FIG. 24D is a graph showing a relationship between displacement of the PD element along Z axis direction from a center position of the light extraction portion and normalized light detection efficiency in the communication light detecting device of FIG. 24A.

As shown in FIG. 24A, in the communication light detecting device 1141 of the comparative example, the respective ferrules 110c and 110y (each of optical connectors) each having respective built in optical fibers 111c and 111y are collocated in a sleeve 1109 so as to form a gap g4, and in the gap g4 a refractive index matching agent m is filled. The PD 118 for detecting leakage light generated at the gap g4 is disposed adjacent the sleeve 1109 and the PD element 117 is collocated so as to face directly opposite to the gap g4.

The measurement of the light detection efficiency was performed under the following conditions. In the communication light detecting devices 1101 and 1141, the outer diameter φf of the ferrules 110c and 110y is set at 2.5 mm, the length L6 of the sleeve 1109 is set at 11.4 mm and the distance Lr from the light incident port 1115 of the PD 118 to the light receiving face of the PD element 117 is set at 1.1 mm. In FIG.

22A, the light incident port 1115 of the PD 118 was assumed as on a surface position of the sleeve 1109 at the center position of the optical coupling body 1104 along the optical axis direction. In FIG. 24A, the light incident port 1115 of the PD 118 was assumed as on a surface position of the sleeve 1109 at the center position of the gap g4 along the optical axis direction of the optical fibers 111*c* and 111*y*. And, these positions are assumed as reference points (displacement=0) for Y axis direction displacement, X axis direction displacement and Z axis direction displacement. Furthermore, when displacing in one axis direction (e.g., in Y axis direction), it is assumed no displacement in the other two axis directions (X axis direction and Z axis direction) is effected. The optical detection efficiency was calculated as "normalized light detection efficiency" obtained by normalizing the detection amounts of the leakage light at respective positions with the peak value.

With regard to the communication light detecting device 1141 of the comparative example, as shown in FIGS. 24C and 24D, although the normalized light detection efficiency in respect to X axis direction displacement and Z axis direction displacement decreased with moving away from the reference point (displacement=0), no differences were observed in normalized light detection efficiency depending on incident direction of the communication light. On the other hand, as shown in FIG. 24B, in respect to Y axis direction displacement (displacement along the optical axis direction of the optical fiber), a peak position of the normalized light detection efficiency was not at the reference point (displacement=0) and obvious difference was observed in normalized light detection efficiency depending on incident direction of the communication light.

In contrast thereto, with regard to the communication light detecting device 1101 according to eleventh embodiment, as shown in FIG. 22B, even in respect to Y axis direction displacement, a peak position of the normalized light detection efficiency existed at the reference point (displacement=0) and there was very small difference in normalized light detection efficiency depending on incident direction of the communication light. Comparing the communication light detecting device 1101 with the communication light detecting device 1141, it was determined that the normalized light detection efficiency of the communication light detecting device 1101 at the reference point (displacement=0) was about 1.3 times higher than that of the communication light detecting device 1141. Moreover, a deterioration degree of the normalized light detection efficiency near the reference point (displacement=0) of the communication light detecting device 1101 according to the eleventh embodiment was small, which suggested an allowance for positioning the light receiving member 106 was large.

As has been explained hitherto, the communication light detecting device 1101 according to the eleventh embodiment is characterized by being provided with in the sleeve 1109 the optical coupling body 1104 including the core portion 102 as the light extracting portion, the core portion 102 having different core diameter from the core diameter of the optical fibers 111*c* and 111*y* serving as the light transmission path. Thereby, only by setting properly the core diameter of the core portion 102, a desired amount of leakage light E can be easily extracted from the communication light C.

Furthermore, the optical coupling body 1104 of the communication light detecting device 1101 can make use of the same material as a commonly available ferrule building in an optical fiber used as light transmission path and has the substantially the same structure as that. Such is a very simple structure in comparison with a conventional communication light detecting device that an advantage of reducing material cost as well as manufacturing cost is achieved. Moreover, an advantage is achieved that the photo coupling with the optical fibers 111*c* and 111*y* serving as the light transmission path can be easily and reliably effected.

Additionally, in the communication light detecting device 1101, the light receiving member 106 is collocated adjacent the sleeve 1109, and the PD element 117 for receiving the leakage light is disposed to face directly opposite to the center position in the optical axis direction of the optical coupling body 1104. Therefore, a highly accurate positioning technique is not required in comparison with a conventional communication light detecting device which builds in the light receiving element in a light transmission path. This leads to a reduction of assembling cost and to stable light detection sensitivity.

From the above explanation, the communication light detecting device 1101 according to the eleventh embodiment has attractive advantages in which the leakage light can be efficiently extracted with a simple structure (namely, with a low cost) and light detection sensitivity of the leakage light at the light receiving member 106 is enhanced even without necessitating a highly accurate positioning technique. Furthermore, in the communication light detecting device 1101, since the light detecting portion 609 includes such as the light output member 624 and the failure detecting member 625 which emit a visible light, an advantage is obtained that even when the communication light is invisible, a worker can easily and visually discriminate use or nonuse condition of the light transmission path and existence and absence of a failure of the communication light detecting device 1101.

Twelfth Embodiment of the Present Invention

Figure 25:
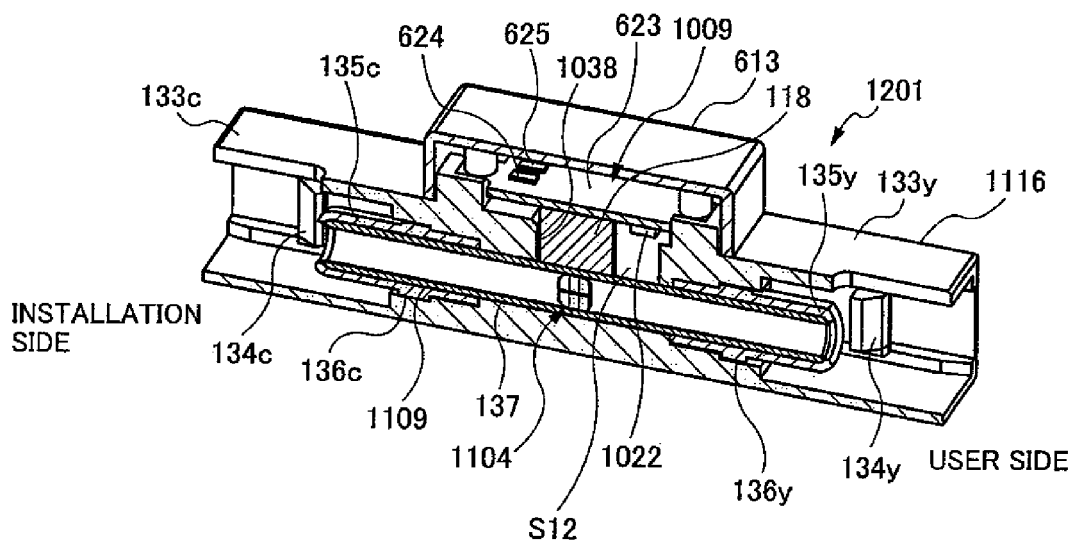
FIG. 25 is a schematic illustrations showing a perspective view in vertical cross section along the longitudinal direction of a communication light detecting device according to a twelfth embodiment.

FIG. 25 is a schematic illustrations showing a perspective view in vertical cross section along the longitudinal direction of a communication light detecting device according to a twelfth embodiment. As shown in FIG. 25, in place of the light detecting portion 609 in the communication light detecting device 1101 according to the eleventh embodiment, the communication light detecting device 1201 according to the twelfth embodiment is provided with a light detecting portion 1009 having a light detecting portion failure diagnosis member 1022 for diagnosing existence and absence of a failure of the light detecting portion such as the PD 118 and having the light output member 624. As the light detecting portion failure diagnosis member 1022, for example, a light detecting portion failure diagnosis use LED which turns ON/OFF by a switch can be used.

In the communication light detecting device 1201, as shown in FIG. 25, adjacent a PD storage room 1038 in the housing 1116, a space S12 is defined by one side face of the PD 118, by the circuit substrate 623 and by the sleeve 1109, and in the space S12, the light detecting portion failure diagnosis member 1022 is mounted on the circuit substrate 623 so as to face the sleeve 1109. When a worker turns ON a switch (not shown) for the light detecting portion failure diagnosis member 1022, light used for failure diagnosis is emitted from the light detecting portion failure diagnosis member 1022 toward the sleeve 1109, and the light used for failure diagnosis is reflected (or scattered) by the sleeve 1109 and makes incident to the PD element 117 of the PD 118.

In a condition when the light detecting portion 1009 such as the PD 118 and the light output member 624 is normal (not in failure), when the PD element 117 receives the light used for failure diagnosis, a visible light is emitted from the light output member 624. By visually recognizing the emitted light from the light output member 624 the worker can judge that such as the PD 118 and the light output member 624 are not in failure. On the other hand, when the light detecting portion 1009 such as the PD 118 and the light output member 624 are in failure, even when the worker turns ON the switch for the light detecting portion failure diagnosis member 1022, no visible light is emitted from the light output member 624, thereby, the worker can judge that such as the PD 118 and the light output member 624 are in failure.

Thirteenth Embodiment of the Present Invention

Figure 26:
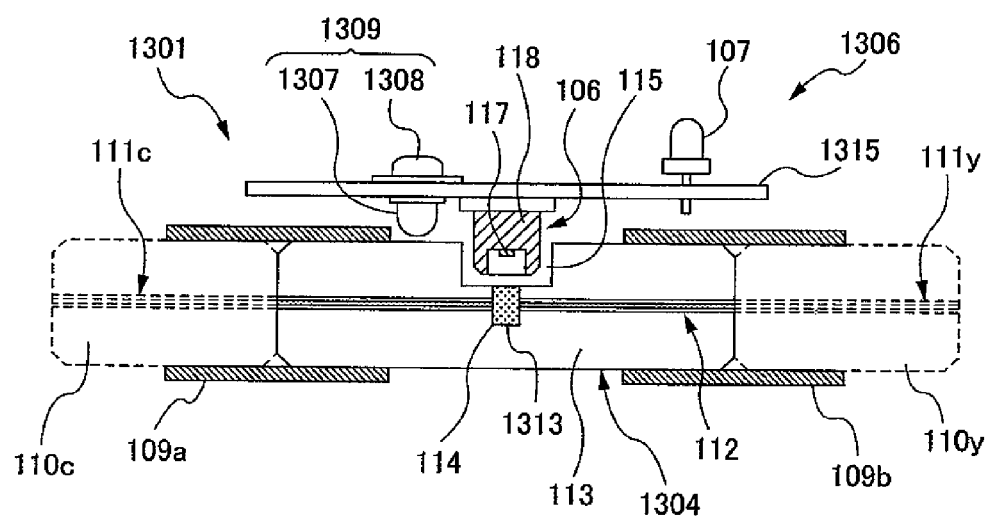
FIG. 26 is a schematic illustration showing a vertical cross sectional view along the longitudinal direction of an exemplary principal portion in a communication light detecting device according to a thirteenth embodiment and shows a state when light transmission paths are connected to the communication light detecting device.

FIG. 26 is a schematic illustration showing a vertical cross sectional view along the longitudinal direction of an exemplary principal portion in a communication light detecting device according to a thirteenth embodiment and shows a state when light transmission paths are connected to the communication light detecting device. As shown in FIG. 26, the communication light detecting device 1301 according to the thirteenth embodiment is to be provided between each of the light transmission paths (e.g., optical fibers 111c and 111y) for interconnecting the light transmission paths and is provided with: an optical coupling body 1304 including a core portion for photo coupling with the light transmission path and a clad portion (e.g., the optical fiber 112); a light extracting portion 1313 formed in the optical coupling body 1304 for extracting a part of invisible communication light transmitting through the light transmission paths as a leakage light; and a light detecting portion 1306 for detecting the leakage light extracted by the light extracting portion 1313.

(Light Detecting Portion)

The light detecting portion 1306 is collocated to be in parallel with as well as adjacent the optical coupling body 1304. Furthermore, the light detecting portion 1306 is comprised of: the light receiving member 106 provided so as to face the light extracting portion 1313; the light output member 107 which outputs a visible light when the invisible leakage light is received by the light receiving member 106; a light detecting portion failure diagnosing member 1309 for emitting light used for failure diagnosis toward the light extracting portion 1313; and a circuit substrate 1315 on which are mounted the light receiving member 106, the light output member 107 and the light detecting portion failure diagnosing member 1309 to comprise a light detecting circuit. The light detecting portion failure diagnosing member 1309 includes a failure diagnosing use light source 1307 for emitting the light for failure diagnosis and a member (e.g., switch 1308) for operating the failure diagnosing use light source 1307. Besides, as a member for receiving the light used for failure diagnosis reflected at the side of the light extracting portion 1313, it is preferable to use the light receiving member 106 in common.

The light receiving member 106 is mounted on the circuit substrate 1315 (on a bottom face of the circuit substrate 1315 in FIG. 26) so as to face directly opposite to the light extracting portion 1313 (a light detecting use groove 114 which will be explained later) and the failure diagnosing use light source 1307 is also mounted on the same face of the circuit substrate 1315 so as to face the light extracting portion 1313. On the other hand, the light output member 107 and the switch 1308 are mounted on the opposite face of the circuit substrate 1315 (on a top face of the circuit substrate 1315 in FIG. 26) from the mounting face of the light receiving member 106 and the failure diagnosing use light source 1307.

As the light receiving member 106, for example, the PD (photo diode) 118 including the PD element 117 can be used. A part of the PD 118 is accommodated in the container groove 115 so that the PD element 117 faces directly opposite to the light extracting portion 1313. From a viewpoint of cost, it is preferable to use an inexpensive Can package type as the PD 118.

As the wavelength of the communication light, a proper single or plural wavelengths (single mode light or multi mode light) within a broad band from 940 to 1500 nm is used. Since the light receiving member 106 covers the above entire band of the communication light as its receivable light wavelength band, the light receiving member 106 can detect the communication light transmitted in any wavelength.

On the other hand, since the failure diagnosis light is used only for confirming the light receiving operation of the light detecting portion 1306, the wavelength of the failure diagnosis light needs not to cover the entire above broad band. That is, as the wavelength thereof, a narrow band is sufficient. For example, an emitting light center wavelength of the failure diagnosing use light source 1307 is determined to be a shorter wavelength than the center wavelength of the receivable light wavelength band of the light receiving member 106. More specifically, it is preferable to use an infrared LED having wavelength of 940 nm as the failure diagnosing use light source 1307. As the failure diagnosing use light source 1307, for example, LEDs that are utilized for a variety of remote control devices can be applied, among these, LEDs having a light emitting region in a shorter wavelength side of the infrared light region is suitable because of its inexpensiveness.

For the light output member 107, an LED (light emitting diode) of visible light region is preferably used. It is preferable that the light output member 107 is set, for example, to light on when communication light is propagating through the optical fibers 111c and 111y and to light off when no communication light is propagating, and as well as to light on when the light receiving member 106 receives failure diagnosis light emitted from the failure diagnosing use light source 1307.

(Optical Coupling Body)

The optical coupling body 1304 includes the optical fiber 112 and the ferrule 113 provided around the optical fiber 112, the optical fiber 112 being photo coupled through physical contacting connection with the optical fibers 111c and 111y (with end faces of the optical fibers on the connection side). Furthermore, as the ferrule 113, it is preferable to use a material such as ceramics made and glass made which transmits the leakage light and scatters the same when the same advances therein. In the present embodiment, an instance when zirconia ceramics is used for the material of the ferrule 113 will be explained.

Both end portions of the optical coupling body 1304 are respectively inserted into the sleeves 109a and 109b, and are secured therein. To the both end portions of the optical coupling body 1304, when the communication light detecting device 1301 is in use, the ferrule 110c provided for the optical connector on the installation side and the ferrule 110y provided for the optical connector on the user side are respectively inserted and butt contacted. In the ferrule 110c, the optical fiber 111c on the installation side serving as the light transmission path is built in, and in the ferrule 110y, the optical fiber 111y on the user side serving as the light transmission path is built in. The sleeve 109a is for positioning the optical axes of the ferrule 110c and the optical coupling body 1304, and the sleeve 109b is for positioning the optical axes of the ferrule 110y and the optical coupling body 1304. Namely, the optical fiber 112 in the optical coupling body 1304 is collocated so as to align on a same straight line as the optical fibers 111c and 111y serving as the light transmission paths.

For the optical fiber 112 and optical fibers 111c and 111y, it is preferable to use such as a quartz glass made single mode optical fiber and GI (graded index) type multi mode optical fiber. The core diameter of the optical fiber 112 is set to be equal to the core diameter of the optical fibers 111c and 111y (e.g., 10 μm). The clad diameter of the optical fiber 112 is preferable to be 40 μm or more and 125 μm or less, and more preferably to be 40 μm or more and 80 μm or less.

The optical coupling body 1304 is provided with the light extracting portion 1313 for extracting a part of communication light propagating through the optical fiber 112. Herein below, an instance where the light extracting portion 1313 includes a light detecting use groove 114 formed so as to cut and separate at least the core of the optical fiber 112 will be explained. However, the light extracting portion 1313 is not limited to the explained instance. The light extracting portion can use one other than the light detecting use groove (e.g., as one in eleventh embodiment of the present invention).

The light detecting use groove 114 is formed in the optical coupling body 1304 at a position facing the light receiving member 106 in such a manner that the depth direction of the light detecting use groove 114 is to be in perpendicular direction (direction crossing the optical coupling body 1034) with respect to the light receiving face of the light receiving member 106. The light detecting use groove 114 can be formed, for example, such as by dicing processing with a blade or etching processing.

As an example, the light extracting portion 1313 (inside the light detecting use groove 114) possesses a lower refractive index than that of the core of the optical fiber 112. Specifically, it is preferable that a resin having a lower refractive index than that of the core of the optical fiber 112 is filled inside the light detecting use groove 114. Moreover, it is further preferable that the resin filled in the light detecting use groove 114 possesses a refractive index which is lower than that of the core of the optical fiber 112 as well as lower than that of the clad of the optical fiber 112. The inside the light detecting use groove 114 can be in vacuum.

As another example of the light extracting portion 1313, it is preferable that a groove width of the light detecting use groove 114 (the groove width along the optical axis direction of the core of the optical axis 112 in the optical coupling body 1304) is to be 50 μm or more and 150 μm or less, and that a refractive index matching agent is to be filled inside the light detecting use groove 114 (e.g., the light extracting portion relating to the sixth embodiment of the present invention). As the refractive index matching agent to be filled in the light detecting use groove 114, liquid materials can be used as well as such as thermosetting resin, ultraviolet (UV) setting resin and adhesive which have a desired refractive index after hardening thereof can be used.

Furthermore, in the present embodiment, the container groove 115 is formed in the ferrule 113 of the optical coupling body 1304 so as to taking in a part of the light receiving member 106, and the light detecting use groove 114 is formed on the bottom face of the container groove 115. This is because for enhancing a light detecting sensitivity by locating the light receiving member 106 close to the optical fiber 112, in other words, by locating the light receiving member 106 close to a leakage light generating region (both side faces of the light detecting use groove 114, in that interfaces between the light detecting use groove 114 and the optical fiber 112).

Figure 27A:
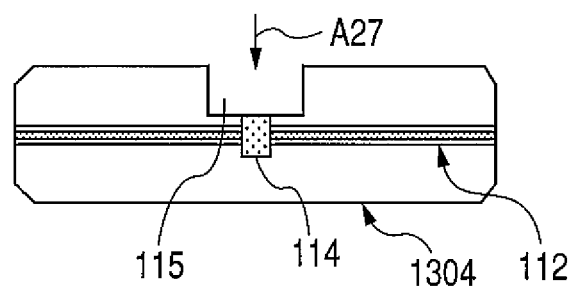
FIG. 27A is a schematic illustration showing a vertical cross sectional view along the longitudinal direction of an example of an optical coupling body in the communication light detecting device according to the thirteenth embodiment.
Figure 27B:
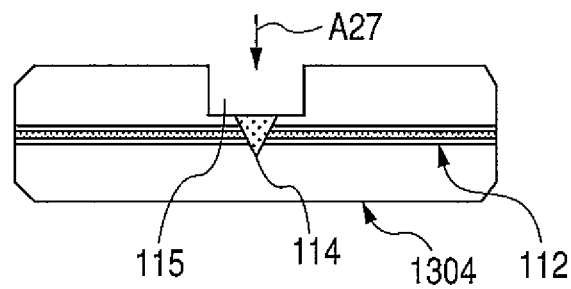
FIG. 27B is a schematic illustration showing a vertical cross sectional view along the longitudinal direction of another example of an optical coupling body in the communication light detecting device according to the thirteenth embodiment.

FIG. 27A is a schematic illustration showing a vertical cross sectional view along the longitudinal direction of an example of an optical coupling body in the communication light detecting device according to the thirteenth embodiment. FIG. 27B is a schematic illustration showing a vertical cross sectional view along the longitudinal direction of another example of an optical coupling body in the communication light detecting device according to the thirteenth embodiment. FIG. 27D is an example of a schematic illustration showing a plane view seen from A27 direction in FIG. 27A or FIG. 27B. FIG. 27E is another example of a schematic illustration showing a plane view seen from A27 direction in FIG. 27A or FIG. 27B. Besides, an explanation on FIG. 27C will be made later.

As shown in FIGS. 27A and 27B, it is preferable that the light detecting use groove 114 is formed substantially in a rectangular shape (recessed shape) or in a V shape seen in vertical cross section along the longitudinal direction. In this instance, as shown in FIG. 27D, it is preferable that the light detecting use groove 114 is formed in perpendicular with respect to the optical axis direction of the optical fiber 112 (the width direction of the light receiving use groove 114 is in parallel with the optical axis direction of the optical fiber 112). Alternatively, as shown in FIG. 27E, it is further preferable to form the light detecting use groove 114 to be in diagonal (in slanting manner) with respect to the optical axis direction of the optical fiber 112. This is because for enhancing a light detecting sensitivity at the PD 118 by enhancing a directivity of the leakage light.

(Failure Diagnosing Member)

As explained previously, on the circuit board 1315 of the light detecting portion 1306, is provided a failure diagnosing member including: the light detecting portion failure diagnosing member 1309 for emitting failure diagnosis light toward the light extracting portion 1313 (failure diagnosing use light source 1307 and switch 1308); and the light receiving portion for receiving the failure diagnosis light reflected at the side of light extracting portion 1313 (used common with the light receiving member 106). The failure diagnosing use light source 1307 is, for example, collocated so as to align with the light receiving member 106 along the optical axis direction of the optical fiber 112 and to face the outside face of the optical coupling body 1304. It is preferable that the failure diagnosing use light source 1307 is comprised of an LED having a comparatively large directivity angle. Thereby, the failure diagnosis light is scattered toward the ferrule 113 in the optical coupling body 1304 with a large angle.

Besides, in FIG. 26, although the failure diagnosing use light source 1307 is disposed on the installation side (on the side of the ferrule 109a) with respect to the light receiving member 106, the communication light detecting device of the present invention is not limited thereto. The failure diagnosing use light source 1307 can be collocated on the user side (on the side of the ferrule 109b).

Next, detection of the communication light and failure diagnosis by making use of the communication light detecting device 1301 according to the thirteenth embodiment will be described.

When an invisible communication light is transmitting through a transmission path (e.g., optical fibers 111c and 111y) and the communication light reaches the light extracting portion 1313 formed in the optical coupling body 1304, part of the communication light leaks as a leakage light and the leakage light is received by the light receiving member 106 and then the same is converted into an electrical signal. The electrical signal is transmitted through the circuit substrate 1315 and is emitted in a visible light from the light output member 107 in the light detecting portion 1306. On the other hand, when no communication light is transmitting through the light transmission path, since no leakage light is generated and no leakage light is received by the light receiving member 106, no visible light is output from the light output member 107.

Herein, when the communication light detecting device 1301 is in failure (for example, when any of the light detecting portion 1306, the light output member 107 and the circuit substrate 1315 comprising the light receiving member 106 is in failure), even in a condition where the communication light is transmitting through the light transmission path and the leakage light is generated, the visible light is caused not to be output from the light output member 107. In this instance, a problem arises that the worker cannot judge whether no communication light is transmitting or the communication light detecting device 1301 is in failure.

Figure 28:
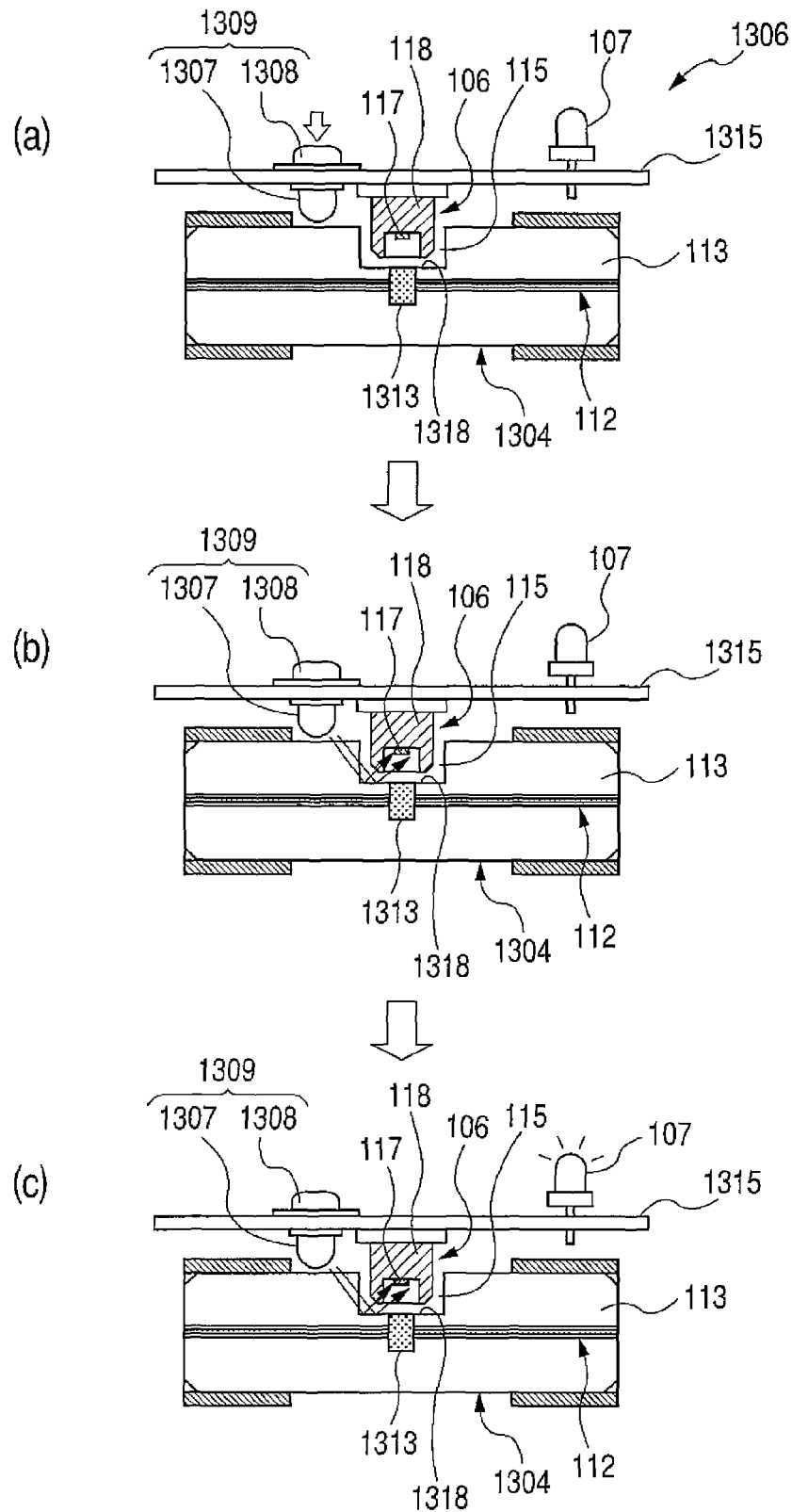

In order to resolve such problem, by positively making incident the failure diagnosis light to the optical coupling body 1304 representing the principal portion of the communication light detecting device 1301, the present embodiment is constituted in such a manner that the communication light detecting device 1301 itself can confirm whether the same fails or not. FIG. 28 is a schematic illustrations showing a failure diagnosis flow performed by the communication light detecting device as shown in FIG. 26 by viewing a vertical cross section along the longitudinal direction of a principal portion of the communication light detecting device, wherein (a) shows a state when a switch of a failure diagnosis member in a light detecting portion is pressed, (b) shows a state when failure diagnosis light is emitted and the same is reflected near a light extraction portion and (c) shows a state when reflected failure diagnosis light is received at a light receiving member and a light output member is lighted on.

In order to investigate whether the communication light detecting device 1301 itself fails, the worker presses the switch 1308 of the light detecting portion failure diagnosing member 1309 provided in the light detecting portion 1306 (see FIG. 28(*a*)). When the switch 1308 is pressed, the failure diagnosing use light source 1307 is operated, and failure diagnosing use light is emitted. The failure diagnosing use light emitted from the failure diagnosing use light source 1307 toward the light extracting portion 1313 scatters in the ferrule 113 in the optical coupling body 1304 with comparatively large angle, and a part thereof reaches a bottom 1318 of the container groove 115 and is reflected therefrom to make incident to the light receiving member 106 (see FIG. 28(*b*)). The failure diagnosis use light made incident to the light receiving member 106 is received by the PD element 117 and converted therein into an electrical signal. The electrical signal transmits through the circuit substrate 1315 to light on the light output member 107 (see FIG. 28(*c*)).

In FIG. 28, for simplifying the explanation, such a condition is shown that the failure diagnosis light advances in straight in the optical coupling body 1304 and reaches and is reflected at the bottom 1318 of the container groove 115, then advances in straight and makes incident to the light receiving member 106. However, actually, other than the failure diagnosis light which reaches the light receiving member 106 while advancing in straight, a part of the failure diagnosis light reaches the light receiving member 106 through a variety of routes while scattering and repeating a plurality of reflections.

When the light output member 107 lights on by the emission of the failure diagnosis light, the worker can judge based from the visible light output from the light output member 107 that the light detecting portion 1306 is not in failure, in that the communication light detecting device 1301 itself is not in failure. At the same time, the worker recognizes that the communication light is not transmitting through the light transmission path at that moment. On the contrary, even when the failure diagnosis light is emitted, the light output member 107 does not lights on, the worker can judge that the light detecting portion 1306 is in failure, in that the communication light detecting device 1301 itself is in failure.

As has been described hitherto, since the communication light detecting device 1301 according to the thirteenth embodiment is provided with the failure diagnosing use light source 1307 emitting failure diagnosis light and the switch 1308 for operating the failure diagnosing use light source 1307, the existence and absence of failure of the communication light detecting device 1301 itself can be judged simply through manipulation of the switch 1308. Thereby, when the communication light detecting device 1301 itself is in failure, such instance is eliminated that the worker erroneously recognizes a state in which actually the communication light is transmitting as the communication light is not transmitting, thereby, such an inconvenience of pulling off erroneously the optical connector is prevented.

Fourteenth Embodiment of the Present Invention

Figure 29:
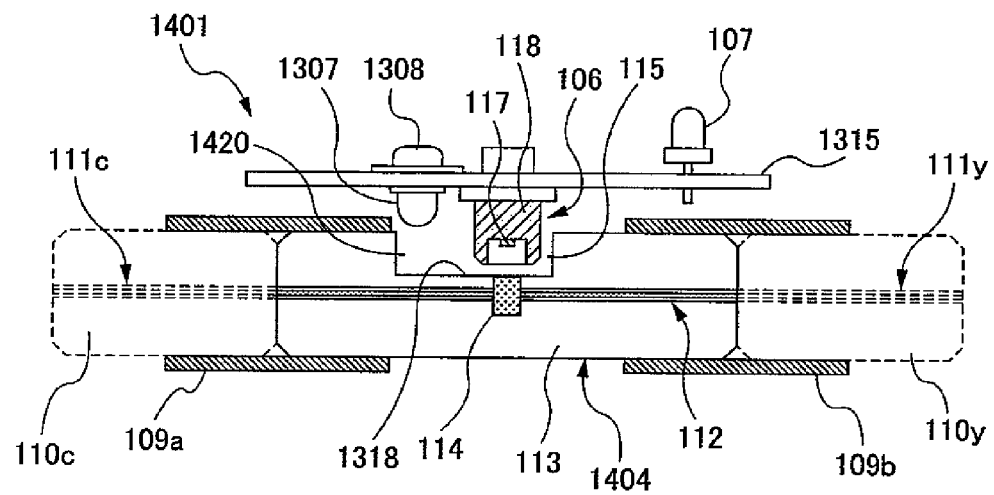
FIG. 29 is a schematic illustration showing a vertical cross sectional view along the longitudinal direction of an exemplary principal portion in a communication light detecting device according to a fourteenth embodiment and shows a state when light transmission paths are connected to the communication light detecting device.

FIG. 29 is a schematic illustration showing a vertical cross sectional view along the longitudinal direction of an exemplary principal portion in a communication light detecting device according to a fourteenth embodiment and shows a state when light transmission paths are connected to the communication light detecting device. As shown in FIG. 29, in contrast to the optical coupling body 1304 in the communication light detecting device 1301 according to the thirteenth embodiment, the communication light detecting device 1401 according to the fourteenth embodiment is provided with an optical coupling body 1404 in which a cutout portion 1420 is additionally formed. The cutout portion 1420 in the optical coupling body 1404 is formed at a position facing the failure diagnosing use light source 1307 in the light detecting portion 1306.

The cutout portion 1420 is formed in a substantially square shape seen when the optical coupling body 1404 is vertically cross sectioned along the longitudinal direction. Furthermore, the cutout portion 1420 communicates with the container groove 115 and it is preferable that the cutout portion 1420 continues to the container groove 115 with no specific boundary. Namely, the bottom of the cutout portion 1420 continues to the bottom 1318 of the container groove 115. Since the bottom 1318 serves as a boundary surface between the optical coupling body 1404 and air and is likely to reflect light, the bottom 1318 is optimum as a reflection surface for reflecting the failure diagnosis light from the failure diagnosing use light source 1307 toward the light receiving member 106.

In the communication light detecting device 1401, since the cutout portion 1420 is formed at a position facing the failure diagnosing use light source 1307, the emitted failure diagnosis light propagates in the space within the cutout portion 1420, and a part thereof makes incident to the bottom 1318 of the cutout portion 1420 with a proper angle and is reflected therefrom toward the light receiving member 106. Moreover, since the loss of the reflected light is smaller than that of when propagating through the ferrule 113, an amount of failure diagnosis light reaching the light receiving member 106 is increased in comparison with the use of the communication light detecting device 1301. In other words, when the amount of light received at the light receiving member 106 is set at a predetermined amount, the amount of failure diagnosis light emitted from the failure diagnosing use light source 1307 can be reduced in comparison with when the communication light detecting device 1301 is used.

This leads to a reduction of failure diagnosis light which leaks (penetrates) into the optical fiber 112 and achieves an advantage of preventing communication trouble in which light power in the light transmission path varies due to the leaked in failure diagnosis light. The other functions and advantages achieved by the present embodiment are the like as those of the communication light detecting device 1301 according to the thirteenth embodiment.

Figure 30:
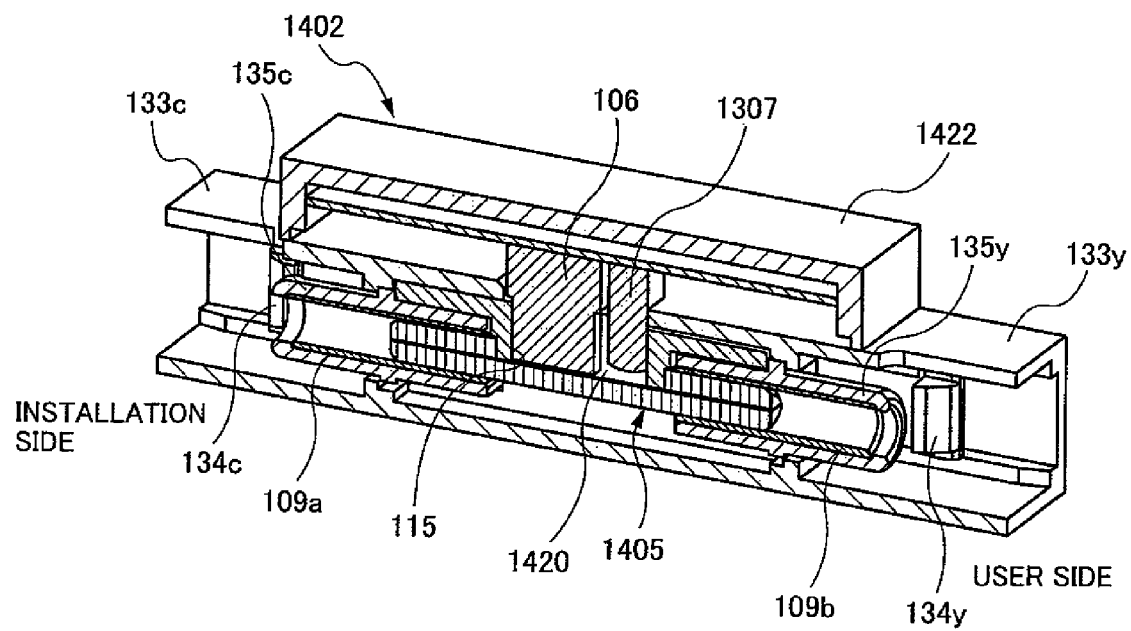
FIG. 30 is a schematic illustration showing a vertical cross sectional view along the longitudinal direction of another exemplary communication light detecting device according to the fourteenth embodiment.

FIG. 30 is a schematic illustration showing a vertical cross sectional view along the longitudinal direction of another exemplary communication light detecting device according to the fourteenth embodiment. In the communication light detecting device 1402 shown in FIG. 30, the failure diagnosing use light source 1307 is disposed on the user side (on the side of ferrule 109b) with respect to the light receiving member 106. As shown in FIG. 30, the communication light detecting device 1402 is provided with an outer jacket 1422 for casing over and protecting the principal portion.

One end portion (left side in FIG. 30) of the outer jacket 1422 serves as an optical connector adaptor 133c on the installation side and the other end portion (right side in FIG. 30) thereof serves as an optical connector adaptor 133y on the user side. In the optical connector adaptor 133c on the installation side, a connector lock piece (SC attachment) 134c is provided for securing an optical connector plug (not shown) on the installation side after inserting thereof. Likely, in the optical connector adaptor 133y on the user side, a connector lock piece (SC attachment) 134y is provided for securing an insertion and disinsertion free optical connector plug (not shown) on the user side.

On the depth side (on the side of the optical coupling body 1405) from the connector lock piece 134c in the optical connector adaptor 133c on the installation side, a sleeve holder 135c on the installation side is accommodated. Likely, on the depth side (on the side of the optical coupling body 1405) from the connector lock piece 134y in the optical connector adaptor 133y on the user side, a sleeve holder 135y on the user side is accommodated.

Fifteenth Embodiment of the Present Invention

Figure 31:
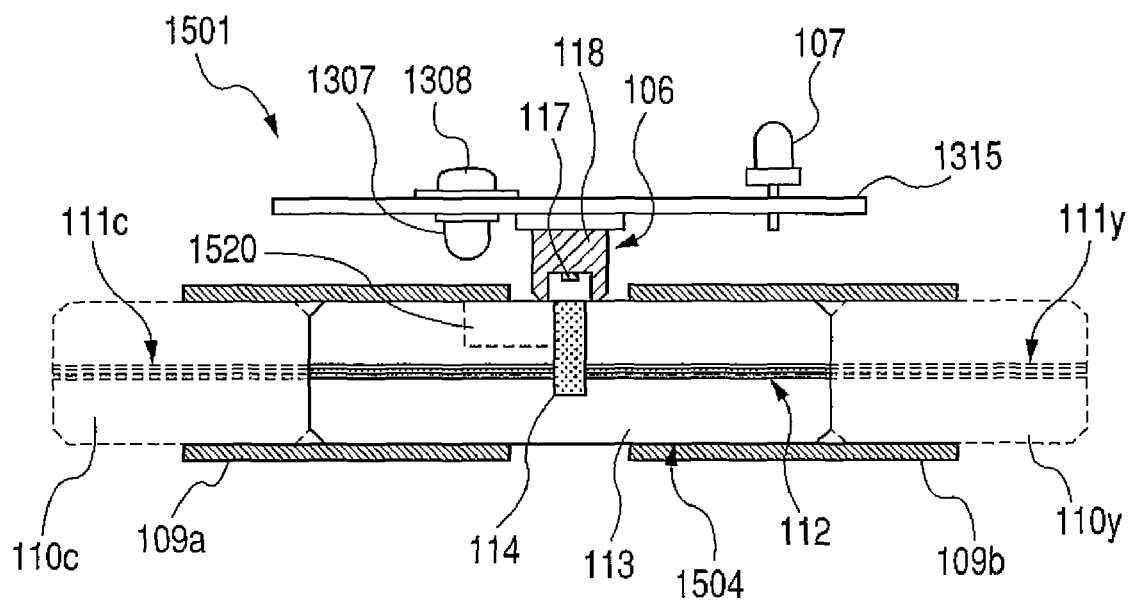
FIG. 31 is a schematic illustration showing a vertical cross sectional view along the longitudinal direction of an exemplary principal portion in a communication light detecting device according to a fifteenth embodiment and shows a state when light transmission paths are connected to the communication light detecting device.

FIG. 31 is a schematic illustration showing a vertical cross sectional view along the longitudinal direction of an exemplary principal portion in a communication light detecting device according to a fifteenth embodiment and shows a state when light transmission paths are connected to the communication light detecting device. As shown in FIG. 31, in contrast to the optical coupling body 1304 in the communication light detecting device 1301 according to the thirteenth embodiment, the communication light detecting device 1501 according to the fifteenth embodiment is provided with an optical coupling body 1504 in which no container groove 115 is formed. The light receiving member 106 is collocated adjacent the ferrule 113 in the optical coupling body 1504 and is disposed in such a manner that the light receiving face of the PD element 117 faces directly opposite to the light detecting use groove 114. Furthermore, in the same manner as in the communication light detecting device 1401, a cutout portion 1520 can be formed in the communication light detecting device 1501 at a position facing the failure diagnosing use light source 1307. In the communication light detecting device 1501, the like functions and advantages as obtained with the fourteenth embodiment can be obtained. The other functions and advantages achieved by the present embodiment are the like as those of the communication light detecting device 1301 according to the thirteenth embodiment.

Sixteenth Embodiment of the Present Invention

Figure 27C:
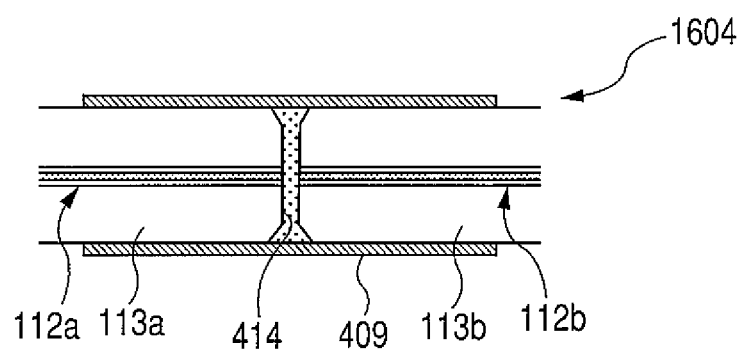
FIG. 27C is a schematic illustration showing a vertical cross sectional view along the longitudinal direction of an example of an optical coupling body in a communication light detecting device according to a sixteenth embodiment.
Figure 27D:
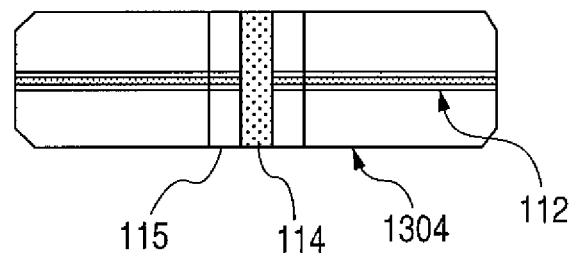
FIG. 27D is an example of a schematic illustration showing a plane view seen from A27 direction in FIG. 27A or FIG. 27B.
Figure 27E:
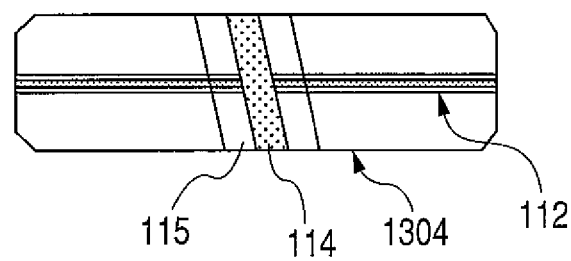
FIG. 27E is another example of a schematic illustration showing a plane view seen from A27 direction in FIG. 27A or FIG. 27B.

FIG. 27C is a schematic illustration showing a vertical cross sectional view along the longitudinal direction of an example of an optical coupling body in a communication light detecting device according to a sixteenth embodiment. In the communication light detecting device according to the sixteenth embodiment, as shown in FIG. 27C, an optical coupling body 1604 is used, that is comprised by using two ferrules 113a and 113b in which optical fibers 112a and 112b are respectively built in, and by forming a light detecting use cut and separation portion 414 while disposing the two ferrules 113a and 113b with a predetermined gap by making use of a sleeve 409. Furthermore, in the gap of the light detecting use cut and separation portion 414, are filled such as a resin having a lower refractive index than that of the core of the optical fibers 112a and 112b, and a refractive index matching agent having a refractive index substantially the same as that of the core of the optical fibers 112a and 112b.

Figure 32:
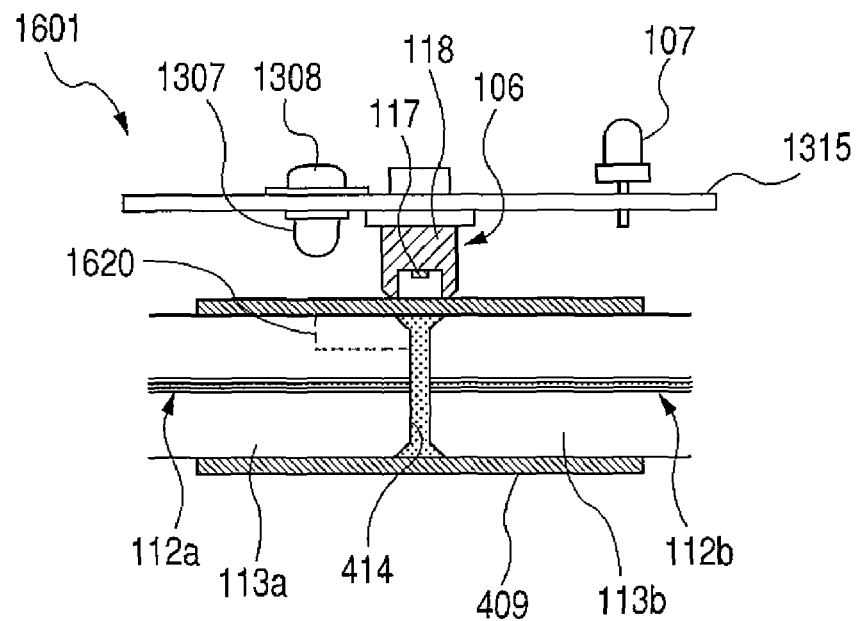
FIG. 32 is a schematic illustration showing a vertical cross sectional view along the longitudinal direction of an exemplary principal portion in a communication light detecting device according to a sixteenth embodiment.

FIG. 32 is a schematic illustration showing a vertical cross sectional view along the longitudinal direction of an exemplary principal portion in the communication light detecting device according to the sixteenth embodiment. As shown in FIG. 32, the light receiving member 106 is collocated adjacent the sleeve 409 and is disposed in such a manner that the light receiving face of the PD element 117 faces directly opposite to the light detecting use cut and separation portion 414. Moreover, in the same manner as in the communication light detecting device 1401, the cutout portion 1520 can be formed in the communication light detecting device 1601 according to the sixteenth embodiment at a position facing the failure diagnosing use light source 1307. In the communication light detecting device 1601, the like functions and advantages as obtained with the fourteenth embodiment can be obtained. The other functions and advantages achieved by the present embodiment are the like as those of the communication light detecting device 1301 according to the thirteenth embodiment.

Seventeenth Embodiment of the Present Invention

Figure 33:
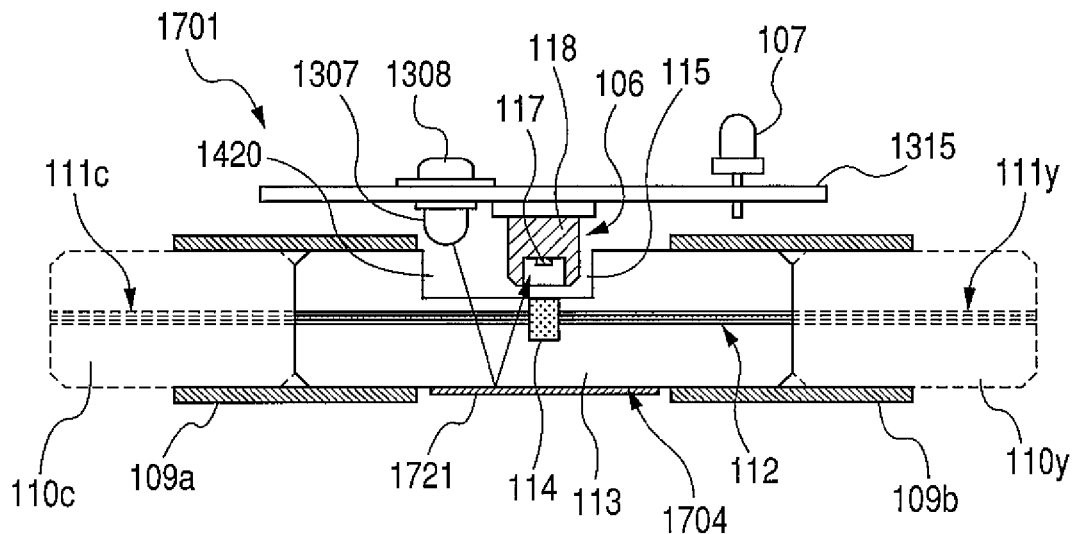
FIG. 33 is a schematic illustration showing a vertical cross sectional view along the longitudinal direction of an exemplary principal portion in a communication light detecting device according to a seventeenth embodiment and shows a state when light transmission paths are connected to the communication light detecting device.

FIG. 33 is a schematic illustration showing a vertical cross sectional view along the longitudinal direction of an exemplary principal portion in a communication light detecting device according to a seventeenth embodiment and shows a state when light transmission paths are connected to the communication light detecting device. As shown in FIG. 33, in contrast to the optical coupling body 1304 in the communication light detecting device 1301 according to the thirteenth embodiment, the communication light detecting device 1701 according to the seventeenth embodiment is provided with the optical coupling body 1704 in which a reflecting member 1721 is additionally formed on the outer surface of the ferrule 113 on the opposite side (the bottom side in FIG. 33) from the side (the top side in FIG. 33) where the circuit substrate 1315 is disposed. The reflecting member 1721 is formed by providing a gold film or a multi layered filter on the outer surface of the ferrule 113 on the bottom side. With the communication light detecting device 1701 according to the seventeenth embodiment, through the provision of such reflecting member 1721, the failure diagnosis light from the failure diagnosing use light source 1307 is efficiently guided toward the light receiving member 106. The other functions and advantages achieved by the present embodiment are the like as those of the communication light detecting device 1301 according to the thirteenth embodiment.

Eighteenth Embodiment of the Present Invention

Figure 34:
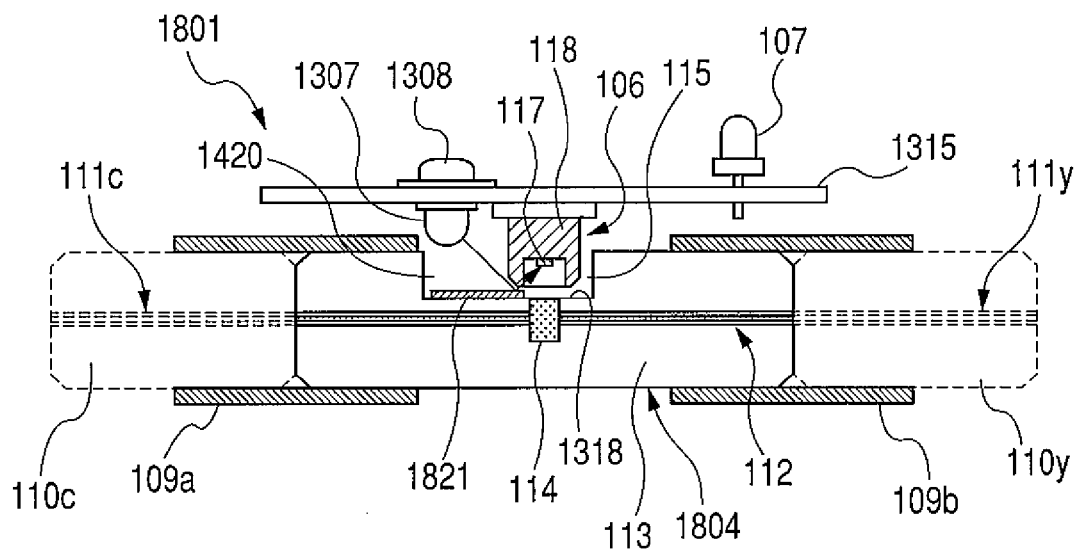
FIG. 34 is a schematic illustration showing a vertical cross sectional view along the longitudinal direction of an exemplary principal portion in a communication light detecting device according to an eighteenth embodiment and shows a state when light transmission paths are connected to the communication light detecting device.

FIG. 34 is a schematic illustration showing a vertical cross sectional view along the longitudinal direction of an exemplary principal portion in a communication light detecting device according to an eighteenth embodiment and shows a state when light transmission paths are connected to the communication light detecting device. As shown in FIG. 34, in contrast to the optical coupling body 1304 in the communication light detecting device 1301 according to the thirteenth embodiment, the communication light detecting device 1801 according to the eighteenth embodiment is provided with an optical coupling body 1804 in which a reflecting member 1821 is formed on the bottom face of the cutout portion 1420 and at a position (except for the portion on the light detecting use groove 114) facing the failure diagnosing use light source 1307. The reflecting member 1821 is formed by providing a gold film or a multi layered filter on the bottom surface 1318 of the cutout portion 1420.

With the communication light detecting device 1801 according to the eighteenth embodiment, through the provision of such reflecting member 1821, the failure diagnosis light from the failure diagnosing use light source 1307 is efficiently guided toward the light receiving member 106. In addition, since the penetration of failure diagnosis light into the optical fiber 112 in the optical coupling body 1804 can be prevented, an advantage of preventing communication trouble is achieved in which light power in the light transmission path varies due to the leaked in failure diagnosis light. The other functions and advantages achieved by the present embodiment are the like as those of the communication light detecting device 1301 according to the thirteenth embodiment.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A communication light detecting device configured to interconnect a plurality of light transmission paths for communication light, and to be collocated between the light transmission paths, the communication light detecting device comprising:
    an optical coupling body, including:
        a clad portion,
        a core portion configured to photo couple with the light transmission paths, and
        a light extracting portion, configured to extract a part of the communication light as a leakage light, having a light detecting use groove formed by cutting and separating the core portion, and having a lower refractive index than that of the core portion; and
    a light detecting portion having a light receiving member configured to receive the leakage light.

2. The communication light detecting device according to claim 1, wherein:
    the light detecting use groove is formed in such a manner that the depth direction of the light detecting use groove facing a light receiving face of the light receiving member is perpendicular with respect to the light receiving face.

3. The communication light detecting device according to claim 1, wherein:
    the light detecting use groove is formed in a slanting manner so as to cross diagonally with respect to the optical axis direction of the core portion.

4. The communication light detecting device according to claim 1, wherein:
    a container groove configured to take in a part of the light receiving member is formed in the optical coupling body, and the light detecting use groove is formed in the container groove.

5. The communication light detecting device according to claim 1, wherein:
    in the light detecting use groove, a resin having a lower refractive index than that of the core portion is filled.

6. The communication light detecting device according to claim 1, wherein:
    wherein the optical coupling body includes a ferrule building in an optical fiber, and the ferrule includes a member which transmits as well as scatters the leakage light.

7. The communication light detecting device according to claim 1,
    wherein the optical coupling body includes two ferrules each building in an optical fiber: and
    wherein the light detecting use groove of the light extracting portion is formed by disposing the two ferrules with a predetermined gap and a resin having a lower refractive index than that of the core portion filled in the gap of the light detecting use groove.

8. The communication light detecting device according to claim 6, wherein:
    the core diameter of the optical fiber is equal to the core diameter of the light transmission path photo coupled with the optical coupling body, and the clad diameter of the optical fiber is within a range from 40 to 125 μm.

9. The communication light detecting device according to claim 1, wherein:
    wherein the light detecting portion further includes a light output member configured to output a visible light when the leakage light is received by the light receiving member.

10. A communication light detecting device collocated between each of light transmission paths for interconnecting each of end portions of the light transmission paths inside a sleeve, each of the light transmission paths being comprised of an optical fiber for communication light, and for detecting existence and absence of the communication light, comprising:
    an optical coupling body including a clad portion and a core portion for photo coupling with the light transmission paths, and further including a light detecting use groove formed so as to cut and separate the core portion as well as a refractive index matching agent filled in the light detecting use groove; and
    a light detecting portion having a light receiving member for detecting a leakage light of the communication light leaking via the light detecting use groove and collocated adjacent the optical coupling body, wherein:
    groove width of the light detecting use groove along the optical axis direction of the core portion is within a range from 50 to 150 μm.

11. The communication light detecting device according to claim 10, wherein:
    in the optical coupling body, a container groove for taking in a part of the light receiving member is formed and the light detecting use groove is formed in the container groove.

12. The communication light detecting device according to claim 10, wherein:

the light detecting use groove is formed in a slanting manner so as to cross diagonally with respect to the optical axis direction of the core portion.

13. The communication light detecting device according to claim 10, wherein:

the light detecting portion further includes a light output member configured to output a visible light when the leakage light is received by the light receiving member.

14. The communication light detecting device according to claim 10, wherein:

the sleeve is made of a ceramics permitting transmission of the leakage light.

15. The communication light detecting device according to claim 10, wherein:

the light detecting portion further includes a failure detecting member for informing existence and absence of a failure in the light detecting portion.

16. A communication light detecting device interconnecting each of light transmission paths for communication light, detecting existence and absence of the communication light, and collocated between the light transmission paths, comprising:

an optical coupling body including:
a clad portion,
a core portion for photo coupling with the light transmission paths, and
a light extracting portion, for extracting a part of the communication light as a leakage light, and having a light detecting use groove formed by cutting and separating the core portion; and
a light detecting portion including a light receiving member for receiving the leakage light and collocated adjacent the optical coupling body, and further including a failure detection light emitting member for emitting failure detection light toward the light extracting portion and a light receiving member for receiving the failure detection light reflected near the light extracting portion.

17. The communication light detecting device according to claim 16, wherein:

the failure detection light emitting member includes a failure detecting use light emitting source for emitting the failure detecting detection light and an operating member for operating the failure detecting use light emitting source.

18. The communication light detecting device according to claim 16, wherein:

the light receiving member for receiving the leakage light and the light receiving member for receiving the failure detection light are a common light receiving member.

19. The communication light detecting device according to claim 17, wherein:

the core portion and the clad portion of the optical coupling body are comprised of an optical fiber, and the failure detecting use light emitting source is collocated so as to face the optical coupling body.

20. The communication light detecting device according to claim 19, wherein:

at a position of the optical coupling body facing the failure detecting use light emitting source, a cutout portion is formed.

21. The communication light detecting device according to claim 19, wherein:

the optical coupling body further includes a reflection member for reflecting the failure detection light toward the light receiving member.

22. A communication light detecting device configured to interconnect a plurality of light transmission paths for communication light, and to be collocated between the light transmission paths, the communication light detecting device comprising:

an optical coupling body including:
a clad portion,
a core portion configured to photo couple with the light transmission paths, and
a light extracting portion, configured to extract a part of the communication light as a leakage light, having a light detecting use groove separating the core portion; and
a light detecting portion having a light receiving member configured to receive the leakage light.

* * * * *